Figure 1:
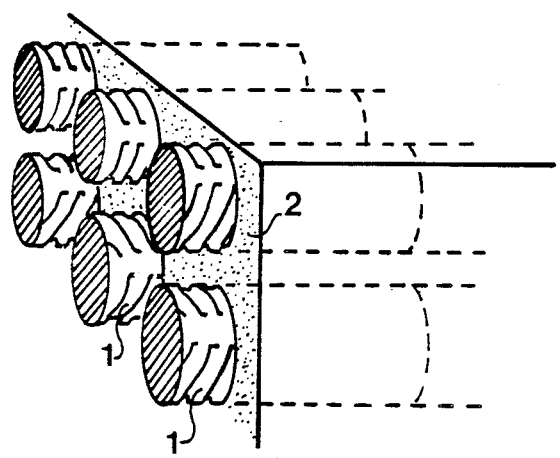

United States Patent [19]

Bache

[11] Patent Number: 4,979,992

[45] Date of Patent: Dec. 25, 1990

[54] COMPACT REINFORCED COMPOSITE

[75] Inventor: Hans H. Bache, Klokkerholm, Denmark

[73] Assignee: Aktieselskabetarlborg Portland-Cement-Fabrik, Denmark

[21] Appl. No.: 159,589

[22] PCT Filed: Jun. 9, 1987

[86] PCT No.: PCT/DK87/00072

§ 371 Date: Feb. 9, 1988

§ 102(e) Date: Feb. 9, 1988

[87] PCT Pub. No.: WO87/07597

PCT Pub. Date: Dec. 17, 1987

[30] Foreign Application Priority Data

Jun. 9, 1986 [DK] Denmark .............................. 2713/86

[51] Int. Cl.$^5$ ...................... C04B 14/38; C04B 14/48
[52] U.S. Cl. .................................... 106/644; 106/643; 106/737; 106/713; 106/711
[58] Field of Search ............:........ 106/99; 109/80, 82–84

[56] References Cited

U.S. PATENT DOCUMENTS

| 3,650,785 | 3/1972 | Ball et al. | 106/97 |
| 4,382,820 | 5/1983 | Inoue | 106/97 |
| 4,559,881 | 12/1985 | Lankard et al. | 106/99 |
| 4,780,141 | 10/1988 | Double et al. | 106/99 |

FOREIGN PATENT DOCUMENTS

| 48449 | 10/1987 | Japan | 106/99 |
| 646930 | 12/1984 | Switzerland | 106/99 |

Primary Examiner—William R. Dixon, Jr.
Assistant Examiner—David M. Brunsman
Attorney, Agent, or Firm—Bryan, Cave, McPheeters & McRoberts

[57] ABSTRACT

A compact reinforced composite comprising a matrix (A) with a reinforcement (B) embedded therein, the matrix (A) being a composite structure comprising a base matrix (C) which is reinforced with reinforcing bodies (D) in the form of fibers. The transverse dimension of (B) being at least 5 times as large as the transverse dimension of (D).

61 Claims, 20 Drawing Sheets

Fig. 23
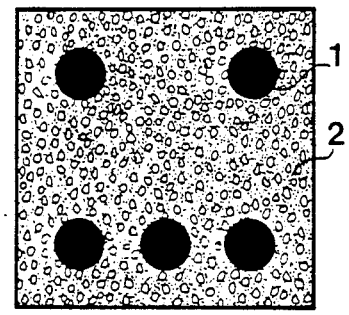
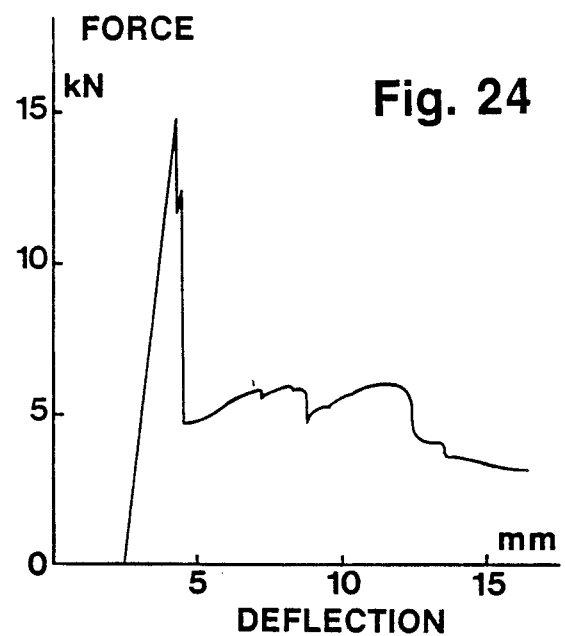
Fig. 24

0%

2%

4%

6%

Fig. 29 A
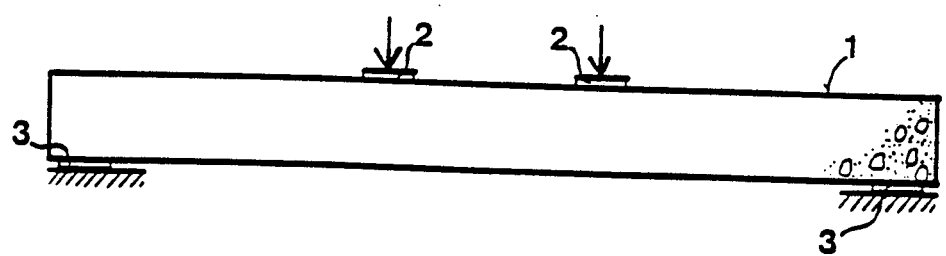
Fig. 29B 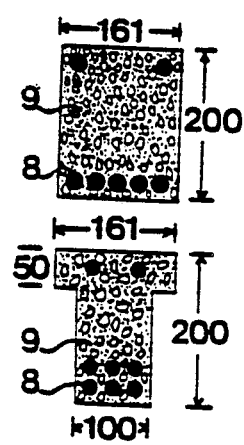 Fig. 29D
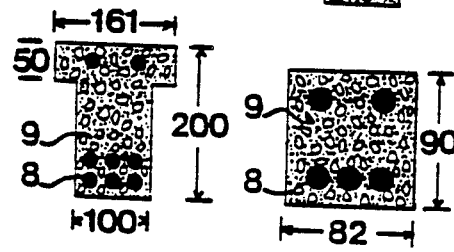
Fig. 29C 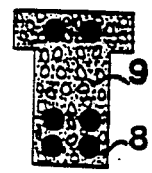 Fig. 29E Fig. 42
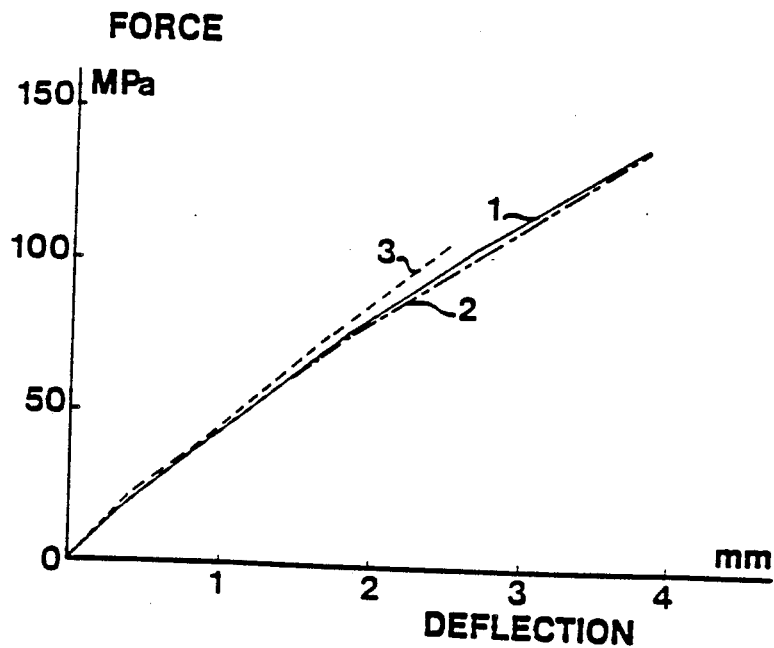
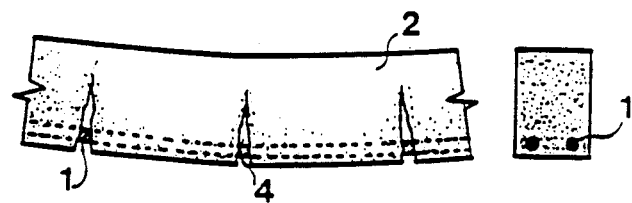
Fig. 43A
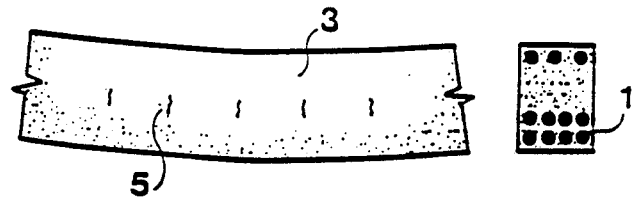
Fig. 43B

COMPACT REINFORCED COMPOSITE

BRIEF DISCLOSURE OF THE INVENTION

The present invention relates to a completely new type of composite structure, in the following termed CRC (compact reinforced composite) with unique mechanical properties:

A very high strength (in any direction) combined with a very large rigidity (in any direction) and a large strain capacity—also in tension—with retainment of a very high internal coherence.

The structure is built up of a strong base matrix, which is typically very brittle in itself, the base matrix being heavily reinforced with fine fibres, thereby forming a stronger and more ductile material, this heavily fibre-reinforced material in itself functioning as a matrix in a composite reinforced with a high concentration of main reinforcement such as steel bars. This new class of material or structure may, for example, be cement-based and has, in that case, an apparent similarity with reinforced concrete, but with an exceptionally high load capacity, not only in compression, but also in tension, for example, a bending capacity corresponding to about 150 to 300 MPa as compared to 20 MPa for good conventional reinforced concrete, with retention of substantial internal coherence also in the tensile zone (crack-free behaviour at tensile strains above 3 mm/m, as compared to tensile strains of only 0.1–0.2 mm/m before cracking of the concrete material in reinforced concrete occurs).

The strength of the new material of the invention is more like that of structural steel, not only in compression, but also in tension, bending and shear, but at the same time, the material has the advantage of being a composite material with all the possibilities which such a structure opens up for tailoring specific (often directional) properties such as strength, hardness, chemical resistance, etc., possibilities which are not available with monolithic materials like steel.

As a composite material or structure, the material or structure of the invention opens new dimensions in that it shows very high strength and stiffness for loads in any direction where conventional high-quality fibre-reinforced materials such glass-fibre or carbon-fibre-reinforced plastics perform really well only in tension.

The new composite of the invention is the hitherto non-existing composite—or for that matter non-existing material on the whole—to be used in very large massive structures showing very high rigidity, load capacity and toughness for loads in any direction:

High-quality conventional fibre-reinforced composites, such as carbon fibre-reinforced plastics, are unable to resist large loads in shear and compression and are absolutely unsuitable for large structures.

Structural steel, on the other hand, is obviously a very useful material also in structures which are large with respect to overall size and weight, but cannot realistically be used effectively in massive structures of greater thickness than about 200–400 mm, because the available methods of processing steel (rolling, welding, casting, etc.) do not realistically permit the preparation of thicker steel structures.

With respect to massive structures which are able to take up large forces, also in tension, conventional reinforced concrete has hitherto been the only candidate material, but its strength, especially in tension, is inferior to the strength of high-strength fibre-reinforced composite and structural steel.

The material according to the invention, CRC, can be effectively used in massive structures of sizes which were hitherto only possible with reinforced concrete, but with mechanical properties—in any direction—more like those of advanced fibre composite (in tension) and structural steel.

This exceptional behaviour of the material of the invention is based on the utilization of novel principles of mechanical behaviour to benefit from an almost neglected knowledge that strong brittle materials fracture in tension after having shown a very small deformation in a narrow zone after maximum stress has been reached, the narrow zone still carrying load.

By fibre-reinforcing the brittle matrix against crack zone deformation and by utilizing the main reinforcement for distribution of crack zone deformations over the entire body, the strain capacity of the body before cracking and the coherence of the entire structure are considerably increased.

The high toughness thereby obtained, together with an extremely good fixation between the fibre reinforced matrix and the main reinforcement make it possible to use a high concentration of main reinforcement, such as 10–40% by volume, to carry the main part of the load. This is not possible in conventional reinforced concrete, where the brittleness of the concrete prevents the use of a high concentration of main reinforcement, thereby limiting the obtainable performance. This limitation has now been completely obviated with the novel CRC structures.

Thus, Examples 1–5 illustrate the performance under high bending load of CRC beams based on Portland cement and reinforced with 6% by volume of steel fibres (6 mm length, 0.15 mm diameter) and deformed steel bars; these materials show bending capacities of 130–220 MPa (yield values) and strains in tension above 3 mm/m with substantial retention of internal coherence. However, as will be understood from the following, the CRC structures of the invention are not limited to cement-based matrices, but may be made with any other suitable stiff matrix such as, e.g., ceramics for high temperature performance, e.g., to form large ceramic high load-bearing ceramic structures reinforced with thick bars. CRC is not limited to large structures reinforced with millimeter-size bars; new fascinating articles made possible by the invention are ductile fine ceramic-based articles in which the matrix A is reinforced with 1–10 μm diameter whiskers and the main reinforcement B is 0.2–1 mm diameter threads.

CRC Structure—Function

A typical CRC structure is shown in FIG. 1, which illustrates the main principle with a heavy main reinforcement 1 embedded in a fibre reinforced matrix 2 which is strong and very rigid, but also very ductile, in spite of the fact that the matrix material itself is typically hard and brittle. Under loading, CRC functions as a composite structure in which the main reinforcement and the matrix together resist loads, and the matrix additionally distributes forces between the reinforcement components. Thus, e.g., the CRC beams illustrated in Examples 1–4 herein resist loads in almost the same way as conventional reinforced concrete: pressure load is predominantly carried by the "concrete" (the fibre reinforced matrix), and tensile load is predominantly carried by the reinforcement, the "concrete"

transferring forces between the reinforcement components.

Figure 2:
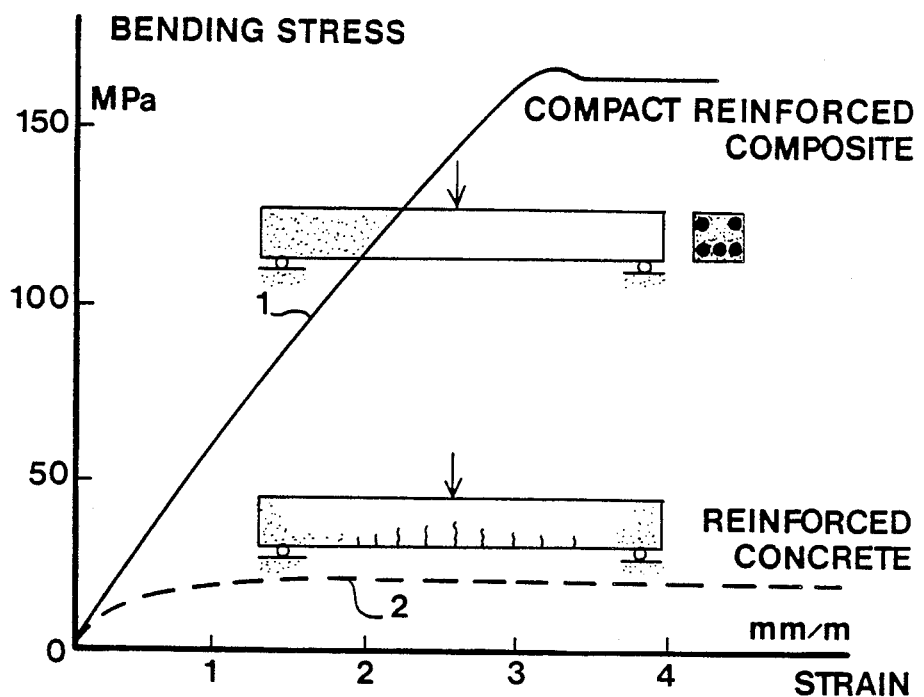

However, CRC is able to resist much larger loads than conventional steel-reinforced concrete, such as illustrated in FIG. 2, which shows the behaviour in bending of a CRC beam (curve 1) and a beam of conventional good steel-reinforced concrete (curve 2), expressed as normalized bending stress versus normalized strain to enable the comparison. The normalized bending stress is calculated by dividing the moment by the section modulus. The normalized strain corresponds to the maximum strain in a similar, homogeneous beam with ideal, linear elastic behaviour. The yield load of the CRC beam is about 10 times larger than the yield load of the reinforced concrete. The high tensile capacity of the CRC beam was obtained by incorporating a high content of good steel reinforcement (12.1% by volume) in the tensile zone of the beam.

This would seem to be quite a normal function of the main reinforcement, apart from the fact that the amounts of reinforcement are far larger than the normal amounts. However, if it is attempted to incorporate such large amounts of reinforcement in ordinary concrete, the system fails, because concrete does not have the necessary strength and toughness to co-operate with the main reinforcement under such high concentrated forces.

Figure 3A:
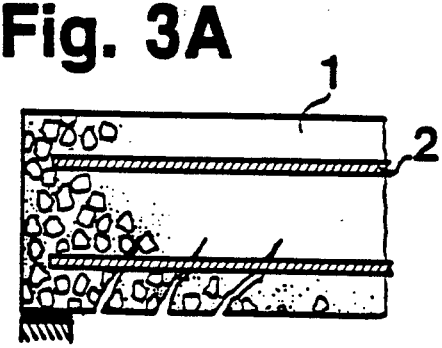
Figure 3B:
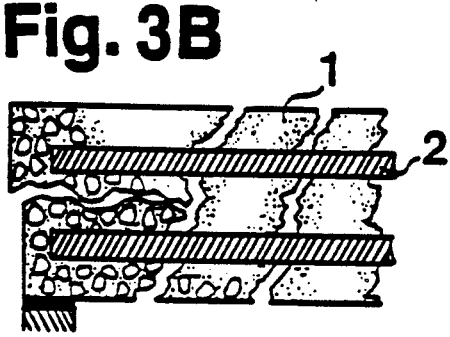
Figure 3C:
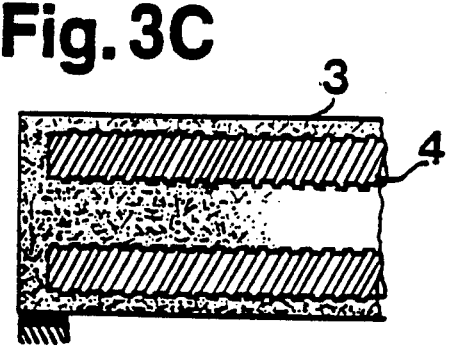

These problems associated with reinforced ordinary concrete are illustrated in FIG. 3, in which A shows the behaviour of conventional reinforced concrete in bending, where the tensile load is carried by the main reinforcement 2, the concrete 1 being cracked, but with controlled, acceptable cracks. The amount of reinforcement is moderate, the concrete quality is normal, and the load capacity is correspondingly moderate. B shows an attempt of utilizing a higher amount of reinforcement to increase the load capacity of normal reinforced concrete, utilizing additional reinforcement also in the compression zone in an attempt to prevent compression failure and possibly also utilizing a very strong concrete: the consequence of this is that a large amount of cracks occur in the heavily loaded matrix material 1, possibly resulting in total failure. The matrix material is not able to follow the tensile deformation of the reinforcement and therefore cracks, and because of the high internal force concentrations, the crack pattern is not moderate and acceptable such as for conventional reinforced concrete. These problems have now been overcome by CRC, illustrated by C in FIG. 3, in which a very strong and very ductile matrix 3 now permits the effective utilization of very high concentrations of strong reinforcement 4 which in the CRC structure—contrary to the adverse effect in conventional reinforced concrete—actively contributes to secure a high degree of internal coherence with a substantially crack-free matrix at loads up to yielding of the reinforcement.

Due to the unique behaviour of the CRC structure, as explained in greater detail in the following, the invention provides completely new possibilities of constructing large bodies with very high load capacities adapted to specific requirements by means of reinforcement systems with very dense arrangement and very concentrated reinforcement anchoring.

The invention may be defined as a shaped article comprising a matrix (A) with a reinforcement (B) embedded therein, the matrix (A) being a composite structure comprising a based matrix (C) which is reinforced with fibres (D). The fibres D are present in a high volume concentration of at least 2%, typically at least 4%, often at least 6%. The main reinforcement B is present in a high volume concentration of at least 5%, typically about 10-20% or even higher. An essential feature of the invention is that the article has a high stiffness in any direction and is able to resist large compressive stresses. Thus, the article (or the matrix A or the base matrix C) has a modulus of elasticity of at least 30,000 MPa and a compressive strength of at least 80 MPa.

The invention may also be defined as a shaped article having a high stiffness and resistance to compression as explained above and built up of a fibre-reinforced matrix with a fibre concentration of at least 2%, typically at least 4% or 6%, with a main reinforcement in a high concentration as explained above, the article showing an excellent performance when in tension as defined by a large tensile strain capacity with substantial coherence of the article, the tensile strain capacity being at least 0.5 mm/m, typically 2-5 mm/m, and/or a large tensile load capacity corresponding to a tensile load capacity of at least 50 MPa under conditions of substantially elastic behaviour, at least 70 MPa under yielding, and at least 120 MPa under ultimate loading, the load capacity values typically being 1.5-3 times higher than the minimum values stated above.

A special aspect of the invention may be defined as a structure comprising the constituents stated above in which the ultimate strain of the base matrix material when present in the matrix A in the article, i.e. when combined with the fibres, is higher than the strain capacity of the same base matrix material measured on a separate specimen of the base material, typically at least 1.5-3 times higher. In conventional fibre-reinforced products, the matrix cracks at almost the same strain as the bulk matrix material.

The invention may also be defined as a shaped article having a high stiffness up to yielding and a yield strain of at least 10 mm/m, typically at the least 30 mm/m, with retention of a high load capacity.

Particular aspects of the invention are CRC articles based on cement. The combination of the constituents of such materials, i.e. the main reinforcement and the matrix-forming ingredients, is distinct from the known art. Thus, these aspects may be defined by referring to their constituents.

The physics behind the behaviour of the CRC structure, e.g., how a strong, hard matrix material is made capable of conferring the unique combination of high load capacity, high stiffness, and large internal coherence to composite material, is explained in the following.

PHYSICAL PRINCIPLES OF THE INVENTION

To prepare reinforced composite materials showing a behaviour as described above with strong, but brittle matrix materials like ceramics, glass, and very strong cement-based materials has not hitherto been possible.

The chemical structure of such strong brittle solids which are typically bonded by strong directional chemical bonds (covalent, ionic) does not allow yielding like in metals.

The only way to improve brittle materials seems to be to reinforce them with strong tensile members which can provide tensile strength and ductility.

It is known in the art to reinforce strong fine ceramics and other strong brittle materials with very fine strong fibres, such as strong 2-10 μm diameter whiskers. Hereby, materials with improved tensile properties and improved ductility are obtained. However, such materials are not suitable for larger members, as they would still show an extremely brittle behaviour in spite of these improvements.

To achieve the ductility desired for larger structures, a far thicker reinforcement, such as 5-25 mm diameter steel bars, is required.

Due to the low tensile strain capacity and the brittleness of the strong matrix material, a concept of a high performance structure based on strong brittle matrices and large (thick) reinforcement seemed, however, doomed to fail and has hitherto never been realized. The brittle matrix would simply crack into pieces when strained together with the reinforcement (if it had not already been destroyed by thermal stresses during production).

In conventional reinforced concrete, large reinforcement is indeed used, but conventional reinforced concrete is not a high performance material (only a low concentration of reinforcement can be utilized, the tensile zones are typically heavily cracked, etc.).

With the present invention, high performance structures based on reinforcing strong, brittle materials with a high concentration of thick reinforcing bars have become a reality.

The invention is based on the recognition of what really happens locally in the fracture zone of brittle materials, and how these recognized phenomena can be utilized.

Crack Zone Deformation

Figure 4:
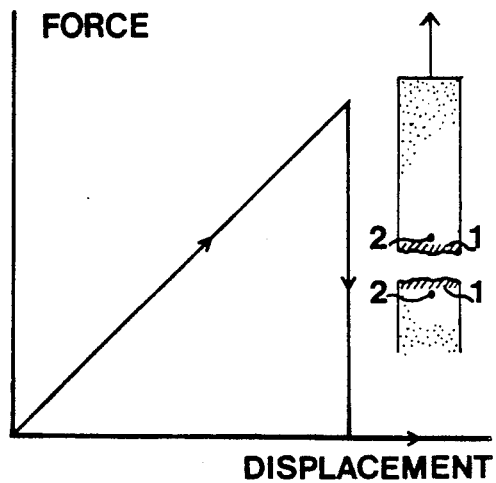

When a brittle material like glass, e.g., in the form of a large rod, fractures in tension, it happens very suddenly after a substantially elastic deformation up to ultimate load, such as illustrated in FIG. 4, where a crack zone 1 and fictitious measuring points 2—2 for measuring the thickness of the crack zone are shown.

If, however, in the same experiment, the deformation is measured over a very narrow zone in which the actual separation takes place, a quite different situation is observed.

Figure 5:
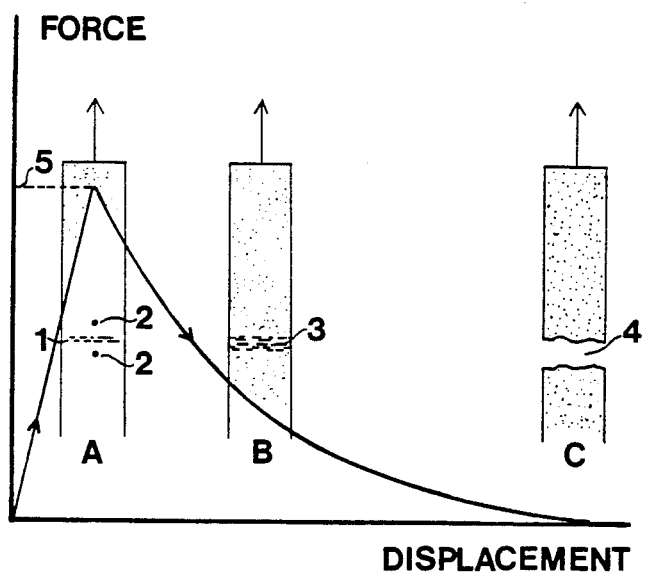

This is illustrated in FIG. 5, which illustrates the behaviour of the crack zone 1 (corresponding to zone 1 in FIG. 4) showing the force versus the displacement of the zone in the direction of the force. The displacement refers to the change in thickness of the zone indicated by fictitious measuring points 2—2, corresponding to the measuring points 2—2 in FIG. 4. The force is drawn in the same scale as in FIG. 4, but the scale of the displacement is enlarged (e.g., so that when 1 cm in FIG. 4 corresponds to 1 mm, 1 cm in FIG. 5 corresponds to 1 $\mu$m).

The small zone 1 first deforms elastically up to maximum load. Then, at the start of crack zone deformation (A), the force curve does not drop immediately, but rather decreases over a longer distance, showing that the crack zone is still able to carry tensile load (B). Only after a deformation which seems large in this scale (the crack zone deformation), real separation occurs (C). In other words, during this deformation after maximum load and until the real separation occurs, the crack zone consists of a coherent material which is able to carry tensile load and to perform a kind of plastic work.

Crack zone deformations are very small. In concrete, they are about 20-50 $\mu$m, in conventional cement paste, they are 2-10 $\mu$m, in strong cement/microsilica paste, they are 0.5-1 $\mu$m, and in glass, they are only about 0.001-0.01 $\mu$m.

As appears from these values, the crack zone deformations of very strong, brittle materials (which are of special interest for the structures of the invention) are extremely small, typically below 1 $\mu$m.

While crack zone deformations in concrete have been known for the last about fifteen years, it is doubtful whether crack zone deformation has been recognized for very strong, brittle materials at all, except for predictions and estimates of their magnitude by the present inventor (Bache, H. H., "Concrete in Engineering". Paper presented at the International Congress on Utilization of Materials Know-How in the Engineering Industry, Espoo, Finland, Sept. 10-13, 1985, Bache, H. H., "Fracture Mechanics in Design of Concrete and Concrete Structures". Paper presented at the International Conference on Fracture Mechanics of Concrete—Fundamentals and Applications, Lausanne, Oct. 1-3, 1985, Bache, H. H., "Brudmekanik", Beton-Teknik Mar. 12, 1984).

One reason why there seems to be very little scientific recognition of the crack zone deformations of the hard, brittle materials may be that it is almost impossible to perform a direct detection of these extremely small deformations. Another reason may simply be that no use was seen for such information.

As mentioned above, the present inventor predicted the existence of crack zone deformations in hard, brittle materials, and estimated their magnitude. The estimation was based on the relationship between the predicted crack zone deformation $\Delta$, the fracture energy G, and the tensile strength $\sigma$ $$G \approx \sigma \Delta$$

under the presumption that the fracture work is predominantly due to the fracture zone deformation.

It is, however, these small deformations which are utilized according to the present invention, partly by reinforcing them by reinforcing the crack zones, partly by distributing them over the whole body, thereby obtaining a sort of homogeneous yielding instead of the formation of a single crack resulting in fracture.

Strain Capacity Increase by Utilization of Main Reinforcement

The invention utilizes the main reinforcement for imparting strain capacity increase to the matrix in which the reinforcement is embedded by distributing small crack zones under high load throughout the matrix material, thereby securing a substantially coherent and substantially crack-free structure even under high tensile load.

This principle will now be discussed in greater detail.

Figure 6A:
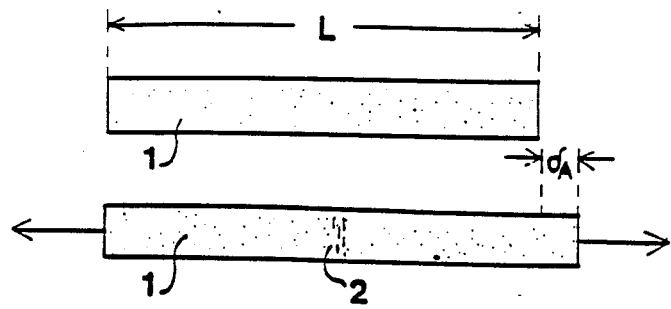
Figure 6B:
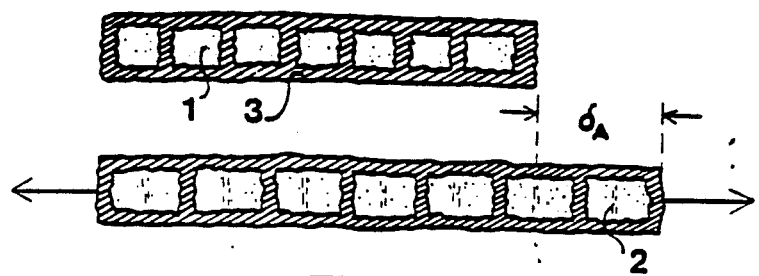
Figure 6C:
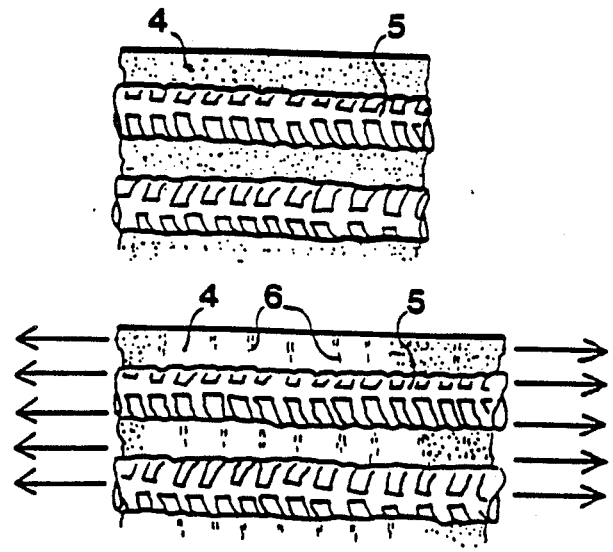

FIG. 6 shows a body A made from a brittle material in unloaded condition and in strained condition just before fracture, respectively. In the strained condition, a single crack zone 2 has developed. The total deformation of the body is equal to the ultimate strain $\epsilon_o$ multiplied by the length L of the body plus the crack zone deformation $\Delta$ of the single crack zone $$\delta = \epsilon_o L + \Delta$$

In large bodies, $L\epsilon_o$ dominates, but when the body becomes sufficiently small (or the crack zones sufficiently large), the crack zone deformation ($\Delta$) dominates. This means that the "apparent rupture strain" (average rupture strain) $\epsilon_t = \delta/L$ increases relative to $\epsilon_o$ of the bulk material, thus resulting in a real increased strain capacity for the specific small body compared to the material in bulk ($\epsilon_o$):

$$\frac{\epsilon_t}{\epsilon_o} = 1 + \frac{\Delta}{L}$$

which may also be expressed by means of a quantity, $EG/L\sigma_o^2$ which is proportional to $\Delta/L$. This quantity which is a measure of ductility is termed ductility number in the following. The reciprocal value $L\sigma_o^2/EG$ which is termed brittleness number is frequently used instead of ductility number. When the ductility number is introduced in the above equation, we get $$\frac{\epsilon_t}{\epsilon_o} = 1 + \frac{EG}{L\sigma_o^2}$$

This means that if a brittle material is placed in a configuration where it is fixed to rigid boundaries and thereby is subdivided into small individual fixed domains (L is small), the strain capacity of the material will be increased.

FIG. 6 B illustrates the situation where the brittle material has been fixed to a rigid frame 3 which divides the material into several (n) smaller domains. When the frame with the smaller domains is strained, several small crack zones develop (one crack zone in each domain) develop before any crack is opened. This means that the total deformation is now $$\delta = \epsilon_o L + n\Delta$$

In other words, by the subdivision, the contribution from the crack zone deformation to the total deformation is increased by a factor n. This is what is obtained in CRC materials where the densely arranged main reinforcement acts as a the stiff frame that subdivides the matrix material into small domains and thus increases its strain capacity when the material undergoes tensile deformation together with the main reinforcement. Evidently, the term subdivides is not intended to indicate that the material is physically divided into separate bodies, but rather that the fixation to the rigid main reinforcement makes the material act, with respect to certain of its properties, as if it were subdivided into small separate bodies. The gist of this principle is that each particular domain in the material is fixed to the rigid main reinforcement in such a manner that the material will not be able to move so much that a crack can be opened. This is the situation illustrated in FIG. 6 C, which shows a CRC structure with a reinforcement 5 which acts as the stiff frame which subdivides the matrix prisms adjacent to the reinforcement into small domains, hereby giving to multiple crack zone deformations under tensile load.

In the following, the conditions for obtaining an increase of the strain capacity of the material by utilizing the arrangement and character of the reinforcement to generate such small individual domains of the matrix will be discussed.

(1) In a material with a smooth reinforcement in a low concentration, there is substantially no fixation of the matrix material. No subdivision of the matrix in small volumes is obtained because (a) there is a risk of sliding along the reinforcement and (b) cracks are not stopped (even if the fixation had been good) when the concentration of the reinforcement is low, because the crack may pass the reinforcement.

(2) With rough or profiled reinforcement in low concentration, the conditions are perhaps somewhat improved, as sliding becomes more difficult, but the crack may still pass the reinforcement and the desired effect with small discrete tightly fixed volumes is not obtained.

The above situations are typical for known art steel reinforced concrete where high reinforcement concentrations (above 5%) are rare.

(3) With a high concentration of well distributed reinforcement and simultaneously a good fixation of the matrix to the reinforcement, the matrix is "divided" into small fixed volumes of a size of the same order as the diameter of the reinforcement.

It is essential that the reinforcement is evenly distributed so that the thickness of "the matrix prisms" between the main reinforcement bars is small (typically of the same order as the diameter of the bars).

An essential feature is that the matrix should be very well fixed between the very densely arranged reinforcement, thereby being able to obtain the strain capacity increase.

In order to achieve this, the following is desired:
(1) A densely arranged reinforcement, typically with a concentration larger than 5%. Thus, according to the invention, it is preferred that the reinforcement (B) is present in a concentration larger than 5%, preferably larger than 7%, more preferably larger than 10%, still more preferably larger than 15%, still more preferably larger than 20%, still more preferably larger than 30% and most preferably larger than 40% by volume.

The reinforcement will often not be evenly distributed over the cross section of the article to be reinforced, but will rather often have a higher concentration in the zone which becomes the tension zone when load is applied to the body than in the zone which is subjected to compression. However, also in the zone subjected to compression, reinforcement should often be incorporated so that the shaped article will not fail due to rupture in the compression zone. Beams with reinforcement also in the compression zone are illustrated in Examples 1–5.

(2) A reinforcement which is capable of fixing the matrix material, for example by roughness, profiling and good chemical affinity, and a matrix specially suitable for fixing the reinforcement, such as the high fibre loaded matrix used in Examples 1–7.

Fixation of Reinforcement

For CRC to act as a strong, ductile composite structure, it is essential for the matrix material to be very strong and rigid, but also to act in a ductile manner and to be intimately fixed to the main reinforcement, and it is also essential to ensure that the main reinforcement acts as a spatially stable, stiff frame.

The ductility of the matrix material (which in itself is very rigid) is ensured by fibre reinforcement.

The fixation of the matrix to the main reinforcement is ensured by using strong, stiff matrix materials that are given high ductility, together with a useful shape of the main reinforcement (e.g. with circular cross section and deformed and rough-surfaced).

Spatial stability is ensured by geometrically suitably arranged reinforcement tightly fixed by matrix material.

In many cases, transverse reinforcement can be omitted altogether even under shear loads where similar structures of conventional reinforced concrete would be provided with transverse reinforcement, because the large shear forces can be transferred by the strong, rigid, ductile fibre reinforced matrix such as demonstrated in Examples 1-4.

In order to transfer very large shear forces or large tensile forces perpendicular to the main reinforcement, it is desirable to make extensive use of transverse reinforcement. A special aspect of the invention is special arrangements of transverse reinforcement made possible by the unique ability of the matrix material to tightly fix reinforcement consisting of short straight bars arranged transversely to the longitudinal main reinforcement, the bars being efficiently fixed at very short length at their ends.

Good interaction between reinforcement and matrix depends on the matrix material being able to follow the deformations of the reinforcement as a coherent load-bearing material.

For systems with extreme brittleness, internal coherence requires that the strains in the matrix close to the reinforcement never exceed the ultimate strain of the matrix material in bulk:

$$\epsilon < \epsilon_o$$

For systems with ductility, the requirement concerning internal coherence according to the principle of utilizing crack zone deformation is that the local deformation of the matrix is smaller than the crack zone deformation of the material:

$$\epsilon D < \Delta_o$$

In CRC, high concentrations of main reinforcement are used, normally in parallel arrangement—a configuration which in a normal concrete matrix would involve a high risk of matrix splitting along the reinforcement, especially as the binder materials are usually extremely strong and brittle. These tendencies are counteracted by introducing a high ductility by effective fibre reinforcement. This is illustrated in FIG. 7.

Figure 7:
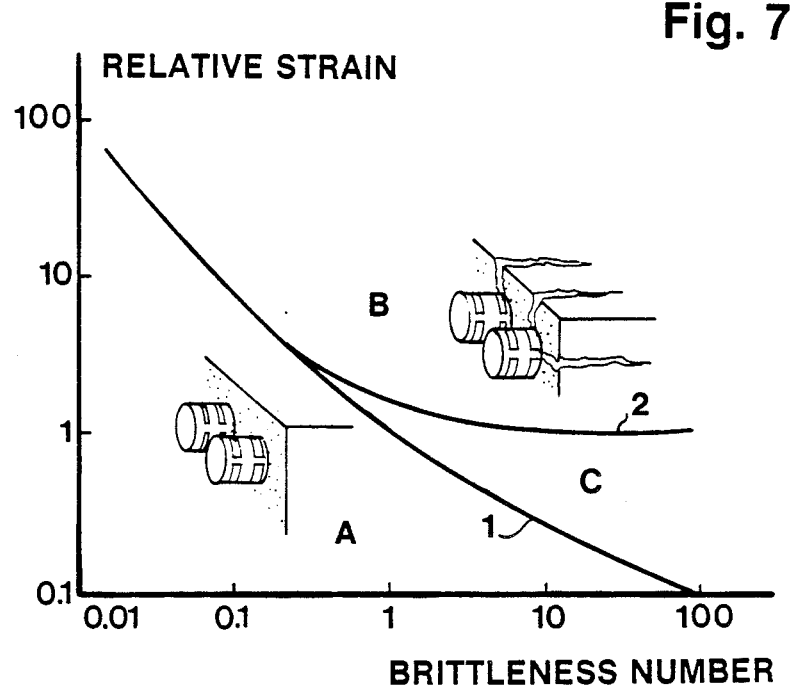

FIG. 7 illustrates crack behaviour when a cylinder (e.g. a reinforcing bar) of diameter D expands (or the matrix contracts) in a matrix material with tensile strength $\sigma_o$, tensile strain just before crack $\epsilon_o$, modulus of elasticity E and fracture energy G. The expansion of the cylinder (relative to the matrix), $\epsilon$, is shown relatively to the tensile strain just before crack, $\epsilon_o$. The abscissa is the brittleness number $$\frac{\epsilon_o d}{\Delta} = \frac{\sigma_o^2 D}{EG}$$

wherein $\Delta$ is the crack zone deformation.

1 shows a curve for a system in which there was an initial defect (a crack) which developed further by overloading while 2 is a curve for a system which did not have any initial crack defects. In the area A, the matrix remained non-cracked, in the area B, the matrix cracked. The area C is the area representing systems with initial cracks smaller than the initial cracks referred to in connection with curve 1.

In CRC, high ductility—low brittleness numbers—is ensured in connection with fixation of the main reinforcement by means of very effective fibre reinforcement, whereby the fracture energy of the matrix (G) is increased by a factor of about 100 compared with that of non-reinforced material.

The expression for the brittleness number ($\sigma_o^2 D/EG$) shows that the brittleness can be reduced (ductility increased) by using smaller reinforcement dimensions (D), increasing the stiffness (E), and increasing the fracture energy (G).

Figure 8:
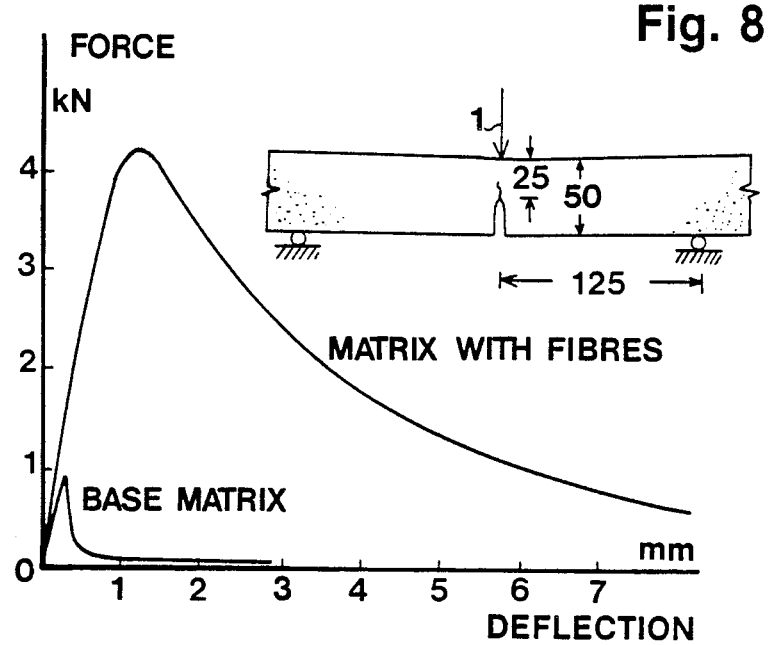

In CRC, ductility in connection with fixation of main reinforcement is primarily obtained by substantially increasing the fracture energy of the matrix material through a high concentration of fine, strong, stiff fibres. The fracture energy (G) is thereby increased considerably, e.g. by a factor of more than 100 as illustrated in FIG. 8 which shows graphs from Example 1. The beams were subjected to a force as indicated by an arrow 1. The graphs illustrate the relationship between force and deflection of the beams. The beam dimensions shown are in mm. The width of the beams was 50 mm. The fracture energy (G) in the non-reinforced matrix material and in the fibre-reinforced matrix material of Example 1 (6 vol % of steel fibres having a length of 6 mm and a diameter of 0.15 mm), calculated as work performed (area below the force/load curve) divided by the respective crack areas, were 130 N/m and 13,000 N/m, respectively.

It is to be noted that the increase in fracture energy using fibres should be obtained in such a manner that the toughness obtained is one which manifests itself under small deformations, as opposed, e.g., to a toughness of the same fracture energy level, but manifesting itself under large deformation at low stress, such as would be the case with traditional fibre reinforcement with large, thick fibres.

To avoid micro-fracture in base matrix surrounding the fibres it is essential to build up micro-ductility as well. Local ductility around the individual fibres is, according to the concept of brittleness number, ensured by using fine, very stiff fibres in a stiff base matrix with a high fracture energy. The fibre dimension will often be a compromise between the desire for fine reinforcement for the purpose of ensuring the above-mentioned local ductility and the desire for large fibres to ensure ductile behaviour during macro-failure and for production reasons.

Another important and surprising aspect also based on the utilization of the concept of brittleness number is the use of very stiff base matrix as a means of creating a high ductility. The stiffness of the base matrix is increased by increasing the volume of aggregate (in systems where the aggregate is stiffer than the binder) and by using aggregates of materials with a higher modulus of elasticity. Increasing the volume of strong aggregates has a beneficial effect besides increasing the stiffness in that it reduces the quantity of binder material required, whereby the material becomes less sensitive to deformation and gets a higher fracture energy.

In accordance with the foregoing, a high concentration of coarse quartz particles was used in the cement-based CRC beams in Examples 1-4, which gave the matrix material a high modulus of elasticity (E≃50,000 MN/m$^2$) and a relatively high fracture energy (G≃100 N/m).

The stiffness—and the fracture energy—can be increased still further by using stronger particles such as refractory bauxite (rich in Al$_2$O$_3$). Thus, matrix material with Al$_2$O$_3$-rich sand having a modulus of elasticity of about 70,000 MPa is used in Example 6 and has been reported in "Densified Cement/Ultrafine Particle-Based Materials" by Bache, H. H., paper presented at the Second International Conference on Superplasticizers in Concrete, Ottawa, Canada, June 10–12, 1981, in the following referred to as "Ottawa Paper".

Increasing the Strain Capacity of the Matrix Material

In one aspect, the invention relates to reinforced structures with a particular main reinforcement arranged in a matrix material, the strain capacity of which (the strain at which formation of matrix cracks just begins) has been increased by a special fibre reinforcement. This is illustrated in FIG. 9 which shows the tensile behaviour of reinforced brittle materials in general.

Figure 9:
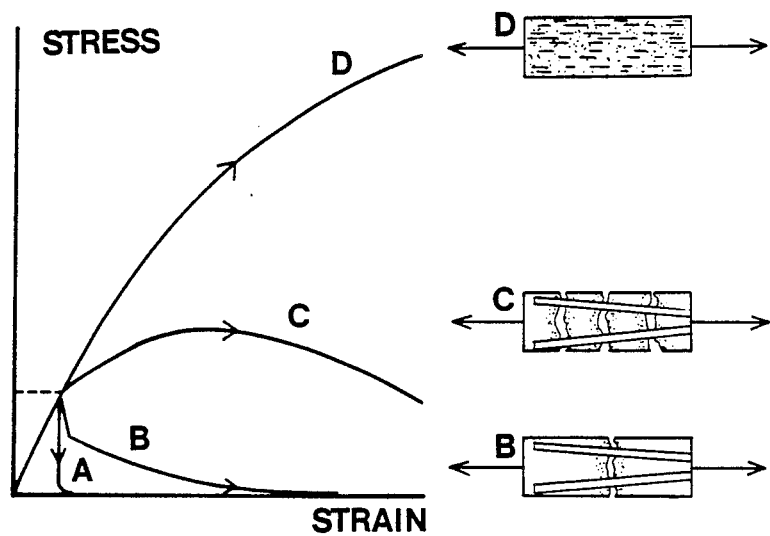

In FIG. 9, A illustrates the behaviour of a non-reinforced specimen (shaped as a rod), under tension.

When identical specimens, but with reinforcement, e.g. bars or fibres, arranged in the direction of the tension are subjected to tension, the matrix will, in the normal case (B and C), rupture at the same strain as the non-reinforced matrix. After the rupture, the load is carried by the reinforcement.

Thus, the systems do not differ with respect to strain capacity (considered from the point of view of the matrix). The difference between the systems is that the average stress at which the matrix ruptures is another (the stress is larger if the reinforcing material is stiffer than the matrix material and smaller if the reverse applies) and that the reinforced material is capable of carrying loads also after the rupture formation in the matrix, the load being carried through the reinforcement across the cracks.

For materials such as cement mortar and concrete, the ultimate tensile strain at which the matrix cracks is about 0.1 to 0.2 mm/m.

In the following, the effect of incorporation of fibres will be discussed, exemplified by the behaviour of cement/concrete systems:

As illustrated by curve A in FIG. 9, a non-reinforced mortar or concrete matrix will crack in a brittle manner after developing a single crack. By incorporating short fibres in a concrete (or mortar) matrix, a different behaviour is obtained. The material cracks at deformations more or less corresponding to the ultimate tensile strain of a corresponding matrix not reinforced with fibres, but the behaviour after the crack formation is different.

With a moderate reinforcing effect, typical of conventional fibre reinforced concrete, as illustrated by B in FIG. 9, the reinforcement is not capable of transferring as much load as the non-cracked concrete, but the material is still coherent—reinforced with fibres across the cracks. The material will typically develop a single or a few cracks only.

With better fibre reinforcement (more fibres, better adhesion between fibres and matrix etc.) which ensures transfer of larger forces in the fibres across the cracks than in the non-cracked concrete, multiple crack formation takes place, as illustrated by C in FIG. 9. This behaviour is not very often obtained in normal fibre reinforced concrete and mortar, but is in fact obtained in special materials such as glass fibre reinforced thin sheets.

The behaviours discussed above represent "normal known behaviour" for fibre reinforced mortar and concrete and all have the common feature that the matrix starts to crack at largely the same strain as the non-reinforced concrete. The crack passes both main reinforcement and fibres. This is the generally accepted behaviour of reinforced brittle materials with matrix materials having a strain capacity which is much smaller than the strain capacity of the reinforcement. In fact, in connection with cement/steel systems, the ratio between the strain capacity of the steel and the cement is larger than 20:1 and in many cases also larger than 40:1.

However, with very special combinations of fibres and matrix it is possible to violate this "law" and obtain a genuine increase of the strain at which crack formation in the matrix takes place, as shown by D in FIG. 9 and discussed in the following.

This genuine increase of the strain is directly related to the phenomenon of crack zone deformation explained above. The tensile stresses over the deformed crack zone (which later becomes the crack, but which has not yet cracked) are smaller than the maximum stress, i.e. the large deformations take place only after the maximum stress has occurred, such as explained above in connection with FIG. 5.

If—contrary to what happens in the known materials—the large deformation could take place before the maximum stress had been reached, the behaviour would be completely different, as the "yielding" would spread out over the entire body before maximum load and fracture. This is illustrated in FIG. 10.

Figure 10:
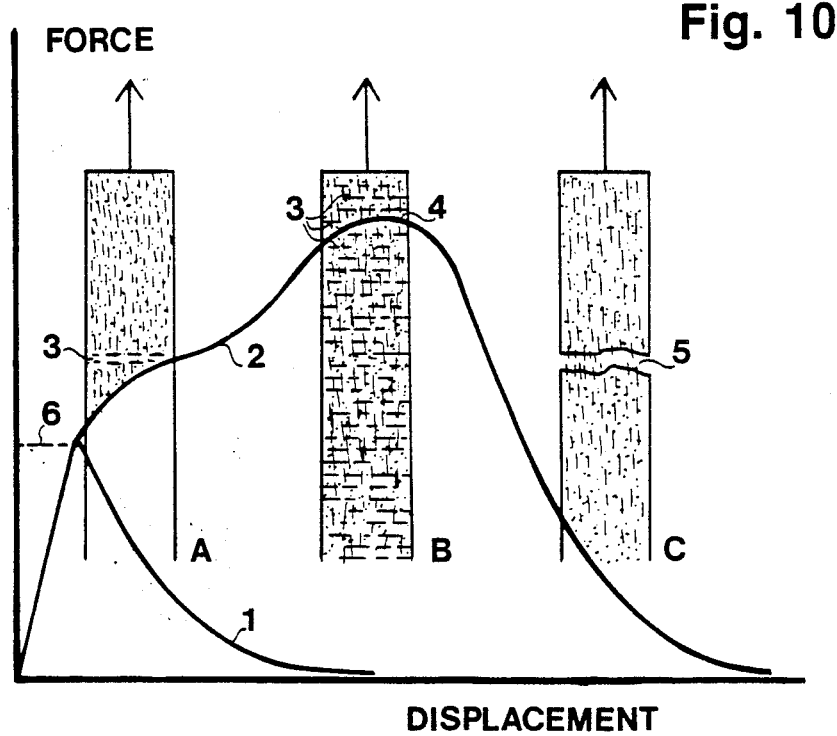

In FIG. 10, a curve 1 illustrates the normal behaviour of a brittle material under tensile load. In accordance with what was explained in connection with FIG. 5, the material first deforms elastically up to maximum load 6 where the first crack zone (3) develops. Then, the force curve decreases with increasing displacement until separation occurs.

Curve 2 illustrates a completely different, and very desirable, behaviour for a brittle matrix material with an adequate fibre reinforcement according to one of the principles of the invention: Because the matrix material is adequately reinforced over the crack zone, the behaviour at the tensile load 6 which corresponds to the maximum load of the non-reinforced matrix is completely different: instead of a decrease of the force curve, there is an increase because the combined tensile load-carrying ability of the crack zone of the matrix and the fibres reinforcing the crack zone is greater than the maximum load-carrying ability of the non-cracked bulk matrix material. Therefore, new crack zones will develop, and the course of the force/displacement curve will be increasing (as shown by 2), representing an increasing degree of the fibres in the multiple crack zones carrying the load until the situation (4 and B) where reinforced crack zones have developed throughout the material and the ultimate load has been reached. Then, fracture of the matrix occurs in one of the crack zones, the fibres reinforcing the crack zone still carrying tensile load during an additional displacement (C).

Such a flavourable behaviour is known from metals which show plastic yielding in shear before fracture, where structural rearrangements create the so-called strain-hardening.

As will be understood from the discussion of FIG. 10, curve 2–4, it is possible to create a similar "strain-hardening" by reinforcing the fine "soft" crack zone in such a manner that the fibres take over so much load that the stress in the crack zone before formation of the crack now exceeds the stress at which the soft crack zone starts to develop (which largely corresponds to the maximum stress for the non-reinforced matrix material).

Thus, according to this aspect of the invention, the complete matrix material (the base matrix (C)) is reinforced so that material which "intends to crack" will atll the time meet the strain-hardened reinforcing mechanism with the result that a new zone is deformed, the end result being that there is a through-going evenly distributed, larger strain. In the following, the mechanism is designated "strain-hardening".

It was known to increase the strain capacity of a cementitious material by means of fibres in certain special products such as high quality asbestos cement pipes produced by spinning techniques. However, it was not known to combine such structures with main reinforcement using the strain-hardenable material as a special concrete together with a special arrangement of main reinforcement.

Hence, in this aspect, the present invention relates to a shaped article comprising a matrix (A) with a reinforcement (B) embedded therein, the matrix (A) being a composite structure comprising a base matrix (C) which is reinforced with reinforcing bodies (D) such as fibres whereby the strain capacity of the matrix (A) is increased over that of the base matrix (C) so that the ratio between the strain capacity of the matrix (A) and the strain capacity of the base matrix (C) is at least 1.2, preferably at least 1.5, more preferably at least 2, still more preferably at least 3, still more preferably 5, still more preferably 10, still more preferably 20, still more preferably 50, and most preferably at least 100.

This increase of the strain capacity of the matrix (A) over that of the same, but reinforced matrix material (C) may be obtained by a special fibre arrangement (the traditional "coarse" reinforcement known in connection with concrete and mortar combined with usual concrete materials will be completely incapable of creating such a "strain-hardening" effect).

To facilitate the discussion of the special fibre arrangement, theoretical criteria (developed by the inventor in non-published work and being in close agreement with theoretical model developed by Aveston, Cooper, and Kelly, (Aveston, J., G. A. Cooper, and A. Kelly, "Single and Multiple Fracture", in: Proceedings, the Properties of Fibre Composites, National Physical Laboratory, November 4, 1971, pp. 15–16)) will be used. These criteria were developed for materials reinforced with cylindrical fibres arranged parallel with the direction of tension.

In a simplified form, the conditions for obtaining the desired "strain-hardening" is that:

$$\frac{\phi^2 G_m E_f \tau}{\sigma_m^3 d} > \text{constant (approximately 1/12)} \quad (I)$$

or $$\frac{\phi G_m E_m \tau}{\sigma_m^3 d} > \text{constant (approximately 1/12)} \quad (II)$$

wherein $\phi$ is the volume concentration of the fibres, $G_m$ is the fracture energy of the base matrix (C), $E_m$ is the modulus of elasticity of the base matrix material (C), $\tau$ is the shear stress at sliding between fibre and matrix (C), $\sigma_m$ is the tensile strength of the base matrix (C) and $d$ is the fibre diameter.

The larger the above ratio (I) or (II) is, the more pronounced is the strain-hardening effect. The ratio (I) or (II) should preferably be larger than 0.1, more preferably larger than 0.3, still more preferably larger than 1, still more preferably larger than 3, still more preferably larger than 10, still more preferably larger than 30, still more preferably larger than 100, still more preferably larger than 300, and most preferably larger than 1000.

These models are simplified, i.a. by assuming that the fibre concentration is low (i.e. below approximately 10%) and that the fibres are oriented in the direction of the applied tensile force. At higher concentrations and with other fibre orientations, the behaviour will still be of the same general nature, but the expressions will be more complicated.

The first model (I) is the more useful when the matrix is stiffer than the fibres (the product of the fibre elasticity modulus and the fibre concentration), whereas the second model is the more useful for systems with higher fibre stiffness.

For, e.g., the materials in Examples 1–7, it is best to use the first model (I) (for soft fibre) even though the steel fibres used would appear "very stiff", having a modulus of elastticity $E_f = 2.1 \times 10^{11} \, N/m^2$. The reason for this is that the modulus of elasticity of the "concrete" is also very large. For example, at a fibre concentration of 0.06:

$$E_m = 5 \times 10^{10} \, N/m^2$$

$$E_f = 2.1 \times 10^{11} \, N/m^2$$

$$\phi = 0.06$$

$$E_f \phi = 1.3 \times 10^{10} \, N/m^2$$

The expressions stated above give valuable information as to (1) why the strain-hardening mentioned above does not occur in known art matrix materials used in reinforced structures (for example steel reinforced concrete or steel reinforced concrete with fibre reinforcement in the known art), (2) why it is at all so difficult to establish this strain-hardening (even in special products), (3) which parameters are decisive of obtaining the desired effect, and (4) how the effect is utilized to construct the matrix materials used according to the invention.

DEFINITIONS

Matrix and Reinforcement

The present specification refers to the concepts matrix and reinforcement, these concepts being used in various contexts.

In a classical steel reinforced concrete beam, the concrete will typically be designated the matrix of the system, and the steel bars with diameters of several millimeters which are incorporated to carry the tensile load will be referred to as the reinforcement, the beam being referred to as the reinforced structure.

In connection with the description of the structure of the materials according to the present invention, where a matrix material (such as Portland cement-microsilica-based mortar) is reinforced with short fine fibres (e.g. fibres of length 6 mm, diameter 0.15 mm) and, in addition, has heavy steel reinforcement (e.g. bars of diameters 8 mm to 25 mm), the following designations are used:

1. The matrix material is designated the base matrix (C)

2. The base matrix with the fine fibres therein is referred to as the fibre reinforced matrix or, for brevity, as the matrix (A).
3. The fine fibres are referred to as bodies (D) or fibres (D) or matrix reinforcement.
4. The heavy steel bars are referred to as the main reinforcement or the structural reinforcement or, for brevity, the reinforcement (reinforcement (B)).

In most cases, these concepts will not give rise to any interpretation problems.

If the components reinforcing the matrix are elongated with a ratio between length and the largest transverse dimension larger than about 10, and if the components are straight or have only a slight curvature, these components are designated fibres.

The main reinforcement—the reinforcement (B)—will normally be in the form of bars or wires—typically with profiled surface and roughness, but also other shapes known from profiled steel (I or U shaped) are known.

The main reinforcement is substantially larger than the matrix reinforcement, typically having a transverse dimension (in case of reinforcement with elongated cross section, the transverse dimension refers to the shortest transverse dimension) which is at least five times as large, and very often more than 10 or 100 times as large as the transverse dimension of the matrix reinforcement.

The matrix reinforcement may be continuous (wire, web, net, etc.), but will, in most cases, consist of short components (chopped fibres, whiskers, etc.).

The matrix reinforcement will normally be thin with transverse dimensions less than 1 mm, often less than 0.32 mm, and, for fine particle systems or other systems where the advantages of very fine reinforcement of less than 50 μm may be utilized, in special cases less than 10 μm and in extreme cases less than 1 μm.

The matrix reinforcement may consist of combinations of different reinforcing components.

The main reinforcement will normally have a transverse dimension of 5 to 20 or in certain cases to 50 mm or even more in CRC structures with cement-based base matrix C, but may, in special cases, by considerably smaller—for example when the matrix is an ultra fine particle-based base matrix containing whiskers, such as "down-scaled versions" of the concrete-like structures illustrated in the examples. Thus, structures with main reinforcement of a diameter of 0.2-5 mm based on a matrix with very fine particles and fibres are also interesting structures according to the invention.

Cracks and Crack Formation

Cracks and crack formation are of decisive importance in the present invention, and these concepts are used at several occurrences in the description of the invention.

However, the concept "crack" being a broad concept, the usage in the present specification needs to be defined:
1. A crack in a body is here defined purely mechanically: as a domain which is not capable of transferring load (tension). To avoid misunderstandings, it should be noted that the term cracks, in the contenxt of the present specification and claims, means narrow zones (formed by separation of material) which cannot transmit tensile forces acting at right angles to themselves, and whose extent in their own plane is large in relation to a reference length. Here, a crack is thus defined purely mechanically (lack or ability to transmit forces) and a size criterion is attached to the definition.

Thus, when a crack-free fibre-reinforced matrix is referred to, it means a fibre-reinforced material in which there are no base matrix cracks propagating past the fibre reinformcement and in which any cracks present are smaller than the distance between the fibres or at the most of the same size as the distance between the fibres.

The concept of "cracks passing the reinforcement" or "cracks not passing the reinforcement" plays an essential role in the characterization of the present invention.

It is an important aspect of the invention that the articles of the invention can perform, even under very large loads, without showing cracks passing the reinforcement.

In the context of the present definition, "reinforcement" to the main reinforcement (such as 8 mm steel bars used in the beams in Example 1).

As the structures according to the invention also contain matrix reinforcement in the form of fibres which reinforce the base matrix (such as steel fibres of a length of 6 mm and a diameter of 0.15 mm as used in Example 1–7), it is important to note that there are two possible types of cracks passing (or not passing) the main reinforcement: one type being a complete crack where the fibres of the matrix are broken or pulled out so that no tensile forces at all can be transferred across the crack by the fibre-reinforced matrix. The other type of crack is a base matrix crack passing fibres which are still able to transfer load across the crack.

Whenever the present specification refers to cracks passing (or not passing) the reinforcement, the "cracks" include both types of cracks, in other words, both cracks which are no longer able to transfer load across the cracks, and cracks which do pass fibres, but, due to the fact that the fibres are not pulled out, are still able to permit the transfer of load across the cracks.

It is known in the art to have systems with cracks passing the main reinforcement, these cracks being capable of transferring load because the matrix is also reinforced with fibres. Examples of such systems are steel fibre-modified reinforced concretes. It is known that in spite of the fact that the matrix cracks of these known systems may still be able to carry some load, the systems will often show a rather poor behaviour.

This may typically be the case when the matrix cracks are of considerable thickness (for example 0.5 mm up to perhaps 2-5 mm, the two sides of the cracks still being interconnected by long fibres of for example 10-50 mm). Such systems typically show a poor durability, for example because they allow mass transfer into the main reinforcement (for example transfer of water and oxygen, thus causing corrosion of the reinforcement).

An important aspect of the present invention is that the special combination of base matrix, fibres and main reinforcement increases the strain capacity before base matrix cracks pass the main reinforcement to far beyond the strain capacity of the fibre reinforced base matrix in bulk, thereby securing an exceptionally good crack-free behaviour even at very large loads.

However, the invention is not limited to systems in which no base matrix cracks pass the main reinforcement.

In fact the unique fibre reinforcement of the matrix used according to the invention with a very high concentration of typically very fine, rigid, strong fibres ensures that base matrix cracks passing the main reinforcement (such cracks occurring at very high loads) are kept very small over a broad strain range. Materials of the invention which have been subjected to loads causing base matrix cracks of thicknesses of e.g. 5–10 μm passing the main reinforcement perform excellently in many cases and thus, represent fascinating new phenomena combining a large internal coherence with rigidity under extreme load conditions.

A crack passing the reinforcement may propagate as a single crack observed as a single through-going crack in a cross section perpendicular to the crack except for the reinforcement and fibres passing the crack.

However, in many cases, the cracks are subdivided and are not observed in the same manner as single through-going cracks in a cross section, but rather as several discrete cracks which are apparently not through-going. However, if the cracks are interconnected in such a manner that a hypothetical body in which all reinforcement (main reinforcement and fibres) were removed is substantially incapable of transferring the tensile load (perpendicular toi the crack system), this does in fact represent "cracks passing the reinforcement" in the context of the present specification.

If the base matrix cracks are interconnected so that they would substantially permit fluid transfer to a substantial part of the zone in question passing the main reinforcement, this will also often represent "cracks passing the reinforcement". In this connection, the fluids are, of course, fluids which are able to penetrate into even fine base matrix cracks, but not able to penetrate into the surrounding non-cracked material.

If the base matrix cracks are not interconnected, so that the material is rather in a state where the transfer of loads in a hypothetical system with removed main reinforcement and removed fibres would still be possible (and especially if fluid transfer through the crack system connot take place either), this is characterized in the present context as cracks which do not pass the reinforcement.

FIG. 11 shows composite structures with cracks passing and not passing the main reinforcement, respectively. In FIG. 11 1 represents main reinforcement bars, and 2 represents a matrix. A shows a composite structure with a crack 3 passing the main reinforcement. B shows a composite structure with a crack 4 passing the main reinforcement, the crack 4 being visualized as separate, not through-going cracks in a section. The inter-connection between the cracks 4 in the section would be visible only in a three-dimensional picture (layers of parallel setions). C (and D which is an enlargement of a part of C) show a composite structure with small local cracks 5 not passing the reinforcement. The location of each individual small crack is substantially independent of the location of the other cracks.

Article and Structure

In the present specification and claims, the term "article" or "shaped article", when used about the articles of the invention, designates an article which comprises a "CRC structure". A "CRC structure" is a fibre-reinforced matrix A in which a high concentraton of reinforcement B is embedded, the matrix and the reinforcement and their co-operation fulfilling the structural or and/or functional definitions given in the claims herein. In other words, the article need not consist exclusively of the CRC structure; it may comprise other structures, but the article as such will, of course, comply with the functional definitions of the articles given in the claims hereof.

Figure 12:
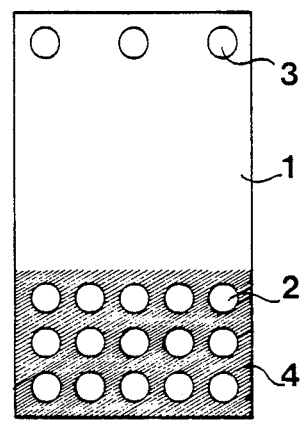

FIG. 12 shows a cross section of a beam being an article according to the invention. The beam comprises a fibre-reinforced matrix throughout its cross section. In the matrix are embedded reinforcing bars. 1 designates an upper part of the fibre-reinforced matrix in which a relatively low concentration of reinforcement 3 is present. 4 represents a lower part of the fibre-reinforced matrix in which a high concentration of reinforcement 2 is present. In the article of FIG. 12, the lower matrix part 4 with the highly concentrated reinforcement 2 constitute the CRC structure, that is, the structure where the ductile matrix and the heavy reinforcement co-operate to establish the novel behaviour characteristic of the CRC materials as defined by structural and/or functional definitions in the claims herein. The beam in its entity is an article according to the invention, provided, of course, that the beam as such conforms with the definitions in the claims herein—these definitions either defining the structural and/or functional characteristics of the article, and/or defining the structural and/or functional characteristics of constituents of the article, such as the matrix and the reinforcement and their relative amounts and/or co/operation.

Normalized loads and deformations—formalized stresses and strains

In order to compare mechanical behaviour of different materials based on experience with members of the different materials, but of different sizes and shapes, it is necessary to do this in a manner which is independent on the geometry of the members.

Thus, e.g., when it is desired to compare the bending behaviour of ordinary concrete determined on plates with thickness H=8.1 cm and with width B=8 cm with the bending behaviour of smaller CRC beams (H=5 cm, B=5 cm), the bending moment (M) of the plates and the beams, respectively, is divided by the respective resisting moments (1/6 BH$^2$) (referring to cross section) to obtain the "normalized bending moments"

$$= \frac{M}{1/6 \, BH^2}$$

By dividing with BH$^2$, the effect of size is eliminated. By use of the numerical value 1/6, the normalized bending moment becomes identical to the stress in the most strained zone of a body of the same size and shape and under the same load conditions as the body in question—but showing ideal linear elastic behaviour (in the following termed "the elastic analog body"). Therefore, in the present specification, the normalized bending moment is sometimes also termed formalized bending stress or, for brevity, bending stress.

The use of formalized stresses—calculated on "the elastic analog body"—is not limited to the members in bending; it is used for any type of loading and any type of stress.

As the present discussion of stresses predominantly deals with a unique behaviour of materials in tension, it is to be understood that when bending stresses are discussed herein, these are stresses in tension unless otherwise indicated.

Quite generally, normalized forces or moments are expressed as formalized stresses referring to the maximum tensile stress in "the elastic analog body".

Thus, the formalized stresses can be calculated by using the theory of elasticity applied on "the elastic analog body".

Strain

The determination of how a material deforms, based on deformations of bodies made of the material, is done by normalization similar to that used above for forces and moments, in other words, based on the behaviour of the "elastic analog body".

The material deformation is expressed as strain (change in length per unit length).

Thus, from measurements of deformations—such as deflection of beams—the strain (e.g., at the outermost strained part of the beam) is calculated as the strain on the "elastic analog beam" subjected to the same deflection.

In accordance with this, the normalized deformations are herein termed formalized strains or, for brevity, strains.

The term bending strain, as used herein, refers to the part which is most strained, e.g., at the bottom surface in the middle of beams loaded in bending.

Strain may also be measured directly by means of strain gauges, and the values thus measured may also be used directly as strain values in the meaning discussed above-provided, of course, that the measurements really represent the average deformations of the body and not, e.g., local "strain" fluctuations in a small part of the surface of a multi-cracked concrete beam situated between two cracks in the concrete surface.

Modulus of Elasticity

The stiffness of the CRC structure and the constituents forming the structure, that is, matrix, base matrix, etc., plays an important role in the present invention, as the invention deals exclusively with "stiff" articles and materials, the stiffness being expressed as modulus of elasticity.

According to the same principle as applied above for stress and strain, the modulus of elasticity is defined with reference to the behaviour of "the elastic analog body". Thus, e.g., the modulus of elasticity (E-module) of the beams in Example 2 herein was calculated from the force/deflection relationship determined as the E-module of the elastic analog beams which under the same load would have the same deflection.

Stiffness (E-modulus) is not a material constant as, in real materials, the stiffness depends on the stress level and on the the loading time. Thus, the E-module decreases with increasing load, such as is illustrated in Example 2 herein. Furthermore, the E-module increases with decreasing loading time, such as illustrated by the results of determinations based on pulse velocity measurements, cf. Example 1. However, as it is envisaged that the main function of CRC will normally be to carry large load which will be applied at moderate rate, such as in the examples herein, the modulus of elasticity (E-module) as used in the present specification and claims, is calculated on the basis of experiments where loads of at least 5% of the yield value are applied during periods of 10–1000 sec. if, in a particular situation, the modulus of elasticity is determined under conditions outside the conditions stated above, a correction of the determined modulus of elasticity should be made based on sound scientific principles in order to relate the thus determined values of the modulus of elasticity to the values and ranges stated in the present specification and claims.

The ratio between the strain prependicular to the load and the strain in the direction of the load (Poisson's ratio) plays a role for the elastic response of a body; thus, e.g., a constrained body shows a larger stiffness in the direction of the load than a body which is free to expand perpendicular to the direction of the load. In the present context, the modulus of elasticity refers to uniaxial stress load on bodies with no constraints perpendicular to the load direction. For other load conditions, the correct values of Poisson's ratio should be used, for matrix materials and base matrix materials of the types used in Examples 1–7, the value of 0.20 is an appropriate Poisson's ratio.

Resistance to Compression

In the present specification and claims, reference is made of the resistance to compression of (1) articles, (2) matrix, and (3) base matrix.

When reference is made to the resistance to compression of the matrix A or the base matrix B, this will normally be the compression strength of test specimens prepared from the matrix materiald in connection with the preparation of the article comprising the matrix.

For the fibre-reinforced matrix, the resistance to compression may also be determined (1) on a test specimen cut out from the article in question—such as cut out from a part of the article which is not heavily reinforced (such as from the zone normally considered to be in compression), or (2) from measurements on the article performed in the zone which is not heavily reinforced, such as unreinforced compression zones in a plate or beam.

For the article, the resistance to compression will refer almost only the test performed on the aticle.

The resistance to compress—for example determined as a compressive strength—is dependent on the size and shape of the test body and the method of testing.

Thus, the compressive strength measured on slender members (e.g., large cylinders with a high length/diameter ratio) is smaller than the compressive strength measured on compact-shaped members (such as short cylinder), the compressive strength measured on large specimens is smaller than the compressive strength measured on small specimens, and the compressive strength determined at slow application of the load is smaller than the compressive strength measured by fast application of the load.

The compressive strength referred to in the present specification and claims are compressive strengths determined under the following conditions:

the specimens are
(1) cylinders of diameter 100 mm and length 200 mm (2) in uniaxial compression
(3) loaded with a steadily increasing load, the duration of the test being 100–1000 sec.

If, in a particular situation, the compressive strength is determined under conditions outside the conditions stated above, a correction of the determined compressive strength should be made based on sound scientific principles in order to relate the thus determined values of the compressive strength to the values and ranges stated in the present specification and claims.

Quite generally, measurements of modulus of elasticity and compressive strength of the matrix or of the base matrix should, of course, be performed on the materials as they appear in the relevant article.

Volume Concentration of Fibres is defined as the volume of fibres in the matrix A divided by the volume of the matrix A (=the volume of fibres in the matrix A divided by the sum of the volume of the volume of the fibres and the volume of the base matrix C).

Volume Concentration of the Reinforcement B (Main Reinforcement)

The volume concentration of the reinforcement B normally refers to reinforcement arranged substantially parallel and in the direction of the tensile stress, such as in the tensile side of a beam.

In a pure tensile member with constant cross section, the volume concentration of the reinforcement B is simply the volume of reinforcement B (reinforcement in the direction of the tensile stress) divided by the total volume of the member—which, with reference to a cross section area, is equal to the cross section area of the reinforcement divided by the total cross section area of the member.

In the case of a bending-loaded member, such as a beam (e.g., with an upper part in compression and a lower part in tension), the volume (or the section area) in question refers to the tensile-loaded part only, in other words, the volume of reinforcement B in the tensile zone divided by the total volume of said zone (or the corresponding cross section area ratio).

The tensile zone is defined as the zone in tension of "the analog elastic body", or as the actual tensile strained zone as measured, e.g., by means of strain gauges.

In cases where the reinforcement B is not arranged substantially parallel to the direction of the tensile strain, the volume concentration of the reinforcement B is calculated by multiplying the actual volume of reinforcement B determined as explained above with the cosine of the angle between the direction of strain and the direction of the reinforcement B.

It will be noted from the explanation given above that the volume concentration of the reinforcement B is a direction-dependent value, "a vector". In the beam cases, the volume concentration will typically be unidirectional. In a plate or panel reinforced in directions perpendicular to each other, it is possible that the requirement to the volume concentration of the reinforcement B is fulfilled in any direction within the plane of the plate or panel, or the requirement may be fulfilled only in one direction or a certain angle space of directions; as long as the condition is fulfilled in one direction, the structure is, of course, a structure according to the present invention (provided the other conditions as herein defined of the claims are fulfilled). A particularly interesting aspect of the invention is a CRC structure in which the requirement to the volume concentration of the reinforcement B is fulfilled in any direction (such as is discussed, e.g., in connection with the concept of transverse reinforcement).

COMPONENTS AND CRC STRUCTURES

In order to ensure the exceptional mechanical behaviour of the CRC structure, including a high three-dimensional stiffness, it is required that the matrix itself has a high strength (especially in compression) and a high modulus of elasticity in order to confer a high stiffness to the CRC structure. In addition, it is required that the matrix has a high ductility obtained by an efficient fibre reinforcement and a suitable matrix/fibre interaction.

In the following, the selection of the components of the matrix will be discussed. The discussion will be based on the above-explained model conditions (I) and (II) as a useful overall guide in the proper selection of the components and their interaction.

Compressive Strength of Base Matrix, ($\sigma_m$)

In order to secure a high resistance to compression, it is required that the matrix has a high compressive strength, and in order to obtain this, it is required that the base matrix materials are dense matrices based on densely packed particles of a size of from 0.5 $\mu$m to 100 $\mu$m with ultra-fine particles of a size of from 50 Å to 0.5 $\mu$m and being 1 power of 10 smaller than the above-mentioned densely packed larger particles homogeneously distributed between the densely packed larger particles, the dense packing of the matrix and the homogeneous distribution of the ultra-fine particles being secured by overcoming surface forces by utilizing an effective amount of an effective dispersing agent. This class of material (the so-called DSP materials) and its preparation are described in the International Patent Publication No. WO80/00959, in the International Patent Publication No. WO81/03170, and in the Ottawa Paper and are also described in greater detail in the present application, including Examples 1–7 where a cement/microsilica-based embodiment of these materials having a strength of 155 MPa was used as the base matrix C (with stronger sand, Portland cement/microsilica-based DSP materials with compressive strengths up to about 270 MPa are known, vide the Ottawa Paper.

Modulus of Elasticity of the Base Matrix and the Fibres ($E_m$, $E_f$)

In order to obtain the desired strain-hardening, it is important that the components (matrix and fibre) have a high rigidity, i.e. a large modulus of elasticity. This also conforms with the overall requirement of high stiffness.

In connection with strain-hardening, the building up of stresses occurs by mechanisms where matrix and fibres function in series, the size of the stresses being determined by the rigidity of the coupled system.

This means that the behaviour is primarily determined by the softest component.

For systems with a vary rigid matrix (for example with $E_m = 5 \times 10^{10}$ N/m$^2$) and a fibre content of 5–10%, the fibre component ($E_f \times \phi$) will be the softest, and thus decisive component as long as $E_f$ is below $0.5$–$1 \times 10^{12}$ N/m$^2$. It should be noted that the rigidity of the traditionally strong fibres is considerably lower than the above values. This means that the fibre rigidity is the decisive factor in such systems. Thus, steel fibres with a modulus of elasticity of $2.1 \times 10^{11}$ N/m$^2$ are 3 times better for securing "strain-hardening" than glass fibre with a modulus of elasticity about $7 \times 10^{10}$ N/m$^2$ (provided that all other conditions are identical).

This also means that high strength plastic fibres which are very promising for many other purposes and which have a very high strength, but have a considerably lower modulus of elasticity than for example steel are generally not promising to the same extent in connection with the establishment of strain-hardening. On the other hand, organic fibres with high modulus of elasticity (such as Kevlar fibres, aromatic fibres, high strength polyethylene, etc.) are, of course, of great interest for the purpose of obtaining strain-hardening of the matrix A.

In spite of their deficiencies mentioned above, even high strength plastic fibres which do not have a high modulus of elasticity are of value in the present invention as logical candidates, for example, in systems with considerably softer matrix materials, and they are also particularly useful in controlling cracks.

The matrtix rigidity becomes dominant in systems with very rigid fibres if the matrix material itself is not very rigid (for example, in systems with 10% of steel fibres ($E_f = 2.1 \times 10^{11}$ N/m²), the matrix rigidity will have a greater importance than the fibre rigidity when the modulus of elasticity of the matrix is less than $2 \times 10^{10}$ N/m².

This means that the matrix rigidity is often of great importance. For example, incorporation of quartz particles in the cement silica binder resulted in a pronounced improvement of the rigidity of the matrix from probably about $2 \times 10^{10}$ to $5 \times 10^{10}$ N/m². Together with steel fibres (6%), the incorporation of quartz particles may have improved the conditions for strain-hardening by 30–40%.

While an improvement of 30–40% is interesting, a much greater improvement is obtained in plastic materials where, for example, incorporation of rigid, strong particles in a high concentration in an organic polymer material may be capable of increasing the modulus of elasticity from $1 \times 10^9$ and $3 \times 10^{10}$ N/m² and thereby increase the contribution to strain-hardening derived from rigidity alone by a factor of the order of 10.

According to the present invention, the modulus of elasticity of fibres incorporated in the matrix, $E_f$, is preferably at least $2 \times 10^{10}$ N/m², more preferably at least $5 \times 10^{10}$ N/m², still more preferably at least $10^{11}$ N/m², still more preferably at least $2 \times 10^{11}$ N/m², still more preferably $3 \times 10^{11}$ N/m² and most preferably at least $4 \times 10^{11}$ N/m², and the modulus of elasticity of the matrix material, $E_m$, is preferably at least $10^{10}$ N/m², more preferably at least $2 \times 10^{10}$ N/m², still more preferably at least $3 \times 10^{10}$ N/m², still more preferably $5 \times 10^{10}$ N/m², still more preferably $7 \times 10^{10}$ N/m², and most preferably at least $10^{11}$ N/m².

Thus, in Examples 1–7, the steel fibres used had a modulus of elasticity of $2.1 \times 10^{11}$ N/m², and the modulus of elasticity of the base matrix was slightly above $5 \times 10^{10}$ N/m².

The materials used as base matrix C in the examples were based on stong cement/microsilica based binders and quartz sand and, in one example, also Al₂O₃-rich sand (Example 6). These base matrices had compressive strengths in the range of 150–200 MPa and a modulus of elasticity in the range from about 50,000 to about 70,000 MPa.

Examples of suitable base matrices C based on Portland cement, microsilica and strong sand and stone are disclosed in International Application Publication No. WO81/03170 and in the Ottawa Paper which describes materials with Al₂O₃-rich sand and showing a dynamic modulus of elasticity of 108,000 MPa.

Although the base matrix in important embodiments of the CRC structures is based on cement, such as Portland cement, aluminous cement, slag cement, etc., it may, of course also be based on any other material which is able to fulfill the necessary mechanical requirements, including surface-physical and chemical compatibility and adaptability between the constituents of the material and surface-physical and chemcial compatibility and adaptability with the fibres to be incorporated and with the main reinforcement with which the matrix is to be combined.

Fracture Energy of Base Matrix, $G_m$

In order to obtain overall ductility, it is of importance to have a high fracture energy of the base matrix. Thus, strain-hardening by means of fibre reinforcement is also dependent on the fracture energy $G_m$ of the matrix mateiral which is of the same importance (relatively) as $E_f$ (or $E_m$), $\tau$ and d (the fracture energy is the energy necessary to create 1 m² crack area).

This important fact which is almost unknown plays a fundamental role in the present invention.

Thus, an essential aspect of the invention is to impart an increased fracture energy to the matrix materials by incorporating hard strong (not too small) particles (which also, as a very positive feature, increase $E_m$).

This is a surprising strategy on the background of known technology which normally intentionally goes in exactly the opposite direction. The fact is that introduction of stiff particles reduces the strain capacity of the matrix material in bulk, for which reason classical good technology concludes that matrix reinforcement with stiff compact particles reduces the capacity of the matrix to follow the movements of the main reiforcements in a reinforced structure.

These classical technology points of view are basically sound and are of great general validity.

However, they are not valid in matrix systems which are strain-hardened, where the size of the crack zone deformation is decisive.

For example with reference to Examples 1–7, classical technology would have suggested the use of pure cement silica binder as matrix (instead of the concrete with up to 4 mm quartz particles). The strain capacity of such a binder may be 2 times longer than the strain capacity of the matrix with quartz particles (measured in bulk), and the binder material is excellently suited for fixing the fine fibres. From the point of view of fracture mechanics, however, a high price is paid for using this binder: the fracture energy (Gm) is reduced to about 1/10 when going from concrete to the pure binder, and the modulus of elasticity is decreased to 1/5–166. This means that the conditions for strain-hardening (cf. I and II above) considerably worse. This surprising fact is of great importance not only to cement based materials, but also in connection with reinforced polymer materials where the "reversed method" for creating ductility (incorporation of a high concentration of hard and strong compact particles) will at the same time result in "new properties" which are normally not compatible with polymer based constructions such as (1) high rigidity (volume stability)
(2) high abrasion resistance
(3) high compressive strength.

With respect to, e.g., cement systems, such as mortar and concrete, it is preferred that the base matrix has a fracture energy of at least 20 N/m, preferably 40 N/m, more preferably 80 N/m, still more preferably 100 N/m, still more preferably 120 N/m, still more preferably 180 N/m, still more preferably 250 N/m, still more preferably 400 N/m, still more preferably 800 N/m.

Thus, in Examples 1–7 the fracture energy of the non-reinforced base matrix (C) was about 130 N/m.

Fibre Strength ($\sigma_f$)

A high fibre strength is required in order to confer high ductility and high tensile strength to the matrix.

The fibre strength is not part of the above-explained criterion for obtaining strain-hardening, cf. the formulae above. However, strain-hardening is, of course, only obtained as long as the tensile strength of the fibres is so high that the fibres alone can carry the tensile load. Thus, a necessary condition is that the fibres have a tensile strength of at least $$\sigma_f = \sigma_m \phi^{-1}$$

However, it is also important that the fibres are considerably stronger than corresponding to minimum, and they should be sufficiently strong to resist a high degree of strain-hardening, and also be effective even after the matrix has cracked.

Thus, it is preferred that the strength of the fibres is larger than 300 MPa, preferably larger than 500 MPa, more preferably larger than 800 MPa, still more preferably larger than 1,000 MPa, still more preferably larger than 1,500 MPa, still more preferably larger than 2,000 MPa, still more preferably larger than 2,500 MPa, and most preferably larger than 3,000 MPa.

Thus, the fibres used in Examples 1–7 had a strength of about 525 MPa.

Fibre Concentration ($\phi$)

It is essential to work with a high fibre concentration in order to achieve overall ductility, strain-hardening and high tensile strength. However, this is difficult in practice in connection with the production of usual fibre reinforced materials such as concrete or mortar which are natural candidates for matrices in reinforced structures. For example, it is difficult to incorporate more than 1–2% of fibres in traditional concrete, even in non-reinforced concrete or in concrete with only low content of large reinforcement.

With a high concentration of the main reinforcement B it will be even more difficult to incorporate a high concentration of fibre reinforcement. Incorporation of 1% of fibres in articles with an arrangement of main reinforcement as in Examples 1–6 would probably be considered unrealistic by most persons skilled in the art, for which reason this would be considered impossible in structures with 20 or even 50% of main reinforcement. However, in accordance with the present invention, this is solved by using vibration techniques as described herein. For example, 6% by volume of 150 μm diameter steel fibers of a length of 6 mm were incorporated in the "concrete" in heavily reinforced beams in Examples 1–4 and in a model casting (Example 7) using 27% by volume of main reinforcement consisting of 16 mm diameter and 10 mm diameter steel bars.

In accordance with the present invention, the fibre volume in the maxtrix A is at least 2%, preferably at least 3%, more preferably at least 4%, still more preferably at least 5%, still more preferably at least 7%, still more preferably at least 10%, still more preferably at least 15%, and most preferably at least 20%, calculated on the matrix A.

It is also often essential to have very fine fibres (small diameter (d)). The use of fibres having a diameter of 10–20 μm is a very interesting aspect of the invention and is especially suitable to fine powder based structures, prepared by special techniques such as rolling, extruding, spinning, etc. However, it is also possible and interesting to use coarser fibres, for example in concrete systems and concrete-like systems.

The steel fibres used in Examples 1–7 have a diameter of 150 μm. Thus, they are 10 times larger than the above mentioned very fine fibres, but are still thin compared to the steel fibres normally used in concrete which typically have a diameter of about 0.3–1 mm.

There are several reasons for selecting somewhat coarser fibres than 10–20 μm fibres in the experiments of the examples herein where the base matrix C was a cement/microsilica mortar with coarse particles of a maximum diameter of 4 mm:

(1) they are easier to incorporate from the point of view of process technology.

(2) They are in better geometric harmony with the coarser particles.

(3) They often show better load carrying capacity and energy absorption after local fracture formations in the matrix material.

(4) A somewhat larger diameter may, as will be shown in the following, be compensated for, i.a. by the increased fracture energy (G) of the base matrix (C) which becomes possible due to the "coarser" structure.

However, in other valuable CRC structures according to the invention, the use of very fine fibres may be desirable, e.g., in micro CRC structures such as fine ceramics based on submicron-size powder and, e.g. 1–10 μm diameter whiskers.

The size (diameter) of the fibres may thus vary within rather wide limits, such as over the ranges 4–1 mm, 1–03 mm, 300–100 μm, 100–30 μm, 30–10 μm, or less than 10 μm. In each particular case, the size of the fibres should be adapted to the system in accordance with the principles disclosed herein.

An interesting aspect of the invention is to divide the crack impeding functions and the load carrying functions after the matrix has cracked locally so that extremely fine fibres perform the former function whereas coarser fibres perform the latter function. Thus, it may be of interest to combine fibres of a size in the fine range e.g., 30 to 10 μm, with fibres of a size in the coarser range, 300 to 100 μm, or, in a generally coarser system, to combine fibres in the range of 100 to 200 μm with fibres of a size in the range of 4 to 1 mm.

Shear Stress Between Fibres and Matrix at Sliding ($\tau$)

The strain-hardening and the obtainment of the overall ductility are conditioned by a very small well-controlled movement between fibre and matrix. To control this small movement, the shear resistance ($\tau$) has to be large.

A high shear resistance may be established by securing high adhesion between fibre and matrix and high frictional resistance. The adhesion is related to atomic bonds (including surface forces, for example London van der Waal's forces) between the two phases. The frictional resistance is a combination of a friction coefficient and an established normal pressure. Thus, high frictional resistance is promoted by measures which make the maxtrix material tightly fix the fibres such as is typically the case in the solidification of matrix materials due to solidification contraction.

In this connection, it is beneficial that the bodies (fibres) have such a shape that any matrix contraction taking place will enhance the desired tight fixation (for example circular cross section).

According to the invention, it is preferred that the shear stress between the fibres and matrix at sliding is at least 5 MPa, preferably at least 10 MPa, more preferably at least 20 MPa, still more preferably at least 40 MPa, and most preferably at least 100 MPa.

Thus, in Examples 1-7, the shear stress at sliding between the fibres and the base matrix was about 20 MPa.

Fibre Length (L)

In many cases fibres are used in the form of chopped fibres. The length of chopped fibres is no part of the criterion model, vide above. However, this only applies as long as the fibre length is larger than the critical length $L_c$ determined by $$\frac{L_c \tau}{\sigma_f d} = \text{constant (approximately 1)}$$

In the fibres are shorter, they will be drawn out before strain-hardening is established.

For fibres which are longer than the critical length (and have a higher strength than the critical strength) fracture will result in either the fibres being torn over or drawn out, cf. the criterion.

It will often be desirable that fracture occurs by pull out of the fibres, because this implies a reserve with respect to energy absorption.

On the other hand, if the fibres are too short, strength and energy absorption will be low.

From a functional point of view, it is optimal to select such fibre lengths that the pull out resistance is slightly lower than the force required to rupture the fibres.

Reinforcement

In order to obtain a good performance (strong fixation of the matrix, large load capacity, etc.) it is necessary that the reinforcement has a high strength and a high modulus of elasticity. The strength is preferably higher than 400 MPa, more preferably higher than 600 MPa, more preferably higher than 800 MPa, and most preferably higher than 1,000 MPa, and the reinforcement should have a modulus of elasticity which is preferably higher than $5 \times 10^{10}$ N/m$^2$, more preferably higher than $7 \times 10^{10}$ N/m$^2$, still more preferably higher than $10^{11}$ N/m$^2$, still more preferably higher than $2 \times 10^{11}$ N/m$^2$, and most preferably higher than $3.10^{11}$ N/m$^2$.

In order to obtain the substantial increase of the tensile strain capacity in CRC structures, it is essential to establish a good fixation of the main reinforcement in the fibre reinforced matrix.

In many cases, this is obtained by use of deformed steel bars having profiled surfaces, cf. the examples.

Such reinforcement typically has moderate, but not extremely high strengths. Extremely high strengths are known, for example, in cold drawn smooth steel wires of the kind traditionally used in pre-stressed concrete.

For example, deformed steel bars typically have yield stresses of about 500-600 MPa, whereas pre-tensioning wires may have yield up to about 2,000-2,500 MPa.

The problem is that the very strong reinforcement will typically, due to the production methods used (typically drawing) also be smooth and therefore normally cannot be fixed to the matrix in the same effective manner as the profile reinforcement.

However, there is a number of ways in which the possibilities for utilizing high strength reinforcement in CRC may be improved:
1. By using profiled reinforcement of higher strength than normally, e.g., with strengths of about 1,100 MPa, typically obtained by use of special steel alloys.
2. By modifying the matrix to ensure a better fixation of a more smooth reinforcement, for example by incorporation of organic materials, such as water-soluble polymers.
3. By a better fixation of the reinforcement in the matrix by establishing a condition with radial compression, for example by pre-tensioning the reinforcement or by shrinking the matrix around the reinforcement, for example by thermal means.
4. By arranging a strong, smooth reinforcement as twisted wires such as known from cordage and cables.

It should be noted that a good fixation in general is enhanced by means which reduce the local brittleness number of the matrix $\sigma_o^2 D/EG$. Thus, the fixation will be improved by using thinner reinforcing components.

An interesting reinforcement configuration combines medium strength profiled reinforcement such as the deformed bars used in Examples 1-7 and ultra-high strength smooth reinforcement such as thread used in pre-stressed concrete, these two types of reinforcement being arranged parallel to each other.

The profiled reinforcement has the main responsibility for the increase of the strain capacity of the matrix, whereas the two reinforcement types both contribute in transferring the loads in the direction of the reinforcement.

For example, a combined reinforcement with 10% of profiled reinforcement with a yield stress of 500 MPa and 5% high strength wire with a yield strength of of 1,500 MPa will have a load transfer of initial yielding of the high strength wire corresponding to a formal tensile stress of 175 MPa in the CRC material (in addition, there is, of course, a tensile contribution from the matrix). The same tensile capacity in systems exclusively based on profiled reinforcement would require as much as 35% of reinforcement, as compared to the 15% reinforcement in the system with combined reinforcement.

In systems with a combined reinforcement of this kind, a good fixation of the ultra-strong (often smooth) reinforcement is required, but the fixation requirements are not nearly as high as the fixation requirements for conferring a high increase of the strain capacity of the matrix.

The fixation of the ultra-strong reinforcement is improved by means of reducing the local brittleness number $\sigma^2 D/EG$. Thus, it is advantageous to use the ultra-fine reinforcement in the form of very fine wires.

Normally, the use of a very fine main reinforcement results in a small ductility. In systems with a conbined reinforcement, this is, however, not the case, as the profiled, typically much coarser, reinforcement ensures a high ductility.

The fixation of the ultra-strong reinforcement may also be obtained by special end fixations, such as it is known from pre-stressed concrete, for example by means of anchors arranged at the exterior of the CRC.

In the following, interesting combinations of components and properties which characterize CRC articles are discussed:

CRC Structures Which Combine High Load Capacity and High Internal Coherence

One aspect of CRC is articles which are capable of functioning as substantially coherent structures even after having been subjected to very large loads.

With the invention, it is now possible (and even beneficial) to effectively utilize very densely arranged main reinforcement (very small spacing between bars) placed also very close to the surface (small covering layer) to create structures showing substantial coherence even under very large tensile loads. Thus, articles of the invention are able to carry very high loads and to remain crack-free under tensile strains right up to the yielding of the main reinforcement.

Structures according to the invention may, however, also show excellent coherence even after the formation of fine cracks passing the main reinforcement (similar to what happens in ordinary reinforced concrete) and thus be able to perform excellently under far high loads than the upper value of loads which are possible when it is required that the structure shoud be free from cracks passing the main reinforcement.

Actually, in most cases, the structure of the invention show substantially coherent behaviour even if they show fine cracks in the base matrix passing the main reinforcement, provided
(1) the cracks are finely divided and not interconnected
(2) the cracks are small (typically smaller than 0.1 mm in width), (3) the cracks are well controlled by the reinforcement, and
(4) the structure does not show any substantial reduction in rigidity.

Due to the high toughness of the fibre reinforced matrix and the extremely strong fixation of the main reinforcement to the matrix, development of the fine cracks passing the main reinforcement is in fact far better controlled than in conventional reinforced concrete and has far less effect on the mechanical behaviour (e.g., reduction in stiffness) than is the case in known art structures:
(1) The cracks will appear substantially as fine base matrix cracks (fine cracks passing the fibres) which are still being controlled by the fibres. These fine cracks will typically be of widths of about 5 to perhaps 200 μm, and the cracks will be capable of transferring substantial loads (through the fibres).
(2) The cracks develop to a lesser extent (in the plane of the cracks), the crack development stopping when the tensile stresses become smaller than a critical value, this value being very high, for example for the materials of Examples 1-6 corresponding to stresses in the matrix alone of about 10-20 MPa, and the overall tensile stresses of the composite (reinforcement-+matrix) being in the range of 130-220 MPa.

Because of the possibility of effectively uttilizing very high concentration of main reinforcement with retention of an extreme coherence, the CRC articles may also be characterized as articles showing a unique combination of high load capacity in tension (large formal tensile stresses) and retention of an excellent internal coherence (defined by the crack pattern).

Another aspect of the exceptional behaviour under large load is the capability of the structure to act as a very rigid body even under conditions where fine cracks are formed under very high load.

Normal reinforced concrete looses a considerable part of its formation of cracks in the tensile zone, the cracks passing the main reinforcement. This is due to the major part of the tensile load being transferred by the reinforcement only. In similar CRC structure even with finely divided cracks, the cracks are able to transfer a considerably amount of tensile load, and the propagation of the cracks in the plane of the cracks is much smaller than in conventional concrete. This results in far stiffer structures than conventional cracked reinforced concrete structures. This is due to, inter alia, (1) the cracks being able to transfer a considerable load in tension across the crack, (2) the crack size in the plane of the cracks being smaller, (3) the inital modulus of elasticity of the matrix typically being higher, (4) the effect of the reinforcement typically being higher because of a larger concentration of reinforcement.

Based upon this, CRC articles may be defined as a shaped article comprising a matrix (A) with a reinforcement (B) embedded therein, the matrix (A) being a composite structure comprising a base matrix (C) which is reinforced with reinforcing bodies (D) in the form of fibres, the transverse dimension of the main reinforcement being at least 5 times as large, preferably at least 10 times at large, more preferably at least 20 times as large or even at least 100 times as large as the transverse dimension of the fibres D, the article and/or the matrix A, and/or the base matrix C having a high stiffness in any direction as defined by
(1) the modulus of elasticity of the article and/or of the matrix A and/or the base matrix C in any direction being at least 30,000 MPa, preferably at least 40,000 MPa, more preferably at least 50,000 MPa, and still more preferably at least 70,000 MPa, and/or
(2) the resistance of the article and/or the matrix A and/or of the base matrix C to compression in any direction being at least 80 MPa, preferably at least 100 MPa, more preferably at least 130 MPa, still more preferably at least 150 MPa, still more preferably at least 200 MPa, and most preferably at least 250 MPa, the fibres D being present in a volume concentration of at least 2%, preferably at least 3%, more preferably at least 4%, still more preferably at least 5%, still more preferably at least 7%, still more preferably at least 10%, still more preferably at least 15%, and most preferably at least 20%, caculated on the matrix A, the volume concentration of the reinforcement B in the tensile zone or tensile zones of the article being at least 5%, preferably at least 7%, still more preferably at least 10%, still more preferably at least 15%, and most preferably at least 20%, the article showing at least one of the following qualities I and II:
(I) a large tensile strain capacity with retention of substantial coherence of the article as defined by the tensile zone of the article having a tensile strain capacity of at least 0.5 mm/m, preferably at least 0.7 mm/m, preferably at least 1 mm/m, more preferably at least 1.5 mm/m, more preferably at least 2 mm/m, more preferably at least 3 mm/m, and most preferably at least 10 mm/m, the article retaining substantial coherence during the straining as defined by the absence of any cracks passing the reinforcement B, or by any damage in the tensile zone in the form of fine cracks passing the reinforcement B having a width of at the most 0.2 mm, preferably at the most 0.1 mm, more preferably at the most 50 μm, still more preferably at the most 20 μm, still more preferably at the most 5 μm, still more preferably at the most 2 μm, still more preferably at the most 1 μm, with the proviso that the ratio between the crack width and the smallest transverse diameter of the reinforcement B is at the most 0.02, preferably at the most 0.01, most preferably at the most 0.002, still more preferably at the most 0.008 and still more preferable at the most 0.0002, (II) a large tensile load capacity (referring to stresses in the tensile zone of the article) defined by the tensile load capacity fulfilling at least one of the following conditions (A), (B), and (C):

(A) under conditions of substantially elastic behaviour, the tensile load capacity of the article corresponds to a tensile stress of at least 50 MPa, preferably at least 70 MPa, more peferably at least 100 MPa, still more preferably at least 130 MPa, still more preferably at least 160 MPa, still more preferably at least 200 MPa, and most preferably at least 230 MPa, with retention of coherence during the straining as defined by the absence of any cracks passing the reinforcement B, or by any damage in the tensile zone in the form of fine cracks passing the reinforcement B having a width of at the most 0.2 mm, preferably at the most 0.1 mm, more preferably at the most 50 μm, still more preferably at the most 20 μm, still more preferably at the most 5 μm, still more preferably at the most 2 μm, still more preferably at the most 1 μm, with the proviso that the ratio between the crack width and the smallest transverse diameter of the reinforcement B is at the most 0.02, preferably at the most 0.01, more preferably at the most 0.002, still more preferably at the most 0.008, and still more preferably at the most 0.0002, (B) under yielding, the tensile load capacity of the article corresponds to a tensile stress of at least 70 MPa, preferably at least 100 MPa, more preferably at least 130 MPa, still more preferably at least 160 MPa, still more preferably at least 200 MPa, and most preferably at least 230 MPa, with retention of coherence during the straining as defined by the absence of any cracks passing the reinforcement B, or by any damage in the tensile zone in the fomr of fine cracks passing the reinforcement B having a width of at the most 1 mm, preferably at the most 0.5 mm, more preferably at the most 250 μm, still more preferably at the most 100 μm, still more preferably at the most 25 μm, still more preferably at the most 10 μm, still more preferably at the most 5 μm, with the proviso that the ratio between the crack width and the smalles transverse diameter of the reinforcement B is at the most 0.10, preferably at the most 0.05, more preferably at the most 0.01, still more preferably at the most 0.004, and still more preferably at the most 0.001.

(C) under ultimate loading, the article shows a tensile load capacity corresponding to at least 120 MPa, preferably at least 130 MPa, more preferably at least 160 MPa, still more preferably at least 200 MPa, and most preferably at least 230 MPa.

Combination of High Stiffness and Increased Tensile Strain Capacity of the Matrix As will be understood from the explanation of the physical principles underlying the invention above, CRC articles may also be defined as a shaped article comprising a matrix (A) with a reinforcement (B) embedded therein, the matrix (A) being a composite structure comprising a base matrix (C) which is reinforced with reinforcing bodies (D) in the form of fibres, the transverse dimension of the main reinforcement being at least 5 times as large, preferably at least 10 times as large, more preferably at least 20 times as large or even at least 100 times as large as the transverse dimension of the fibres D, the article and/or the matrix A, and/or the base matrix C having a high stiffness in any direction as defined by (1) the modulus of elasticity of the article and/or of the matrix A and/or of the base matrix C in any direction being at least 30,000 MPa, preferably at least 40,000 MPa, more preferably at least 50,000 MPa, and still more preferably at least 70,000 MPa, and/or (2) the resistance of the article and/or of the matrix A and/or of the base matrix C to compression in any direction being at least 80 MPa, preferably at least 100 MPa, more preferably at least 130 MPa, still more preferably at least 150 MPa, still more preferably at least 200 MPa, and most preferably at least 250 MPa, the fibres D being present in a volume concentration of at least 2%, preferably at least 3%, more preferably at least 4%, still more preferably at least 5%, still more preferably at least 7%, still more preferably at least 10% still more preferably at least 15%, and more preferably at least 20%, calculated on the matrix A, the volume concentration of the reinforcement B in the tensile zone or tensile zones of the article being at least 5%, preferably at least 7%, still more preferably at least 10%, still more preferably at least 15%, and most preferably at least 20%, the article showing an increase in tensile strain capacity of the matrix defined as the amount, shape, arrangement, and performance of the reinforcement (B) being adapted to the matrix (A) so that the strain capacity of the matrix (A) with the reinforcement embedded therein is increased relative to the strain capacity of the matrix (A) in bulk so that the ratio between the strain capacity of the matrix (A) with the reinforcement embedded therein and the matrix (A) in bulk is at least 1.2, preferably at least 1.5, more preferably at least 2, still more preferably at least 3, still more preferably at least 5, still more preferably at least 10, still more preferably at least 20, still more preferably at least 50, and most preferably at least 100.

Combinations of High Initial Stiffness and Large Strain Capacity During Yielding with Retainment of Substantial Load-Carrying During Yielding The CRC structures illustrated in Examples 1–4 have a very high strain capacity up to (and at the beginning of) yielding, such as about 3–4 mm in substantially crack-free condition.

Figure 27:
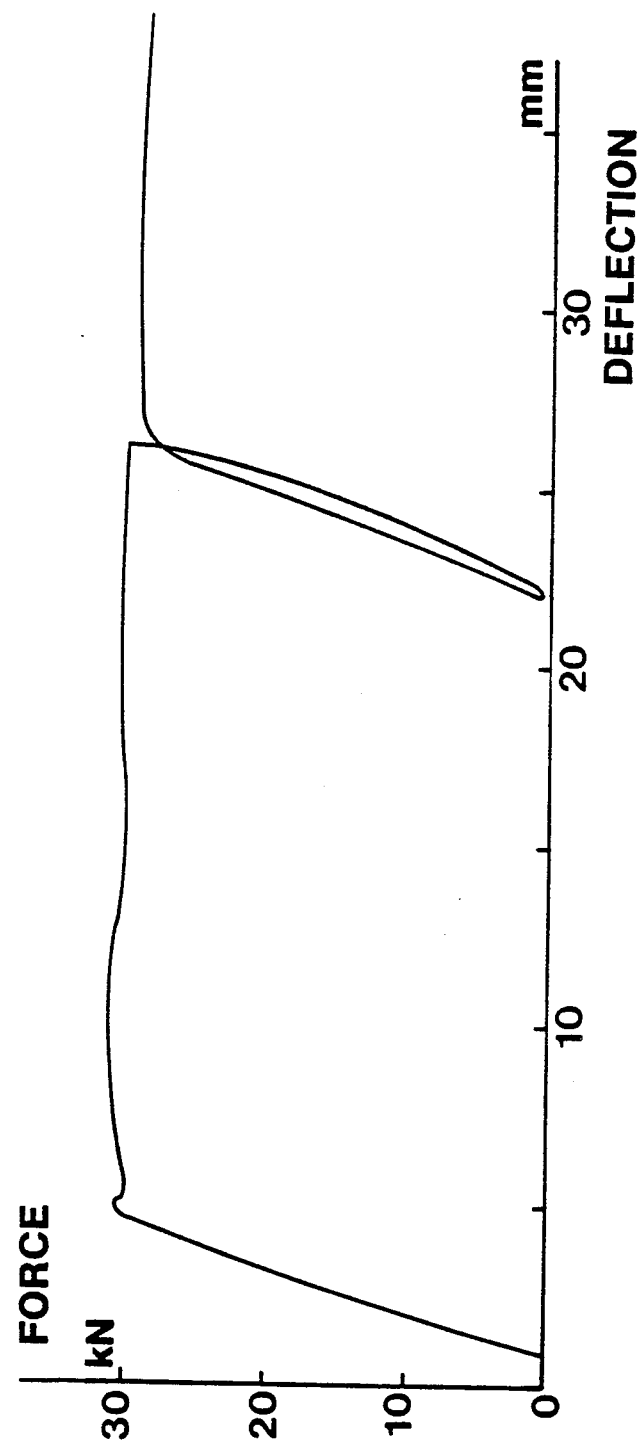
Figure 28A:
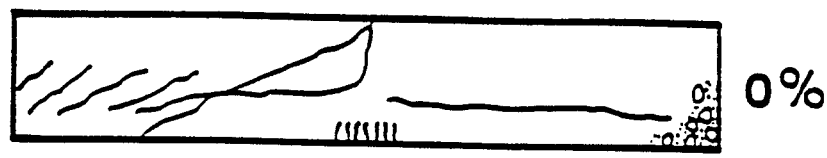
Figure 28B:
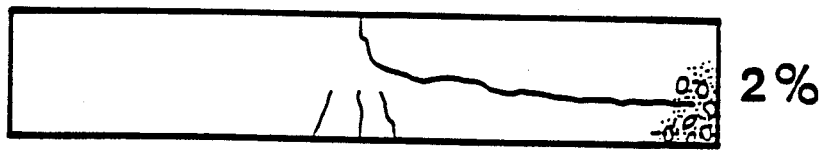
Figure 28C:
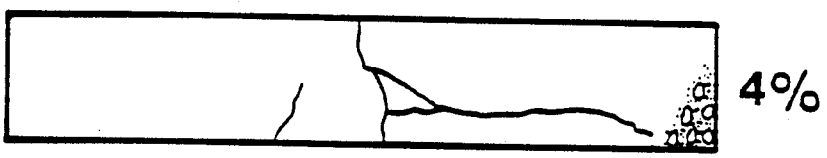
Figure 28D:
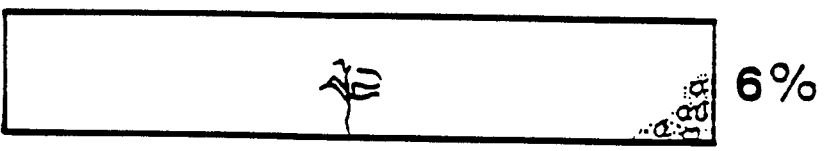
Figure 31:
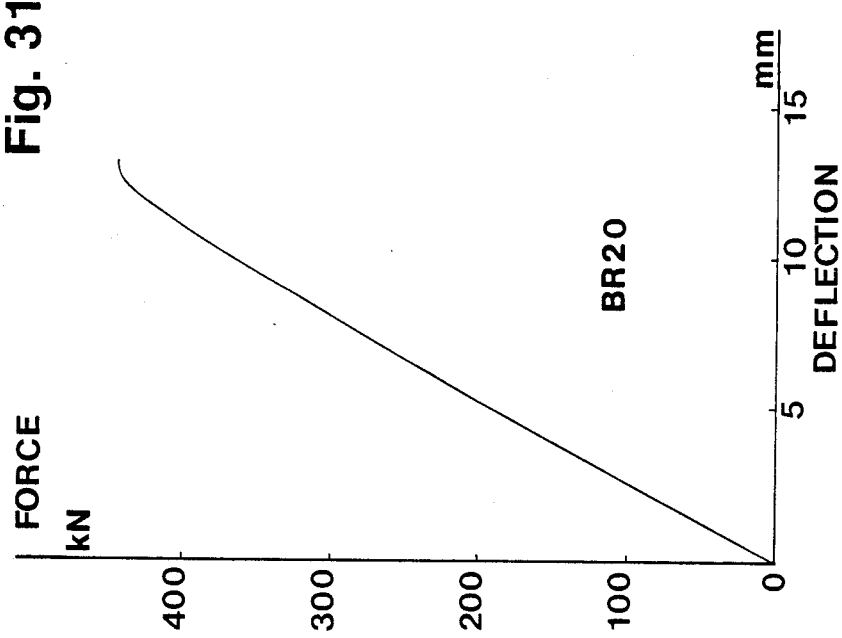
Figure 30:
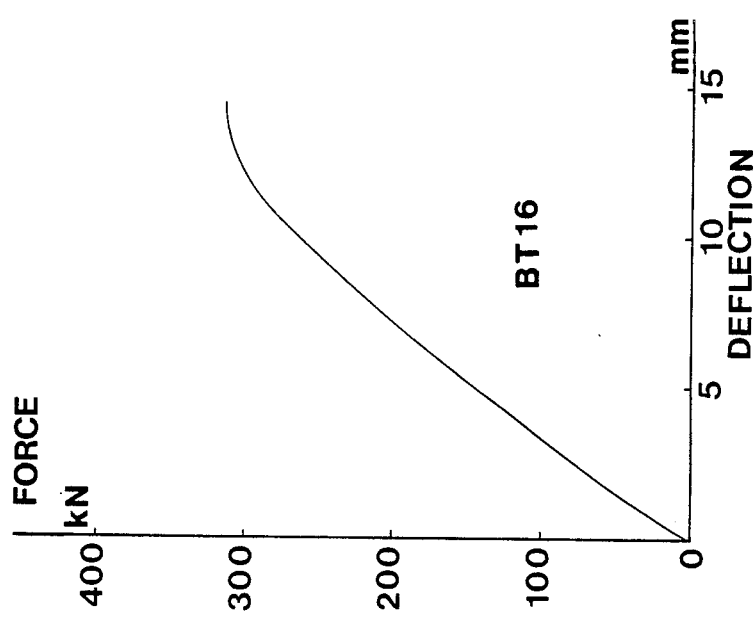

As appears from, e.g. FIG. 27 which shows a force/deflection curve for a beam prepared in claim 1, the CRC structure is able to transfer large loads at strains which strongly exceed the yield strain of the article. Thus, after yielding of the 50×50×500 mm beam carrying a large load of 30 kN had started at a deflection of about 5 mm, the deflection increased steadily to more than 35 mm without any substantial decrease in the applied load.

This large deformation capacity is due to the yielding capacity of the steel reinforcement.

Loading tests on large beams have also performed (Example 2), but only aimed at studying the behaviour up to yeilding. If those experiments had been carried out up to substantial yielding (which was not possible in the specific experimental set-up), similar large yielding with retainment and perhaps even a slight increase of the load would have taken place (except for the beams which failed in shear).

To secure substantial strain capacity after yielding, it is required that the reinforcement is able to show substantial yielding and to do this with pronounced stain-hardening.

A test bar of the steel used in Example 1 started to yield at a stress of 500–510 MPa, whereupon the entire bar deformed 140 mm/m (14%) under steadily increasing load and then failed at stresses of 610 MPa; in other words, the steel showed a large yielding under increasing load.

Such large yielding of the main reinforcement under strain-hardening provides tools for achieving similar tensile strain and yielding in CRC structures. By fixing the matrix tightly to densely arranged reinforcement such as is characteristic to the CRC structures, the matrix can follow the large strains of the main reinforcement and remain substantially coherent even at strains of 50–150 mm/m.

This yield strain behaviour will be enhanced by
(1) means creating strong fixation of the matrix to the main reinfocement, including conferring ductility to the matrix, in other words, means which decrease the local brittleness number, including the use of a main reinforcement which is not too thick,
(2) the use of steel having a pronounced strain-hardening so that the strain will be distributed over a large part of the volume (the effect of this is not so pronounced in Example 1 because the stressed volume was a rather small volume due to the type of loading (a single concentrated force created maximum stresses very locally)).

Thus, the invention may also be defined as a shaped article comprising a matrix (A) with a reinforcement (B) embedded therein, the matrix (A) being a composite structure comprising a base matrix (C) which is reinforced with reinforcing bodies (D) in the form of fibres,
the transverse dimension of the main reinforcement being at least 5 times as large, preferably at least 10 times as large, more preferably at least 20 times as large or even at least 100 times as large as the transverse dimension of the fibres D, the article and/or the matrix A, and/or tthe base matrix C having a high stiffness in any direction before yielding, as defined by
(1) the modulus of elasticity of the article and/or of the matrix A and/or of the base matrix C in any direction before yielding being at least 30,000 MPa, preferably at least 40,000 MPa, more preferably at least 50,000 MPa, and still more preferably at least 70,000 MPa, and/or
(2) the resistance of the article and/or of the matrix A and/or of the base matrix C to compression in any direction before yielding being at least 80 MPa, preferably at least 100 MPa, more preferably at least 130 MPa, still more preferably at least 150 MPa, still more preferably at least 200 MPa, and most preferably at least 250 MPa,
the fibres D being present in a volume concentration of at least 4%, preferably at least 5%, more preferably at least 7%, still more preferably at least 10%, still more preferably at least 15%, and most preferably at least 20%, calculated on the matrix A,
the volume concentration of the reinforcement B in the tensile zone or tensile zones of the article being at least 5%, preferably at least 7%, still more preferably at least 10%, still more preferably att least 15%, and more preferably at least 20%,
the yield strain of the article being at least 10 mm/m, preferably at least 20 mm/m, more preferably at least 30 mm/m, still more preferably at least 50 mm/m, still more preferably at least 70 mm/m, still more preferably at least 100 mm/m, still more preferably at least 150 mm/m, and most preferably at least 200 mm/m with retention of a load capacity of at least 50%, preferably at least 70%, more preferably at least 80%, and most preferably at least 90% of the maximum load applied during the course of loading up to the yield in question.

Thus, in FIG. 27, the maximum load applied is seen to be the load just above 30 kN at a deflection of 10 mm, and the beam retained a load capacity of at least 90% of that value during the loading to more than 35 mm deflection (after which the experiment stopped).

Combinations of Stiffness, High Concentration of Fibre Reinforcement in the Matrix A, and High concentration of Main Reinforcement The invention may be defined by referring to the combination of an extremely high degrss of fibre reinforcement of stiff base matrix material C and an extremely high main reinforcement. Thus, the invention may also be defined as A shaped article comprising a matrix (A) with a reinforcement (B) embedded therein, the matrix (A) being a composite structure comprising a base matrix (C) which is reinforced with reinforcing bodies (D) in the form of fibres,
the transverse dimension of the main reinforcement being at least 5 times as large, preferably at least 10 times as large, more preferably at least 20 times as large or even at least 100 times as large as tthe transverse dimension of the fibres D,
the article and/or the matrix A, and/or the base matrix C having a high stiffness in any direction as defined by
(1) the modulus of elasticity of the article and/or the matrix A and/or of the base matrix C in any direction being at least 30,000 MPa, preferably at least 40,000 MPa, more preferably at least 50,000 MPa, and still more preferably at least 70,000 MPa, and/or
(2) the resistance of the article and/or of the matrix A and/or of the base matrix C to compression in any direction being at least 80 MPa, preferably at least 100 MPa, more preferably at least 130 MPa, still more preferably at least 150 MPa, still more preferably at least 200 MPa, and most preferably at least 250 MPa,
the fibres D being present in a volume concentration of at least 4%, preferably at least 5%, more preferably at least 7%, still more preferably at least 10%, still more preferably at least 15%, and most preferably at least 20%, calculated on the matrix A,
the volume concentration of the reinforcement B in the tensile zone or tensile zones of the article being at least 5%, preferably at least 7%, still more preferably at least 10%, still more preferably at least 15%, and more preferably at least 20%.

Structures and Recipes

With respect to the configuration of the reinforcement and the recipes for the constituents of the matrix, CRC covers a very broad spectrum. It is the interaction between the components which is essential in distinguishing CRC with it remarkable effects from known art phenomena which, to a large extent, might seen to utilize similar constructions and similar recipes.

As an example, the following table shows two matrix structures with fibre reinforcement showing the same degree of strain-hardening (according to the models I and II).

| Combination I | Combination II |
|---|---|
| $G_m = 100$ N/m | $G_m = 20$ N/m |
| $E_f = 2 \cdot 10^{10}$ Pa | $E_f = 7 \cdot 10^9$ Pa |
| $\tau = 2 \cdot 10^7$ Pa | $\tau = 2 \cdot 10^7$ Pa |
| $\phi = 0.06$ | $\phi = 0.06$ |
| $\sigma_o = 10^7$ Pa | $\sigma_o = 10^7$ Pa |
| $d = 0.00015$ m | $d = 0.000010$ m |
| (150 $\mu$m) | (10 $\mu$m) |

Combination I could be based on a matrix with up to 4 mm sand particles and 6 mm$\times$0.15 mm steel fibres, whereas combination II could be based on a pure cement/microsilica matrix and microfibres of glass (length 0.4 mm, diameter 10 $\mu$m).

The fibre reinforced matrix I is especially suitable as a matrix in CRC with a main reinforcement of a diameter of about 5-25 mm (adapted to the length of the fibres), whereas the matrix II is especially suitable in finer CRC structures with a main reinforcement with a diameter about 0.3-1.5 mm.

The use of the matrix II with the microfibres as a matrix in systems with a coarse main reinforcement with a diameter of about 5-25 mm would not be as preferred as the use of matrix I with respect to ductility in connection with the fixation of main reinforcement.

Admittedly, identical degrees of matrix strain-hardening and largely the same matrix tensile strength would be obtained, but the crack zone deformation ($\Delta$) and fracture enegy (G) of the fibre reinforced matrix would be expected to be only about 1/15 of the corresponding values for the matrix I.

Despite this, there are, however, cases where extremely fine fibres can be utilized very effectively in combination with coarse reinforcement. Thus, as an important aspect of the invention, microfibre-based matrix materials may be very efficiently utilized in systems with coarse main reinforcement by building up bi-modal (or multi-modal) fibre systems.

For example, the micro glass fibre-reinforced matrix II might be combined with 6% of chopped steel fibres with a diameter of 0.3 mm and length 12 mm in a bi-modal fibre-based matrix (III), which then might be used together with a main reinforcement of a diameter about 16-25 mm.

The bi-modally fibre-reinforced matrix III based on pure cement/silica binder is distinguished from the matrix I with coarse sand and only one fibre component (6 mm$\times$0.15 mm steel fibres) by showing:
1. a higher strain capacity
2. a higher tensile strength
3. a considerably larger crack zone defomation
4. a considerably larger fracture energy.

Thus, in these regards, the bi-modal fibre-reinforced matrix II is advantageous over the matrix I. However, in certain other regards, matrix I may be preferably for particular purposes: thus, matrix I will normally have a higher modulus of elasticity, and it is easier to incorporate other functional components such as abrasion resistant hard particles, e.g., in the from of 2-4 mm $Al_2O_3$-rich sand particles, in matrix I.

Thus, in view of the multitude of possible combinations, it is normally not possible to define the invention unambiguously by recipes only, and also from another point of view, such recipe definitions would not be sufficient either, as the necessary mutual adaptations of surface-physical character (for example between the dispersing agent, fine particles, fibres, etc. in the matrix), and the methods for preparing the shaped articles do nott appear from such recipe definitions.

However, in the following, novel recipes for materials and prescriptions for reinforcement arrangements will be disclosed. These recipes and prescriptions are novel per se and in combination and are believed to constitute valuable inventions in their own right, as articles made utilizing these recipes in accordance with proper techniques for preparing strong cement/microsilica matrices, as explained herein and as known from the International Patent Publication No. WO 80/00959, the International Patent Publication No. WO 81/03170, and the Ottawa Paper, will result in a valuable CRC structure with its unique functional characteristics.

1. CRC with 5-40 vol % reinforcement consisting of bars with a transverse dimension (diameter) of 4≅mm, such as steel bars, embedded in a fibre-reinforced matrix made with from 20 to 60 vol % of sand and stone with a maximum particle size of 10 mm, such as quartz sand or $Al_2O_3$-rich sand, from 4-20 vol % of fibres with a length of 2-12 mm and diameter (smallest transverse dimension) from 50 $\mu$m to 400 $\mu$m, such as steel fibres, and from 20-76 vol % of binder-forming material made from

| | |
|---|---|
| 20-50 vol % | of water optionally containing water-soluble polymer |
| 25-75 vol % | of cement, such as Portland cement, aluminous cement, slag cement etc. |
| 0-30 vol % | of inactive powder of a particle size of 2-10 $\mu$m |
| 5-40 vol % | of ultra-fine powder of a particle size in the range between 50Å and 0.5 $\mu$m, such as ultra-fine silica having a surface area (BET) in the range of about 200,000-250,000 $cm^2$/g |
| 0.5-4 vol % | of dispersing agent (on powder basis), such as a concrete superplasticizer, for example Mighty. |

In the above recipe, the particular values selected from the ranges stated should be selected according to the principles of CRC as explained herein. Thus, it will be preferred to combine a coarse main reinforcement (for example diameter 20 -25 mm) with the larger fibres (for example 8-12 mm) and also to combine high volume concentration of fibres (for example 10-20 vol %) with a low fibre length/diameter ratio (for example 1/20 to 1/10). For example, the beams of Example 1 were made with about 12% by volume of reinforcing bars of diameter 8 mm (the volume concentration of the reinfocement referring to 3 bars in a tensile zone defined as 50$\times$25 mm of the total cross section of 50$\times$50 mm of the beam), the fibre reinforced matrix being made with 44.6% of coarse quartz sand (maximum diameter 4 mm, 5.8% of fine steel fibres (0.15 mm$\times$6 mm), 49.6% of binder, the binder being made from 47.6% of cement of an average grain size of 10 $\mu$m, 16.1% of ultra-fine silica of an average particle size of 0.1-0.2 $\mu$m, 33.7% of water, and 2.8% of a concrete superplasticizer.

2. Another particular class of CRC based on cement and ultra-fine together with fine main reinforcement can be made from the following recipe:

CRC with 5-40% of reinforcement with a transverse dimension (diameter) 0.2-5 mm, such as continuous wires or chopped wires, for example made of steel, embedded in a fine fibre-reinforced matrix made from 4-20% of fibres with a length from 20 μm to 5 mm and a transverse dimension of at least 0.5 μm-200 μm and 0-50% of fine sand, maximum particle size 1 mm, together with 30-96% of binder-forming material made from

| | |
|---|---|
| 20-50 vol % | of water optionally containing water-soluble polymer |
| 10-75 vol % | of cement, such as Portland cement, aluminous cement, slag cement etc. |
| 0-30 vol % | of fine matrix particles (2-10 μm) |
| 5-40 vol % | of ultra-fine powder (50Å-0.5 μm), such as ultra-fine silica, vide above |
| 0.5-4 vol % | of dispersing agent (powder), such as a concrete superplasticizer. |

METHODS FOR PREPARING THE COMPACT REINFORCED STRUCTURES

The fact that the CRC structures are often extremely dense with complicated internal structure of the matrix (A) (comprising fibres, large particle, ultra fine particles, etc.) combined with the fact that the reinforcement may often itself be of a complex character (large amounts of reinforcement in complicated geometric arrangement) makes the part of the processing where the components are placed in correct position relative to each other very essential.

In principle, the components may be placed in their final position in various ways such as:

(1) The main reinforcement (B) may be arranged in a fixed position, and the matrix material (A) may be added.

(2) The main reinforcement (B) and the matrix material (A) may be combined, and the combined structure may be placed in the desired final position.

(3) The matrix material (A) may be arranged in the final position, and the reinforcement (B) may be incorporated into the matrix material.

(4) The solid components (the solid part of the matrix material (A) and the reinforcement (B)) may be arranged in the desired position, and the fluid or liquid phase may be incorporated, such as by infiltration with a melt (for example a metal or a plastic) or by infiltration with a monomer which polymerizes in situ.

Various principles known in the art may be used in these strategies, such as soft casting, extrusion, pressure or vacuum-assisted injection moulding, etc. However, the dense arrangements of the components will often require or make it desirable to use better processing techniques than the traditional ones (not necessarily new single processes, but often new combinations of such processes):

Some of the processing technologies disclosed in the following for arranging particles, fibres etc. of often very small size in desired configurations, often in very dense and homogeneous structures are novel per se and, as such, constitute aspects of the present invention.

These technologies are based on the principles of (1) dense packing and (2) viscous processing optionally combined with mechanical vibration. The principles are described in the following sections.

Principles of Dense Packing

It is known and well described in the literature that the obtainment of dense packing of fine particle systems, including particle systems with incorporated fibres, depends on a suitable selection of the geometry of the particles and the fibres, on the kinematics involved in the arrangement of the particles and fibres in the system, and on the overcoming of locking surface forces which would counteract the movement of the particles or fibres relative to each other during the arrangement thereof. However, a few important principles concerning the establishment of densely packed particle systems from liquid dispersions will be mentioned in the following, and in particular, the special and very useful system used in the examples, based on densely packed binders consisting of fine particles (cement particles in the examples) with ultra-fine particles (microsilica particles in the examples) homogeneously distributed between the fine particles, will be mentioned.

With respect to the selection of particle size, it should be mentioned that a densely packed particle fraction—e.g. compact-shaped fine particles between 10 and 20 μm—should be protected against dilution by securing a considerable gap in particle size between the fraction and both smaller and larger particles in the system. Thus, e.g., in the ultra-strong cement-based materials used in the examples, the dense packing of the strength-delivering cement particles was protected by gap in the particle size (for both larger and smaller sizes) system by using a relatively coarse sand on the one hand and ultra-fine microsilica particles that are considerably finer than the finest fractions of the cement on the other hand.

Where other particles or fibres of the same size as the specific component, e.g. 10-20 μm diameter glass fibres, are used, it is possible to compensate for the relatively high dilution of the cement fraction which takes place at the surface of these particles or fibres by adding a correspondingly higher proportion of the lower fraction (e.g. ultra-fine particles with a size below 0.5 μm).

These principles are demonstrated in Example 1. The approximately 10 μm cement particles were "protected" at one side with rather coarse sand (with very little material below 200 μm) and at the other side with microsilica (with very little material above 0.5 μm).

Large bodies in the fibre reinforced matrix (e.g., the 6 mm fibres, and the 4 mm sand, cf. Examples 1-4 and 6) also interfere with the main reinforcement and mould boundaries and thereby give rise to wall and barrier effects. (The wall effect refers to the fact that particles are packed more loosely in the immediate vicinity of a surface than in the bulk, and the barrier effect refers to the fact that there is not room for small particles in the narrow zones between big particles). The smaller the ratio between the size of the main reinforcement and the size of the largest matrix bodies is, and the higher the concentration of reinforcement is, the larger are the wall and barrier effects. The wall and barrier effect between large bodies in the reinforced matrix and the main reinforcement or the boundaries may be compensated for by reducing the amount of coarse bodies of the reinforced matrix relative to what could be present if the matrix were to be prepared in bulk.

In Examples 1-7, a very dense matrix material (A) was prepared and arranged in a dense final structure with a large amount of reinforcing beams so that the resulting reinforcing structure was extremely dense. The matrix (A) was coarse quartz sand (up to 4 mm), 6% by volume of steel fibres (6 mm×0.15 mm) and a binder consisting of cement and microsilica (average particle size about 0.1 μm) and water and dispersing agent. The entire structure was extremely dense, characterized by a very small interparticle space completely filled with liquid. The amount of liquid was extremely low, corresponding to 36.4% by volume compared to the binder (cement+silica+liquid). This is less than between half and ⅔ of the void volume resulting from ordinary concrete technology. The dense fibre-reinforced matrix was then arranged between densely arranged main reinforcement bodies and completely filled the space between the main reinforcement. The very dense structure was obtained by (1) having a well-defined particle system with gap grading also in the fine particle system (cement, microsilica) and (2) by making it possible to obtain this geometric arrangement by the use of an effective dispersing agent and a special processing technique (casting under vibration); these measures are discussed below.

The greatest difficulty in arranging small particles in dense and homogeneous packing in the matrix material (A) often resides in surface forces interlocking neighbouring particles, thus counteracting mutual movement during mixing and shaping, which movement is essential for the establishment of homogeneity and dense packing.

The above situation is of especial importance to systems with very small particles, and this is due to the fact that the interior cohesion resulting from locking surface forces between neighbouring particles increases with decreasing particle size as the cohesion is inversely proportional to the particle size. Thus, the cohesive resistance against mixing and shaping a particle system with submicron particles with a particle size of 0.01 μm is 1,000 times larger than for a geometrically equally shaped particle system built up from micron size particles with a particle size of 10 μm and 100,000 times larger than for a corresponding millimetre-size system (d≈1 mm).

Figure 13:
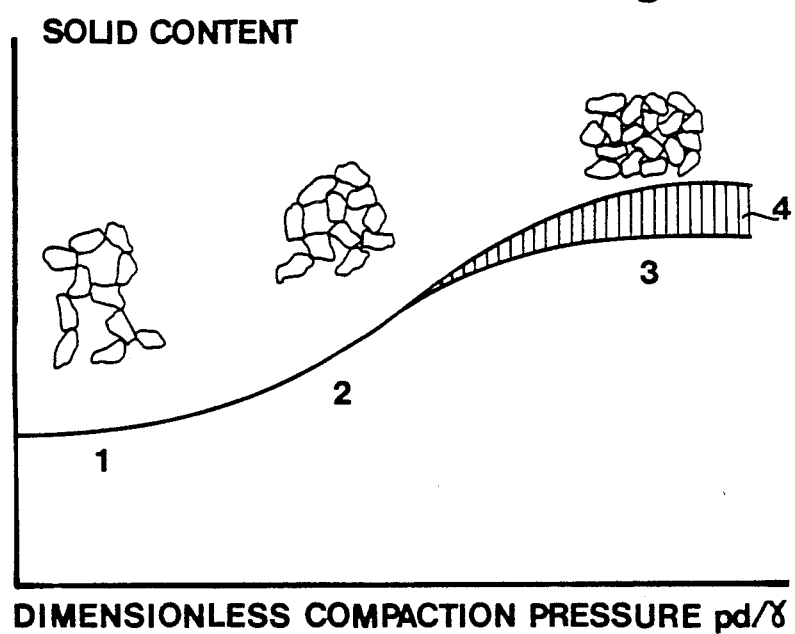

The effect of surface forces on the density of compacted particle systems is shown in a "master graph" in FIG. 13 which shows the density of particle material as a function of dimensionless compaction pressure $$\frac{pd}{\gamma}$$

wherein p is the compaction pressure, d is the particle size, and γ is the interparticle surface tension. In a zone 1, the surface forces which keep the material together against external compression predominate. There is no yielding or compaction. In a zone 2, the external loads and internal coherence balance so that internal yielding towards a denser packing takes place with increased dimensionless pressure. In a zone 3, the external loads dominate over the surface forces between the particles. It is only in this zone that a suitable particle geometry can be utilized effectively, in FIG. 13 illustrated as a range 4 instead of a single curve.

It is possible to overcome the locking effect by a combination of mechanical influences (pressure, shear, etc.) and reduction of internal resistance (by reducing the locking surface forces, building up of barriers—steric hindrance, electric diffuse double layer, etc.—which counteract direct particle contact).

In this section, it is shown how these means may be evaluated together by the presentation of a model containing both aspects combined in one expression. This permits predictions of behaviour of systems of particles of arbitrary size from the knowledge of the behaviour of one specific system.

This may for example be essential in connection with the transfer of experience with the CRC systems in Examples 1–7 to other ultra-fine particle-based CRC structures, such as, especially, fine ceramics with CRC structure.

For particles of compact, rounded shape, held together by surface forces, the forces required to separate two particles in point contact or to perform mutual sliding are proportional to the particle dimension (d) and the surface tension (γ)

$$F \approx \gamma d$$

The surface tension (or energy) γ is defined as (1) the surface tension between the liquid meniscus and surroundign fluid (usually air) when cohesion is caused by the meniscus or (2) the work required to create one unit area of new surface by removing plane-parallel faces from the contact area to infinite distance.

Under the assumption that separation and sliding resistance dominate over rolling resistance, the yield stress of a powder (which is proportional to the force acting on a particle, divided by the area of the particle) can be expressed as $$p \approx \gamma d^{-1}$$

where p is the applied shaping stress, or, in dimensionless form $$\frac{pd}{\gamma} = \text{constant}$$

or expressed in terms of rate of strain (ε) and viscosity of the fluid process matrix ($\eta_m$)

$$\frac{\eta_m \dot{\varepsilon} d}{\gamma} = \text{constant}$$

where the constants are functions of the geometry of the particulate system (relative particle size, shape and arrangement).

The quantity pd/γ (or $\eta \dot{\varepsilon} d/\gamma$) is a measure of the extent to which external stresses (p) are able to overcome internal cohesion (γ/d).

Ultra-fine particles subjected to surface forces are typically packed in a very open and agglomerated structure if the shaping takes place under moderate external pressure. This is a case of shaping of a particulate system with very low, dimensionless shaping stress field pd/γ, resulting in a correspondingly low particle concentration and strong agglomeration.

Figure 14:
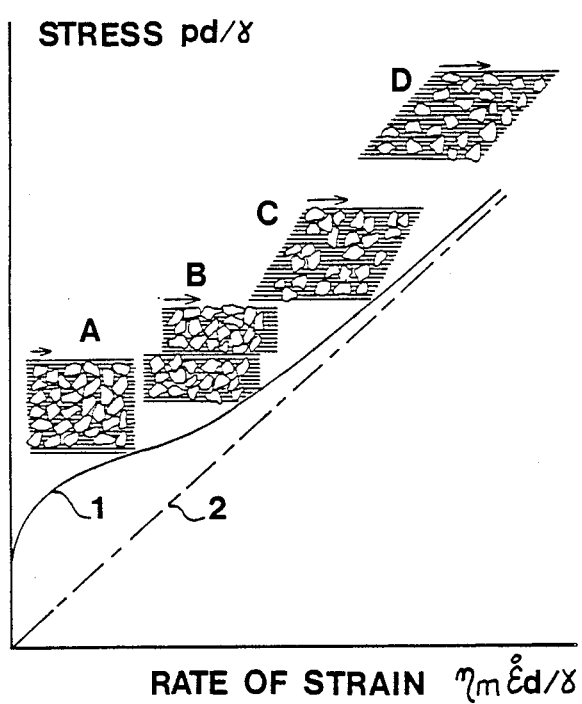

This is illustrated in FIG. 13 (discussed above) which illustrates various degrees of density, and in FIG. 14, which illustrates various degrees of dispersion.

FIG. 14 shows a graph 1 of stress versus rate of strain ε̇ for a system of particles in mutual attraction by surface forces (γ) embedded in a viscous fluid having a viscosity $\eta_m$. The X-axis is the dimensionless rate of strain, and the Y-axis is the dimensionless stress. p is the stress applied (shear), and d is the particle size. A graph 2 shows the theoretical behaviour of systems showing Newtonian flow. The sequences A-D correspond to the adjacent portions of the graph 1 and show the transition from pronounced solid behaviour (A) via a plastic to viscous behaviour (B-C) to a purely viscous behaviour (D).

The graph of FIG. 14 is a master graph for systems with geometrically equally shaped particle structures. Denser packing and more efficient dispersion can be achieved by (1) higher shaping stress (p≃ἐη), (2) reduction of surface forces, e.g. by means of surface-active agents, or (3) selection of larger particles.

For very high values of pd/γ, the effect of surface forces is practically overcome, which is e.g. the case for most systems built up of large particles in point contact under the influence of weak attractive surface forces, cf. e.g. a pile of stones. Here, the particle packing is principally a question of particle geometry, particle friction and the way in which the shaping is made.

The production of extremely strong and dense particle-based materials requires very fine particles arranged in dense packing.

Therefore, it is vital to have means to secure a very low particle/particle interphase tension (γ). This has a large bearing on the choice of ultra-fine particles and on methods for their preparation and further handling and on the choice and adaptation of shaping fluid including incorporation of additives such as surface-active agents or pH-controlling agents.

As mentioned above, a normally very difficult system of a very fine particle substructure with a high content of 0.1 μm diameter $SiO_2$-particles (microsilica) homogeneously distributed between cement particles and with a high amount of fine fibres was arranged extremely densely in Examples 1-7. This was done by the the above-mentioned suitable selection of the respective particle sizes and by the use an efficient dispersing agent effective for the combination of the solid and the liquid of the system in an effective amount.

Processing

In order to obtain a dense and homogeneous arrangement of particles and fibres, it is not sufficient to overcome surface forces. It is also necessary to ensure the necessary internal movement of particles, fibres, etc. This becomes increasingly difficult the more complicated the internal and external structure is. Thus, the formation of a suitable matrix A by mixing and casting of a liquid-containing mass comprising the particles and fibres often requires advanced process kinetics. A good internal movement of particles in the system may be aided by the establishment of a rather uniform stress field and deformation field throughout the casting mass during the processing (mixing or casting, etc.) by imparting substantially viscous behaviour to the casting mass—this may be obtained by embedding the particles in a viscous fluid with a suitable viscosity. In this connection, the term "fluid" refers not only to liquids as such, but also to fluid systems which are suspensions consisting of dispersed particles in a liquid phase such as, e.g. water/microsilica systems as seen from the point of view the larger particles (cement, sand, etc.) or water/cement/microsilica systems as seen from the point of view of the sand particles and fibres.

From a rheological point of view, the following is desired.

(1) The viscosity-dominated resistance should preferably dominate over the cohesive resistance—in order to avoid that the deformations will be limited to local flow zones and not uniformly distributed throughout the volume.

(2) The viscosity-dominated resistance should preferably dominate over the frictional resistance (i.e., the shear resistance caused by normal pressure) in order to avoid frictional blocking of the flow.

(3) In addition, the viscosity should not be unnecessarily high, as it should not give rise to unnecessarily high mechanical shaping forces.

In the following, the desirable properties and behaviour of the fluid are discussed:

Viscous-Cohesive Systems

For systems containing fine and ultra-fine particles, locking surface forces between the particles may significantly contribute to the total cohesive resistance. The surface force contribution to the cohesive resistance for geometrically equally shaped particle systems, cf. the explanation above, will be proportional to the surface force (surface tension γ) and inversely proportional to the particle size (d):

$$\tau \propto \frac{\gamma}{d}$$

Accordingly, in order to have viscous resistance to dominate over particle caused cohesion, it is required that $$\frac{\eta_m \dot{\epsilon} d}{\gamma} > \text{constant}$$

This means that for a given particle system (characteristic particle size d) with interparticulate surface tension (γ) to be shaped at a given rate of strain (ἐ), the following requirements to the viscosity of the fluid matrix should be fulfilled:

$$\eta_m > \frac{\gamma}{\dot{\epsilon} d} \times \text{constant}$$

which shows the important novel recognition that the viscosity of the shaping matrix should be increased inversely proportionally to the particle size.

Master graphs of the kind shown in FIG. 14 make it possible, i.a., to design composition (selection of fluid) and shaping condition for a submicron particle system (e.g. average particle size 0.05 μm) on the basis of experience with systems with larger particles (e.g. average size of 5 μm). Assuming that the particle shape/size distribution and the volume concentration are substantially identical, the requirement for obtaining the same degree of fluid behaviour $$\left( \text{the same value of } \frac{\eta_m \dot{\epsilon} d}{\gamma} \right)$$

a fluid of 100 times larger viscosity, or a 100 times higher shaping speed, or reduction of the surface tension by a factor of 100, or a corresponding change of several of these parameters at the same time is required.

Thus, the viscosity must be 100 times larger in a 0.1 μm particle system than in a geometrically equally shaped 10 μm particle system in order to obtain the same ratio between viscous resistance and cohesive resistance during the shaping.

$$\frac{\eta_m \dot{\epsilon} d}{\gamma} > \text{constant}$$

Consequently, the shaping stress ($p \approx \dot{\epsilon} \times \eta$) must, correspondingly, be 100 times larger in the small particle system.

The expression above also shows that a decrease of particle/particle surface tension ($\gamma$) will lower the requirement to the viscosity (and consequently also the requirement to the shaping stress). Therefore, the use of a matrix which is able to lower the particle/particle surface tension (that is, a matrix which functions as a dispersing agent) is one important way to improve the rheology of the system. Actually, for submicron particle-based systems, it is required in almost all cases that the fluid also functions as an efficient dispersing agent. In order to eliminate locking surface forces from internal liquid-gas interfaces, it is important that the fluid completely fills the pore space.

Viscous-Frictional Systems

CRC structures may, inter alia, be produced under medium to high pressure shaping (such as extrusion or pressure casting) where frictional forces which tend to block the flow have to be overcome. This is suitably obtained by imposing a substantially viscous behaviour on the system. In such systems where the dominating internal resistance is due to friction between the solid particles, i.e. the resistance to shear ($\tau$) caused by a normal compressive load (stress p) conforms to the expression:

$$\tau \approx \mu p$$

where $\mu$ is the coefficient of friction, the following requirement to the viscous resistance applies in order to achieve viscous dominance:

$$\frac{\dot{\epsilon} \eta}{\mu p} > \text{constant}$$

or $$\eta > \frac{\mu p}{\dot{\epsilon}} \text{constant}$$

Figure 15:
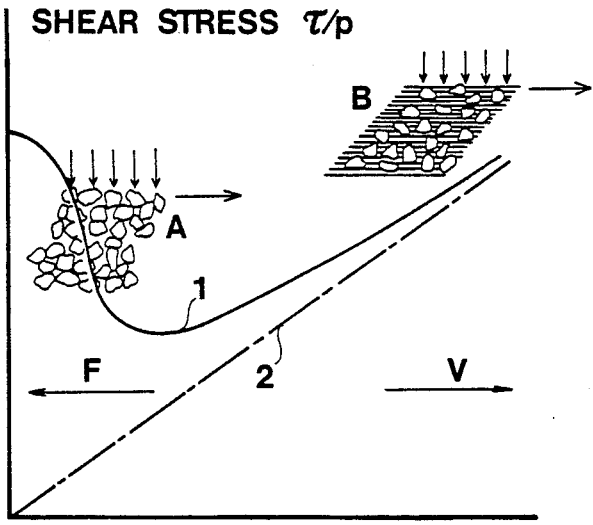

This is illustrated in FIG. 15 which shows the flow behaviour (graph 1) of a particle/fluid system subjected to shear while being under a compression corresponding to a normal stress p acting perpendicular to the shear forces; the resistance to flow is dominated by frictional forces and viscous forces. At A, there is a pronounced frictional behaviour (like that of a dry powder). At increasing values of the product of rate of shear and the viscosity of the fluid divided by the normal stress p, the flow becomes increasingly viscous (fluid-like) (B). Thus, arrows F and V indicate increasing frictional behaviour and increasing viscous behaviour, respectively. A graph 2 shows the behaviour of a fluid showing ideal Newtonian flow.

This means that the viscosity of the shaping matrix must be (1) larger, when the coefficient of friction is larger, (2) larger, when the confining pressure p is larger, and (3) larger when the rate of shear is smaller.

In addition to requirements concerning the magnitude of the viscosity, it will be seen that the shaping process is also aided by reducing the coefficient of friction. Therefore, in certain cases it is desirable to use lubricating additives—or to use a shaping matrix which in itself acts as a lubricant.

In the examples, a system in which viscous resistance dominated was established by incorporating a high volume of microsilica particles and using a very low amount of water, corresponding in a water/cement-+microsilica ratio of 0.18 calculated by weight. In this system, surface forces were eliminated by use of an effective surface active agent in an effective amount as mentioned above, and the microsilica also contributed to reducing the friction. Into this system, 2, 4 and even 6% by volume of fine fibres were incorporated. As indicated above, this is 2 to 4 times more than would be possible in ordinary concrete practice. In ordinary concrete practice 2 to 3 times as much water would have been added in order to obtain flowability; such a system would, however, result in a system with a fluid of low viscosity and hence a powder/fluid system with high frictional resistance in which it would not be possible to incorporate such high amounts of fibres.

In Example 6, the viscous flow behaviour of the material is demonstrated in connection with the casting between very densely arranged reinforcement bars (27% by volume).

Vibratory Processing

As the CRC is normally established with particle systems and dense packing, vibratory processing is often essential in order to achieve the desired dense and homogeneous arrangement.

In connection with the production of CRC, vibratory processing plays a vital role in ensuring the very high packing density of the particles and fibres under geometrically complicated conditions, typically with very densely arranged main reinforcement.

Vibration can be used to help promote viscous flow in connection with mixing and casting, making it possible to perform these operations with a substantially higher particle concentration than in normal production practice.

With heavy main reinforcement, it might seem difficult to transfer the oscillating load deeply into the body because there will be extensive damping due to sliding between the material and the reinforcement. However, the apparent disadvantage of heavy reinforcement can be turned into an obvious advantage by using the stiff reinforcement to transfer the oscillating stresses, such as is done in Example 6. This is contrary to normal practice in reinforced concrete, where vibration applied to the reinforcement causes separation of the concrete adjacent to this. However, in a high viscosity system, especially one with a high content of fine fibres, practically no separation occurs.

A special aspect made possible by the vibration via the reinforcement is the use of high frequency vibration. High frequency vibration requires a short distance from the vibration source to avoid large damping in the viscous mass. Thus, in Example 6, the distance from the oscillating reinforcement was at the most about 8–10 mm during the casting of a specimen of a thickness of 120 mm.

Also the mixing may be added by vibration or, in a special embodiment, by combined vibration and pressure. This process is, in particular, important in systems with very fine particles and high concentration, as systems of small particles and a small amount of liquid will be locked by liquid meniscus-surface forces in an open structure if the system is not completely saturated.

APPLICATIONS

As appears from the present specification, CRC is a completely new type of composite material
(1) having unique mechanical properties (combination of high strength, high rigidity, high ductility) with the ability to perform under extreme environmental conditions (over large temperature ranges, under heavily abrasive conditions, under severe chemical conditions, etc.),
(2) having unique possibilities for being specially designed to meet special requirements by suitable combinations of overall structural design and material design, such as, e.g., by placing special reinforcement, protecting components or functional components in the right positions, and
(3) being typically prepared from conventional components (reinforcing bars, fibres, cement, etc.) in basically simple processes (building up of reinforcing structure, mixing, casting, under vibration, etc.) normally performed at ambient temperature with modest requirements with respect to physical or chemical requirements (such as ambient temperature, chemical environment) and normally with utilization of materials and methods which give rise to no or very modest health hazard problems (normally water based liquid, powders of low health hazard, ordinary temperature, slowly moving machine parts, noise problems which are at levels similar to or lower than what is normal in the concrete industry).

It is therefore envisaged that CRC will obtain a broad range of applications in its own right, similar to what happened to steel, plastics, and concrete.

CRC may be used as more or less pure CRC members or structures, such as CRC plates or beams, but in many cases CRC will be a major part of members or structures containing other structural or functional elements such as, for making large machine parts (e.g. gear boxes, heavy ship parts, moulds for casting large members of plastics or rubber or pressing tools for shaping metal panels etc., or CRC may constitute minor parts of the total structure placed in critical locations to transfer very large concentrated loads (such as joints and bearing plates in large bridges of steel or concrete, fixation zones for pre-stressing steel in pre-stressed concrete, corners in frames of steel or concrete to transfer large bending moments, etc.).

Surface Cracks/Surface Protection

In a typical CRC structure, the most strained surface layers will normally be the part of the structures which are most likely to form cracks in the matrix.

The reasons for this are:
(1) This zone is often the most strained.
(2) The crack-stopping effect of the reinforcement is smaller than (a) close to the surface of the reinforcement and (b) in spaces between two or three bars.
(3) The reinforcing effect of the matrix fibres is smaller at boundaries due to smaller fibre concentration (thus, the outermost zone of say 1 mm in the materials in the examples where 6 mm fibres were used contained practically no reinforcement at all).

These facts are of importance to (1) the interpretation of the type of visible surface cracks, especially with respect to estimations concerning how far the cracks have penetrated into the body (for example whether the cracks pass the reinforcement or not) and (2) for the performance of the surface itself as a protective surface (for example against chemical and mechanical attack).

A consequence of this inherent weakness of the surface, combined with the unique resistance of the CRC structures to crack propagation, is that a CRC structure may show surface cracks, and even long surface cracks, which do not pass the main reinforcement, these cracks being developed only in the outermost layer outside the main reinforcement.

This is in strong contrast to what is normally experienced in conventional reinforced concrete, where the reinforcement is not capable of stopping cracks.

In many cases, the surface performance of structures is of importance, and there are case where even fine cracks on CRC surfaces are unacceptable, or where special chemical structures are required in the outermost layers.

With the large number of possibilities with respect to production methods for CRC and the possibilities of post-treating CRC surfaces, there are many ways in which the surface properties of CRC structures may be improved:
(1) The CRC member may be provided with a surface film or layer with sufficient flexibility and with a desired chemical structure, either by pre-arranging the film or layer before casting or by fixing a surface film or layer to the solid CRC material surface, e.g. by gluing, electroplating, plasmaspraying, etc.
(2) To pre-arrange fine fibre meshes, for example 1–10 layers of meshes with threads of a diameter of 10–100 $\mu$m, in the mould prior to the casting, hereby providing a special protection of the outermost say 200–1000 $\mu$m layer.
(3) To use a special finer main reinforcement in the outermost layers, for example a reinforcement of a diameter of 2–6 mm in systems which otherwise contain reinforcement bars of a diameter of 20 mm, thereby ensuring a protection against crack in the outermost 10–20 mm similar to what would have been obtained if the complete main reinforcement had been changed to 2–6 mm diameter reinforcement.

Pre-stressed CRC

It is known to pre-stress concrete, typically with strong threads, cables or bars which are subjected to high tensile stresses and which, by being fixed to the concrete confer stabilizing compression stresses to the concrete, this increasing the ability of the concrete body to resist tensile forces (load in pure tension or in bending).

The same principles may be utilized for preparing CRC with quite extreme properties. By pre- or post-stressing CRC bodies in the direction of the main reinforcement with strong threads, the CRC structure (matrix+main reinforcement) is brought into a compressed state.

Thereby, the capability of the CRC structure to transfer tensile stresses in bending and under pure tensile loads without the formation of any cracks passing the reinforcement is increased very considerably.

For example, a pre-stressed version of the structure illustrated in Example 1 (modified with an extra reinforcing bar in the upper part), with a pre-stressing to a formal compression stress of about 100 MPa will increase the bending capacity from about 160 MPa to about 210 MPa and the tensile capacity from about 100 MPa to about 200 MPa.

The pre-tensioning may, for example, be established with 6-7% of pre-tensioning wire with a yield strength of 2500 MPa pre-stressed to 1500 MPa.

With strong cement/microsilica-based CRC structures, for example having bending strengths of about 300 MPa and tensile strengths of about 200 MPa, it will be possible by pre-stressing to prepare bodies having bending capacities and tensile capacities which are both about 400 MPa.

It will be understood that the pre-tensioning technique is especially suitable for structures which are to be subjected predominantly to tensile stresses, for example, large high-pressure tubes or pipes or containers.

FIG. 16 shows sections of two pre-stressed CRC articles. A shows a part of a pre-stressed cylinder shell or spherical shell, and B shows a section of a pre-stressed plane plate. 1 designates a fibre reinforced matrix, 2 designates a main reinforcement, 3 designates stressed wires, 4 indicates the tensile forces in the wires, 5 indicates the pressure built up in the structure consisting of matrix and main reinforcement to balance the pre-stressing forces, and 6 shows a cover layer protecting the pre-stressed wires in A.

In B, the tensile wires are placed in a pre-stressed condition prior to the casting, fixed outside the plate. After casting and solidification, the fixation is released, the tension in the wires being retained either by end fixation of the wires at the ends or simply by shear fixation in the matrix.

Plates or Shells Designed to Resist Large Concentrated Forces

An important application of CRC is plates or shells which are to resist very large concentrated loads perpendicular to the plane of the plates or shells, for example large impact influences in connection with blowing or explosion.

The failure or destruction of plates subjected to concentrated loads perpendicular to the plane of the plate will in most cases take place either by bending or by punching where a truncated cone-shaped body is pressed out.

CRC plates or shells produced according to the same principles and from the same materials as in the Examples 1-4 and 6 will have bending capacities of 130-230 MPa (normalized moment), whereas conventional quality panels of reinforced concrete will have bending capacities of only 15-25 MPa.

Thus, such CRC plates or panels can resist 5-15 times larger loads in bending than similar plates of conventional reinforced concrete of high quality, or the thickness of the plate or panels to obtain the same load in bending as conventional reinforced concrete may be reduced so that the CRC plates will have thicknesses of only 25-45% of the thickness of corresponding plates or shells of good conventional reinforced concrete.

By incorporating a higher concentration of and/or stronger reinforcement than in the examples, the bending capacity can be further increased (or the thickness further reduced).

Where the failure or destruction takes place by punching, such as is, for example, often the case at explosion or blowing loads and impact with strong concentrated loads, the load capacity is not increased correspondingly by increasing the amount of reinforcement in the plane of the plates or shells, as this reinforcement does not have the same influence on the resistance against the formation of the punching failure proper in the matrix as it has on the bending capacity of the matrix (the reinforcement, however, may have a considerable importance for the succeeding removal of the destroyed concrete).

In spite of this, CRC structrues without any special transverse reinforcement will also in this case have a considerably better performance than normal concrete, because the tensile strength of the matrix material is typically 3-5 times higher and because the very tough CRC matrix also confers considerably more ductility.

In addition to increasing the resistance against formation of punching failure in the matrix, the ductile matrix also results in a considerably better fixation to the main reinforcement after a local fracture in the matrix material has taken place. This ensures that the highly concentrated main reinforcement will also keep the partially destroyed matrix materials far better fixed than is the case in conventional reinforced concrete or fibremodified reinforced concrete. Thereby, the resistance to larger destructions (total collapse) is very considerably increased.

Really high resistance against punching failure, however, requires a transverse reinforcement. In plates or shells where the point of attack of the load is known, such as for example in column/plate structures, it will often be relatively simple to incorporate a special transverse reinforcement against punching failure, such as it is known, e.g. from conventional reinforced concrete.

However, where the point of attack of the loading is not knwon, it is very difficult to arrange an effective transverse reinforcement in known art structures. This is especially the case with plates or shells with a high concentration of main reinforcement, where there is simply little room for such a transverse reinforcement, as the necessary fixation around the main reinforcement requires a considerable space.

This might indicate that in CRC plates or shells with typically an extremely high concentration of main reinforcerment, it would be very difficult or even impossible to introduce an effective tranverse reinforcement. This difficulty would seem to be additionally increased by the fact that it is often desired to utilize the high bending capacity of the CRC plate or shell by using very thin plates or shells, which would require an especially high concentration of transverse reinforcement to resist punching failure.

However, the exceptionally good fixation of reinforcement which is characteristic to the strong ductile fibre reinforced matrix of the CRC structures, permits the design of the transverse reinforcement in the form of straight bars which are easily effectively fixed at their ends in the embedding matrix material with an efficiency comparable to a bolted connection.

This design makes it possible to arrange the effectively functioning transverse reinforcement in an extremely high concentration, especially in systems with an extremely high concentration of main reinforcement, such as is explained below.

A model casting with a high percentage of transverse reinforcement (about 8%) is described in Example 6. A corresponding plate is shown in FIG. 17 B.

Figure 17A:
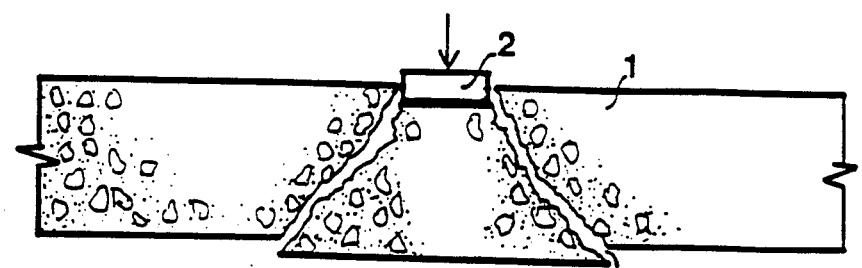
Figure 17B:
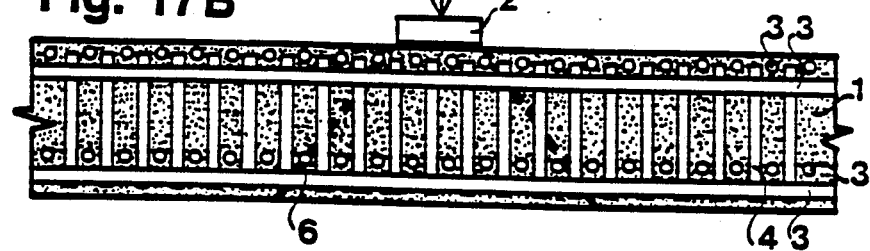

FIG. 17 A shows the situation where a plate and unreinforced matrix material 1 is subjected to a concentrated load 2 acting perpendicular to the plate and causing punching failure of the plate as illustrated by the crack 5. B shows a CRC structure subjected to a similar type of load. The CRC structure consists of a fibre reinforced matrix 1 and upper (3-3) and lower (3-3)

layers of reinforcement bars arranged perpendicularly to each other. In addition, the structure contains transverse reinforcement bars 4 arranged perpendicularly to the above-mentioned layers, one transverse bar in each mesh. 6 designates a fictive failure cone, the formation of which is impeded by the transverse reinforcement. With reference to the figures in Example 6, the volume concentration in each horizontal direction was 10.4% and the volume concentration of transverse reinforcement was 7.7%. With a larger diameter of the transverse reinforcement, for example from 10 mm to 12 mm or 14 mm, the volume concentration could be increased to about 12 or 15%.

The structure illustrated FIG. 17 B is an example of an article having three-dimensional CRC structure.

In fact, the very high concentration of main reinforcement which is typically of CRC (for example main reinforcement in the form of a "net" with meshes of the order of only 0.8–1.5 times the transverse dimension of the reinforcement) harmonizes excellently with a very effective transverse reinforcement:

1. There is plenty of space for a very high concentration of transverse reinforcement.
2. The main reinforcement forms a natural frame work for placing the transverse reinforcement.
3. The main reinforcement contributes very effectively to ensuring the strong fixation of the ends of the transverse reinforcements by counteracting matrix splitting.

By incorporating such an effective transverse reinforcement in a form of for example 5–15% by volume of steel bars with a diameter of about 10 mm in CRC plates or shells of the types as shown in FIG. 17, the resistance to punching failure is very considerably increased.

The resistance against punching or cleavage of the matrix materials in the plane of the plate or shell is considerably increased, typically from about 5–30 MPa to about 70–220 MPa (referring to formal tensile stresses), in other words corresponding to a factor of 5–10.

The ability to absorb energy is increased even more, as, in addition to the 5–10 times increase in force, the system, a perhaps 20–100 times higher deformation ability (crack zone deformation) is obtained, resulting in an increase of the fracture energy from about 10,000–20,000 N/m to perhaps about 500,000–2,000,000 N/m.

Finally, the transverse reinforcement effectively contributes to fixing the matrix material after a matrix failure has taken place, whereby the resistance against larger destruction and total collapse is additionally strongly increased by incorporation of the special transverse reinforcement in CRC plates or shells.

CRC—Ceramics

An interesting aspect of the invention are articles in which the base matrix C is a ceramic matrix. There are two main lines of development which have been made possible through the present invention:

(1) Large ceramic members of structures which are heavily reinforced with bars similar to those used in Examples 1–4 and 6, i.e., bars of a diameter of several millimetres, the matrix C being made, e.g., from refractory components such as refractory cement, $Al_2O_3$-sand and fibrous reinforcement of high temperature alloyed steel, and (2) smaller bodies of high quality ceramics based on ultra-fine powders of diameters below 1 $\mu$m, such as $Al_2O_3$, $ZrO_2$, or $Y_2O_3$, reinforced with fine ultrastrong whiskers of a diameter of 1–10 $\mu$m ($Al_2O_3$, silicon carbide, silicon nitride) with a main reinforcement of diameter 0.2–1 mm of high strength metal alloys such as steel alloys, ceramic fibres such as $Al_2O_3$, SiC or $Si_3N_4$, carbon fibres, etc., the reinforcement being of the form of "thin single threads or consisting of yarns or cables spun from single threads".

The CRC ceramic structures, in particular the large CRC ceramic bodies or articles, constitute a new range of large rigid, strong and ductile structures which are able to perform at high temperature; it is envisaged that they will be able to perform excellently up to 600° C. or even up 800° C.

These articles may be normal structural components in kilns or components used in structures where abrasive materials are transported. However, a very interesting new aspect is constituted by large machine parts operating safely at the above mentioned temperatures which are far above the temperatures at which large machine parts of steel or other known material can operate.

The fine ceramics CRC structures open up the possibility of establishing a new range of high performance medium size bodies such as high performance motor components of sizes far larger than those which may be produced with the known high quality fine ceramics materials.

CRC structures with a base matrix of fine ceramics obviate the brittleness of fine ceramics which has hitherto limited the use of fine ceramics to very small members.

A major problem in the production of ceramics is the contraction during sintering and cooling. Up till now, this contraction has severely limited the use of reinforced ceramics due to the thermal stressed which would be introduced between the ceramics matrix and the reinforcement. However, the high ductility of the CRC matrix, also based on ceramics materials will strongly reduce the adverse effect of matrix contraction. However, as the temperature ranges involved during the production of ceramics are typically very large, for example from 600° C. to above 1000° C., it is recommendable also to use other available means for reducing the matrix contraction. Thus, in large CRC structures based on refractory sand it is, e.g. advisable to minimize the amount of the fine component which forms the binder material by sintering, as it is within this binder component that the main contraction takes place.

In connection with fine ceramics of high quality, it is necessary to form a sintered product from rather pure materials which, on the other hand, normally requires a very high sintering temperature. This poses severe limitation on the selection of fibres and main reinforcement. One way to overcome these problems is to form the ceramic matrix from ultra-fine powder by low temperature sintering. This permits a very natural and rational process as, as mentioned above, fine particle-based structures are a necessity for producing the fine matrix structure reinforced with 1–10 $\mu$m diameter whiskers.

The mixing and shaping of the ceramic matrix are suitably performed using the viscous flow processing, preferably aided by vibration as explained above, the same physical principles as explained in connection with cement being used, but, of course, scaled down so as to become adapted to the much finer particle size in accordance with the teachings above, including the master graphs.

Members for Low Temperature Performance

It is known that steel gets brittle at low temperatures and is therefore not suitable for structures which are to carry high load under low temperature conditions.

CRC structures, for example based on cement and sand and steel reinforcement, show high ductility both at normal temperature and at low temperature, even if the reinforcement itself becomes brittle.

This is due to the well known composite philosophy, where the use of brittle materials (for example glass) as a reinforcement in the form of fine fibres and plastics results in a high performance composite, liberated from the brittleness, due to the fact that cracks cannot spread like in bulk material. CRC built with brittle reinforcement (for example steel bars, which are brittle at a temperature of from $-100°$ C. to $-200°$ C.) and a fibre reinforced cement based matrix is, in fact, an upscaled version of the glass fibre composite. At low temperature, the steel gets brittle, but the matrix performs just as ductile as before, which means that the structure will perform exactly as well as at normal temperatures up to yield point of the steel.

A Comparison With Reinforced Concrete

In order to compare structures according to the invention with similar materials and structures according to the known art, references are made to the reinforced structure according to the invention disclosed in Example 1, compared with tests on ordinary reinforced concrete plates reported by Johansen, K. V., "Brudlinieteorier", Polyteknisk Forening, 1958.

This is done because the test results by Johansen are given in a form which makes it possible to perform a comparison, despite the fact that the plate thickness is much larger in Johansen's experiments than the 5 cm in Example 1.

Johansen refers to experiments with "uniformly" distributed load on plates of the dimension 312×312 cm and on plate strips of width 8 cm.

Johansen calculated the rupture moment (moment per length) of the plates. Table A states the calculated moment per length for the actual thickness and for the corresponding moment transferred to a 5 cm thick plate (the moment being proportional to the thickness in the second power).

Thus, a very simple structure according to the invention (with a reinforcement of less than 50% of that in Example 1 placed unidirectional and a similar amount placed perpendicular to the first) is more than 4 times stronger than a heavily reinforced plate according to the known art. Furthermore, this strength is exerted without any crack formation, while the ordinary plates crack heavily at loads of only approximately 1/5 of the rupture value.

With heavy reinforcement with high quality steel, the bending capacity of the cement based structures according to the invention may easily be doubled or tripled.

A very special use of the new structure according to the invention is in pressure moulds for casting fluid and plastic masses such as plastic, rubber, etc. where tensile cracking makes the use of ordinary concrete (even the very strong types) unsuitable. Now, with tensile strain capacities of the structure according to the invention of more than 1.0 to 2.0 or even more than 3.0 mm/m, the use of such structures for pressure moulds for casting of fluid and plastic masses becomes very promising.

EXAMPLE 1

Bending Tests On Small Beams

Materials Used

Quartz Sand

The quartz sand was composed of three fractions used in the following parts by weight ratios:

| Fraction | Parts by Weight |
| --- | --- |
| 1–4 mm | 4 |
| 0.25–1 mm | 2 |
| 0–0.25 mm | 1 |

The density of the quartz sand mixture was 2.630 kg/m$^3$.

White Portland Cement

Density (estimated) 3150 kg/m$^3$
Specific surface (estimated) about 400–450 m$^2$/kg Microsilica Fine SiO$_2$-rich powder with spherical particles produced by condensation from a gaseous phase obtained as by-product from the production of silicium metal in electrical furnaces. Specific surface (determined by

TABLE A

The fracture moment and bending stress of reinforced plates according to Johansen compared to those according to the invention. The fracture moment of the beams according to the invention is taken conservatively as 50% of the value obtained in Example 1 with 6% fibres and steel bars with yield strength 510 MPa = 5100 kg/cm$^2$ $$M = \frac{1}{2} \times 3550 \times \frac{1}{0.05} = 35,500 \text{ Nm/m}$$

$$= 3.55 \text{ tons}$$

which corresponds to a bending stress of 85 MPa.

| Yield strength of steel kg/cm$^2$ | Vol. conc. of reinforcement % | Plate thickness cm | Bending stress MPa | Actual tons | Fracture Moment (per length) Calc. for 5 cm plate tons | % relative to present invention |
| --- | --- | --- | --- | --- | --- | --- |
| 4080 | 0.58 | 8.1 | 11 | 1.19 | 0.45 | 13 |
| 5292 | 2.0 | 8.1 | 21 | 2.27 | 0.86 | 24 |

This example clearly shows that the structure according to the invention is many times better than ordinary reinforced concrete.

B.E.T. technique) about 25,000 m$^2$/kg corresponding to an average particle diameter of about 0.1 μm. Density about 2220 kg/m$^3$.

Dispersing Agent (Powder)

A so-called concrete super plasticizer, trade name "Flube", a sodium salt of highly condensed naphthalene sulphonic acid/formaldehyde condensate. Density of powder about 1600 kg/m³.

Water

Common tap water, density 1000 kg/m³.

Steel Fibres

Cylindrical brass coated steel fibres "Dramex" from Bekaert, Belgium, diameter 0.15 mm, length 6 mm. The material is declared to have a tensile strength of 525 MPa.

Reinforcing Steel

Deformed steel bars, diameter 8 mm - KS 410-S "Kamstal", yield value stated to be above 410 MPa.

The yield stress and rupture stress (tensile strength) of the 8 mm diameter bars were determined by tensile tests. The results were as follows:
yield stress 500–510 MPa
rupture stress (tensile strength) 610 MPa
strain at rupture
(in the rupture zone, measured on a length of 8 mm) 25%
(measured outside rupture zone) 14%

PREPARATION

The beams and additional test specimens were prepared as follows:

1. The composition of the mixes appears from Table 1.

TABLE 1

| Mix Ingredients | | g | g | g | g |
|---|---|---|---|---|---|
| White Cement | | 7750 | 7750 | 7750 | 7750 |
| Microsilica | | 1850 | 1850 | 1850 | 1850 |
| Flube | | 230 | 230 | 230 | 230 |
| Quartz Sand | 0–0.25 mm | 1950 | 1876 | 1800 | 1727 |
| | 0.25–1 mm | 3950 | 3791 | 3642 | 3492 |
| | 1–4 mm | 7900 | 7601 | 7299 | 7001 |
| Water | | 1740 | 1740 | 1740 | 1740 |
| Fibres | | 0 | 1570 | 3140 | 4710 |
| Fibre Content, vol % | | 0 | 2 | 4 | 6 |

2. The mixing was performed in a planetary mixer as follows:

Cement, microsilica, Flube and sand were dry mixed for two minutes. Thereafter, the water was added, and mixing was continued for additionally 10 minutes. Then, fibres were added and mixing was performed for additionally 5 minutes.

During the first few minutes of mixing after the addition of water, the mass had a dry appearance. Then, it underwent a rather sudden change into a dough-like mass which gradually changed to a softer, glossy viscous mass, indicating complete saturation of the system.

After addition of fibres, the visual appearance was the same, but the resistance to shear during the mixing was much higher.

3. The consistency of the finished mixes ready for casting was determined by spreading cone test (ASTM C230-368). The results are as shown in Table 2.

TABLE 2

| Mixture % fibres | Spreading cm |
|---|---|
| 0 | 13.5 |
| 2 | 11.5 |
| 4 | 5.5 |
| 6 | 1.9 |

4. Test specimens (cylinders of diameter 4.5 cm, length 9 cm and cylinders of diameter 10 cm, length 20 cm, non-reinforced beams of dimensions 5×5×50 cm³ and reinforced beams of the same dimensions were cast under vibration on a standard vibrating table with a frequency of 50 Hz and an acceleration of about 30–50 m/sec². Each of the reinforced beams contained 5 deformed bars (length 500 mm, diameter 8 mm) placed in a fixed position in the mould prior to casting. The arrangement of the reinforcement bars in the beams appears from FIG. 23 which shows a cross section of the beams, 1 designating the deformed bars, and 2 designating the fibre reinforced matrix. The distance between each bar and the nearest surface of the beam was 6.5 mm, and the distance between nabour bars in the bottom zone was also 6.5 mm.

5. The cast specimens were covered with plastic and kept at 20° C. at 100% humidity for 24 hours. Then they were cured in water at 80° C. for 24 hours.

DENSITY

After curing, the density of all the specimens was determined by determining the weight in air and the weight submerged in water (at 20° C.). The densities appear from Table 3 where the measures determined are given together with the calculated values, the calculation being based on the mixing components, assuming 100 percent dense packing (i.e. without air).

TABLE 3

Density of Cast Concrete (kg/m³) With 0, 2, 4, and 6 vol % of Steel Fibres, Respectively
Numbers in parentheses designate standard deviation. In all series, three specimens were prepared.

| | | Vol % of Steel Fibres | | | |
|---|---|---|---|---|---|
| | | 0 | 2% | 4% | 6% |
| Density CalculatedFrom Mix Composition | | 2434 | 2533 | 2633 | 2733 |
| Density Measured on Cylinder of Dimensions 4.5 × 9 cm | (mix A) | 2406 (1) | 2530 (7) | 2633 (3) | 2746 (3) |
| | (mix B) | 2425 (6) | 2535 (2) | 2630 (2) | 2739 (5) |
| Density Measured on Cylinder of Dimensions 10 × 20 cm | (mix B) | 2431 (1) | 2536 (4) | 2642 (4) | 2745 (1) |
| Density Measured on Beams of Dimensions 5 × 5 × 50 cm Non-reinforced | (mix A) | 2407 (2) | 2507 (1) | 2615 (3) | 2718 (3) |
| Density Measured on Beams** of Dimensions 2 × 5 × 50 cm Reinforced | (mix B) | 2400 (4) | 2525 (6) | 2615 (5) | 2730 (1) |

**The density refers to the concrete alone. The values were determined by subtracting weight and volume of bars from the total values.

The results show that the packing of the concrete is very dense, indicating an air content below 1% for all the mixes, including the mix with an extremely high fibre content in narrow beams with heavy reinforcement.

This illustrates that the processing technique is very well suited for establishing this unusual structure. Table 4 shows the volumetric composition of the structures.

TABLE 4

Volume Concentration of the Mix Components in liter/m³ (Calculated From the Assumption That the Air Content is Zero)
As appears from Table 1, the air content in the mixes is so small that the values stated in the present table also represent the concentration in the final structures after compaction.

| Type of Matrix indicated by Volume Concentration of Fibres | 0 | 2% | 4% | 6% |
|---|---|---|---|---|
| Water | 167 | 167 | 167 | 167 |
| Dispersing agent (powder) | 14 | 14 | 14 | 14 |
| Microsilica | 80 | 80 | 80 | 80 |
| White Cement | 236 | 236 | 236 | 236 |
| Quartz sand | 503 | 484 | 465 | 446 |
| Steel fibres | 0 | 19 | 39 | 58 |

As the dispersing agent is dissolved in the water, the concentration of the cement plus microsilica in the binder (cement+silica+liquid+air) is 63.6%, and the porosity is 36.4%.

This is a very high volume concentration of solid for a cement binder, in fact so high that it corresponds to densities obtained by high pressure vibratory compaction of well graded cement powder (optimal grading from a density point of view prepared in the form of small cylinders, diameters 11 mm, height approximately 10 mm) (cf. Bache, H. H., "Densified cement/ultra-fine particle-based materials" presented at the Second International Conference on Superplasticizers in Concrete, June 10-12, 1981, Ottawa, Canada (Ottawa Paper)).

The compaction experiments on graded cement powder in this reference were performed with oscillating pressure of about 5 MPa at a frequency of 100 Hz for about 2 minutes.

These experiments were made to illustrate what was at the time believed to be an upper limit only to be achieved in the laboratory - on pure cement powder specimens of very simple shape suitable for pressure compaction.

These visions, however, have now been brought into reality in accordance with the present invention under the following conditions which would be believed not to permit such results:
1. Soft casting combined with
2. Complicated internal structure (coarse particles, fibres, etc.) and with
3. Complicated external structure with very slender beams (50×50 mm) with a high concentration of main reinforcement (five 8 mm diameter deformed bars).

Comments

In order to achieve good mechanical behaviour, it was desired to have a high content of relatively large particles and a very high fibre content. From a geometrical and kinematical point of view, large particles are normally undesired, both due to interference with the main reinforcement and due to interference with the fine fibres. However, in the present case, very high fibre content (up to 6% by volume) was used, and in addition quartz particles up to 4 mm of diameter. This must be considered very large particles compared to the diameter of the reinforcement (8 mm) and compared to the available space between the reinforcement bars and between the bars and the mould sides (6.5 mm). In order to secure the necessary fluidity (viscous shaping) of this complex mix, the following precautions were taken:

1. The fine particle part (cement+microsilica) was converted into a fluid system (in spite of its extremely dense packing) by saturation with a very low amount of water (0.18 by weight).
2. An efficient dispersing agent effective for the combination of solid and liquid in this system was used in an effective amount.
3. The fine particle-based fluid was given a high specific viscosity and a large internal coherence (no water separation) and low frictional resistance by using a high concentration of the microsilica.
4. The flow of the mass containing quartz particles and fibres was made possible by using slightly more fine particle/fluid material than would have been necessary from a purely geometrical point of view.
5. The necessary excess of the fine particle/fluid material was kept low by casting under vibration.
6. With increasing amount of fibres an adjustment was made by removing a similar volume of coarse particles.
7. The desired viscous consistency of the mass (sand, cement, microsilica, fluid) was utilized to incorporate a large amount of fine steel fibres.

In may respects, this strategy is different and to some extent in conflict with traditional reinforced concrete technology. The mixing time was much longer than used in ordinary concrete practice (17 minutes as opposed to 1-2 minutes):

Re 1. It is contrary to the teaching of ordinary textbooks on concrete technology to add ultra-fine powder to the cement/water mix in order to reduce the water requirement, the normal traditional teaching being that fine particles will increase the water demand (this new approach of replacing water with fine particles is explained in the above Ottawa Paper).

The ratio water/cement+microsilica) is low (about 0.18 by weight), thereby securing a high quality of the final product and securing the desired viscous shaping. This low ratio is not conventional in reinforced concrete where a water/(cement+other fine particles) ratio of 0.30 by weight is normally considered very low and is considered exceptionally low when such a mix has to have a high content of fibres.

Re 2. The amount of dispersing agent was considerably higher than use in traditional reinforced concrete and was of a type very effective to disperse the system in question.

Re 3. It is not conventional in reinforced concrete technology to assist the incorporation of bodies such as fibres by increasing the viscosity (here by using a low water content and adding a large amount of microsilica). The conventional strategy would be the opposite, i.e., to make the mix more easily flowable by adding water to facilitate the incorporation of the fibres. This, however, would result in a low viscosity and thus in a high frictional resistance which in fact would result in a bad intermixing of the fibres with uneven distribution and low possible maximum fibre concentration.

Re 7. The amount of fibres (6 mm×0.15 mm) incorporated and arranged in the test beams is very high - up to 6% by volume (20% by weight).

In ordinary reinforced concrete technology, it seems impossible to incorporate more than 1 or at the most 2% by volume of fine steel fibres in a mortar with about 50% coarse sand without creating a loose packing, and it would seem almost impossible to cast such a mass so that it would completely fill the narrow spaces between bars and walls in the reinforced beams.

The mixing was performed by mixing the mass carefully before addition of the fibres. This was done to obtain homogeneity and fluidity of the mass before incorporation of the fibres. It would have been impossible to incorporate the same amount of fibres by addition of the fibres in the dry state of the mix because such a mix would have a very high frictional resistance against the mixing.

It might also be possible to use other mixing sequences, such as premixing the binder (cement+microsilica+water and dispersing agent) to a well dispersed mass of a fluid consistency and then adding 1) coarse particles and 2) fibres of 1) fibres and then 2) coarse particles. What is most important is that a homogeneous and well dispersed viscous fine particle based fluid mass must be established before incorporation of the fibres.

MECHANICAL PROPERTIES OF MATRIX MATERIAL

The mechanical properties of the matrix material with and without reinforcement, but with the fine fibres were determined. The following mechanical tests were carried out:

1. Recording of strain during deformation-controlled compression loading of cylinders of diameter 4.5 cm and height 9.0 cm.
2. Measurement of sound velocity and calculation of dynamic modulus of elasticity from the measurement results.
3. Recording of the relation between force and deflection on notched beams and calculation of fracture energy from the results.

Compression Tests (on Cylinders of Diameter 4.5 cm and Height 9.0 cm)

The compression tests were carried out on an INSTRON machine run with a slowly increased displacement.

Figure 18:
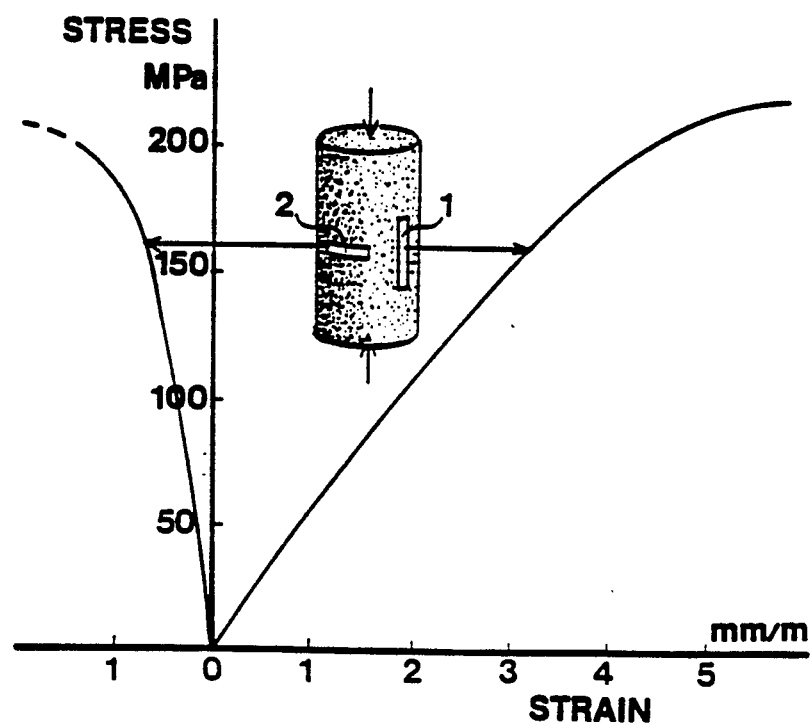

During the compression, the force/strain relationship was recorded. Both the strain in the direction of the cylinder axis and the strain perpendicular thereto were measured by means of strain gauges as shown in FIG. 18, in which 1 and 2 represent gauges measuring the strain in the direction of the load and perpendicular thereto, respectively.

The maximum load was also recorded.

From the data recorded,
1. strain/stress relationships
2. modulus of elasticity (static)
3. Poisson's ratio and
4. compressive strength
were calculated. The results appear from Table 5.

TABLE 5

Relations Between Stress and Strain During Compression of Cylinders of Diameter 4.5 cm and Height 9 cm
The highest compressive stress recorded for each specimen is the compressive strength. The static modulus of elasticity is calculated as the stress corresponding to 0.3 times the compressive strength divided by the corresponding strain in the direction of compression.

| Test Specimen | Compressive Stress MPa | Strain Parallel to Compression mm/m | Strain Perpendicular to Compression mm/m | Poisson's Ratio | Static Modulus of Elasticity MPa |
|---|---|---|---|---|---|
| A.O.III | 20 | 0.40 | 0.07 | 0.14 | |
| Fibre | 40 | 0.82 | 0.15 | 0.18 | |
| Content: | 60 | 1.23 | 0.23 | 0.19 | |
| 0% | 80 | 1.69 | 0.30 | 0.18 | 48,000 |
| | 100 | — | 0.36 | — | |
| | 120 | — | 0.45 | — | |
| | 135 | — | 0.52 | — | |
| B.O.I. | 20 | 0.38 | 0.06 | 0.16 | |
| Fibre | 40 | 0.76 | 0.13 | 0.17 | |
| Content: | 60 | 1.12 | 0.20 | 0.18 | |
| 0% | 80 | 1.54 | 0.28 | 0.18 | |
| | 100 | 1.94 | 0.35 | 0.18 | 52,000 |
| | 120 | 2.34 | 0.44 | 0.19 | |
| | 140 | 2.78 | 0.53 | 0.19 | |
| | 160 | 3.22 | 0.65 | 0.20 | |
| | 178 | 3.80 | 0.88 | 0.23 | |
| A.2.II | 20 | 0.40 | 0.07 | 0.18 | |
| Fibre | 40 | 0.80 | 0.15 | 0.19 | |
| Content: | 60 | 1.20 | 0.21 | 0.18 | |
| 2% | 80 | 1.55 | 0.32 | 0.21 | |
| | 100 | 1.95 | 0.41 | 0.21 | 50,000 |
| | 120 | 2.40 | 0.51 | 0.21 | |
| | 140 | 2.85 | 0.65 | 0.23 | |
| | 160 | 3.30 | 0.86 | 0.26 | |
| | 180 | 3.80 | 1.45 | 0.38 | |
| | 186 | 4.15 | 2.10 | 0.51 | |
| B.2.III | 20 | 0.40 | 0.08 | 0.20 | |
| Fibre | 40 | 0.75 | 0.15 | 0.20 | |
| Content: | 60 | 1.25 | 0.23 | 0.18 | |
| 2% | 80 | 1.55 | 0.30 | 0.19 | |
| | 100 | 1.90 | 0.38 | 0.20 | 49,000 |
| | 120 | 2.30 | 0.47 | 0.20 | |

TABLE 5-continued

Relations Between Stress and Strain During Compression of
Cylinders of Diameter 4.5 cm and Height 9 cm
The highest compressive stress recorded for each specimen is
the compressive strength. The static modulus of elasticity
is calculated as the stress corresponding to 0.3 times the
compressive strength divided by the corresponding strain in
the direction of compression.

| Test Specimen | Compressive Stress MPa | Strain Parallel to Compression mm/m | Strain Perpendicular to Compression mm/m | Poisson's Ratio | Static Modulus of Elasticity MPa |
|---|---|---|---|---|---|
| | 140 | 2.75 | 0.58 | 0.21 | |
| | 160 | 3.20 | 0.70 | 0.22 | |
| | 178 | 3.60 | 0.90 | 0.25 | |
| A.4.I | 20 | 0.40 | 0.06 | 0.15 | |
| Fibre | 40 | 0.80 | 0.14 | 0.18 | |
| Content: | 60 | 1.20 | 0.23 | 0.19 | |
| 4% | 80 | 1.60 | 0.31 | 0.19 | |
| | 100 | 2.00 | 0.40 | 0.20 | 50,000 |
| | 120 | 2.40 | 0.50 | 0.21 | |
| | 140 | 2.80 | 0.62 | 0.22 | |
| | 160 | 3.30 | 0.80 | 0.24 | |
| | 180 | 3.80 | 1.14 | 0.30 | |
| | 195 | 4.70 | 2.60 | 0.55 | |
| B.4.I | 20 | 0.40 | 0.08 | 0.20 | - |
| Fibre | 40 | 0.75 | 0.16 | 0.21 | |
| Content: | 60 | 1.20 | 0.25 | 0.21 | |
| 4% | 80 | 1.60 | 0.33 | 0.21 | |
| | 100 | 2.00 | 0.42 | 0.21 | |
| | 120 | 2.40 | 0.52 | 0.22 | 50,000 |
| | 140 | 2.85 | 0.63 | 0.22 | |
| | 160 | 3.30 | 0.78 | 0.24 | |
| | 180 | 3.85 | 1.04 | 0.27 | |
| | 193 | 4.45 | 2.70 | 0.61 | |
| A.6.II | 20 | 0.35 | 0.07 | 0.20 | |
| Fibre | 40 | 0.75 | 0.15 | 0.20 | |
| Content: | 60 | 1.15 | 0.22 | 0.19 | |
| 6% | 80 | 1.55 | 0.30 | 0.19 | |
| | 100 | 1.90 | 0.38 | 0.20 | |
| | 120 | 2.35 | 0.47 | 0.20 | 52,000 |
| | 140 | 2.75 | 0.56 | 0.20 | |
| | 160 | 3.20 | 0.68 | 0.21 | |
| | 180 | 3.70 | 0.86 | 0.23 | |
| | 200 | 4.30 | 1.30 | 0.30 | |
| | 220 | 4.70 | — | — | |
| | 225 | 4.80 | — | — | |
| B.6.III | 20 | 0.40 | 0.06 | 0.15 | |
| Fibre | 40 | 0.70 | 0.13 | 0.19 | |
| Content: | 60 | 1.10 | 0.20 | 0.18 | |
| 6% | 80 | 1.45 | 0.28 | 0.19 | |
| | 100 | 1.85 | 0.36 | 0.19 | |
| | 120 | 2.20 | 0.45 | 0.20 | 55,000 |
| | 140 | 2.60 | 0.55 | 0.21 | |
| | 160 | 3.05 | 0.70 | 0.23 | |
| | 180 | 3.50 | 1.00 | 0.29 | |
| | 200 | 4.10 | 1.65 | 0.40 | |
| | 220 | 5.40 | 3.80 | 0.70 | |

COMMENTS ON THE TEST RESULTS

It appears from the results that the materials show substantially linear behaviour without any substantial increase in Poisson's ratio up to very high stresses. Thus, the specimens containing 6% by volume of fibres were deformed substantially linearly up to 160–180 MPa (approximately 70–80% of the compressive strength), which, i.a., was indicated by Poisson's ratio being substantially unchanged (about 0.19–0.23).

Ultrasonic Sound Velocity and Dynamic Modulus of Elasticity

The ultrasonic sound velocity was determined on cylinders of diameter 4.5 cm and length 9.0 cm using a Pundit ultrasonic apparatus having a frequency of 200 kHz. From the ultrasonic sound velocity and the measured densities of the specimens, the dynamic modulus of elasticity was calculated according to $E_{dyn} = v^2 r$ in which v is the ultrasonic sound velocity and r is the density. The results are shown in Table 6.

TABLE 6

Sound Velocity, Density and Dynamic Modulus of Elasticity
of Cylinders of Diameter 4.5 cm and Length 9.0 cm
For each series specimens were tested. The standard
deviation of the modulus of elasticity is shown in
parenthesis.

| Series | Fibre Content % | Velocity m/sec. | Density kg/m³ | Dynamic Modulus of Elasticity (MPa) | |
|---|---|---|---|---|---|
| A | 0 | 4945 | 2406 | 58830 | (620) |
| B | 0 | 4953 | 2425 | 59510 | (540) |
| A | 2 | 4873 | 2530 | 60310 | (720) |
| B | 2 | 4910 | 2534 | 61090 | (420) |
| A | 4 | 4821 | 2632 | 61190 | (340) |
| B | 4 | 4822 | 2631 | 61373 | (414) |
| A | 6 | 4737 | 2745 | 61600 | (70) |

TABLE 6-continued

Sound Velocity, Density and Dynamic Modulus of Elasticity of Cylinders of Diameter 4.5 cm and Length 9.0 cm For each series specimens were tested. The standard deviation of the modulus of elasticity is shown in parenthesis.

| Series | Fibre Content % | Velocity m/sec. | Density kg/m³ | Dynamic Modulus of Elasticity (MPa) | |
|--------|-----------------|-----------------|---------------|------------------------------------|-------|
| B      | 6               | 4744            | 2740          | 61910                              | (490) |

Fracture Energy

The fracture energy was determined on notched beams of 50×50×500 mm³ supported symmetrically with the distance of 25 cm between the supports and loaded with a central single force. The notch depths were approx. 25 mm in central position (vide FIG. 8 which shows force versus deflection of notched beams).

Figure 19:
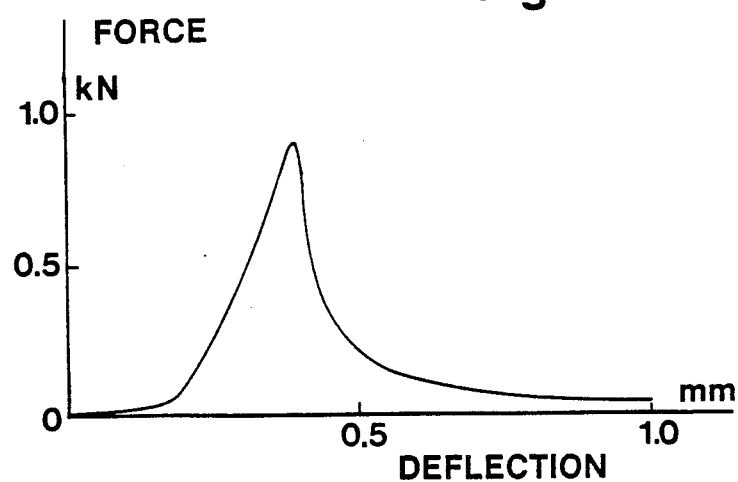
Figure 20:
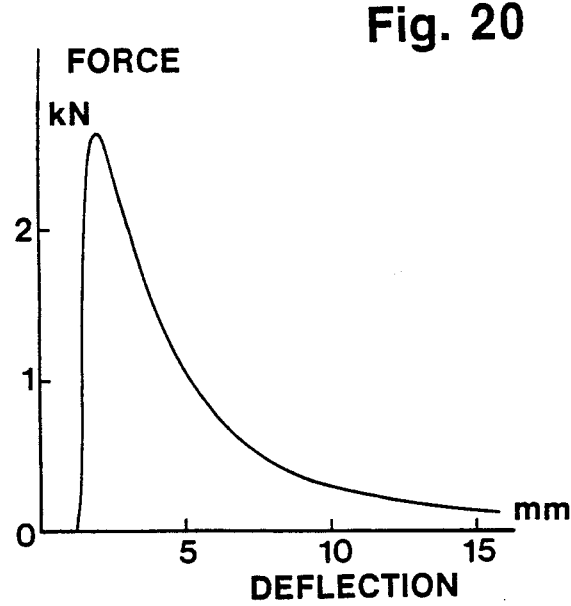
Figure 21:
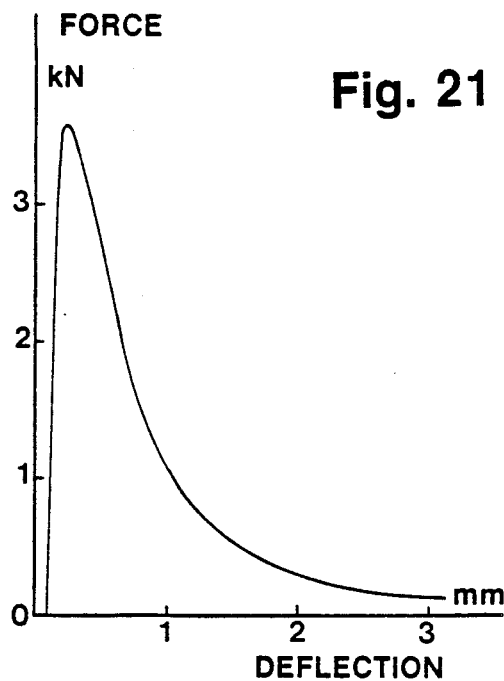
Figure 22:
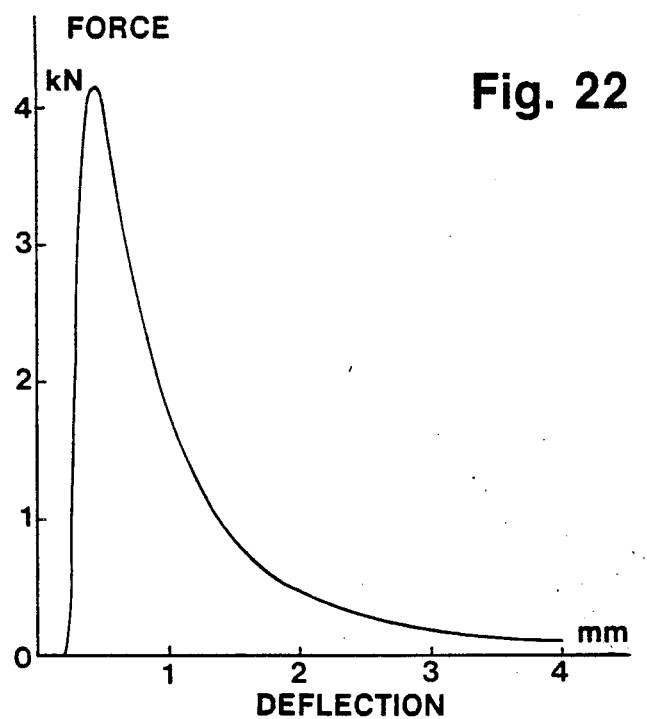

The measurements were performed with a slowly increasing displacement (displacement rate $4.81 \times 10^{-6}$ m/sec). During the experiment, connected values of force and displacement were recorded. The results appear from FIGS. 19-22. In FIG. 19, the fibre content of the matrix is 0%, in FIG. 20 2%, in FIG. 21 4% and in FIG. 22 6%, by volume. FIG. 19 is shown in larger scale than FIGS. 20-22. In FIG. 8, the curves of FIG. 19 and FIG. 22 are shown in the same scale.

Under the assumption that all the stored energy is released and used to create new area (crack), the specific crack energy (that is, the fracture energy) can be calculated as the work performed by the external force (area under the force-load curve) divided by the crack area. The results appear from Table 7.

TABLE 7

Fracture Energy Measured on Notched Beams (50 × 50 × 500 mm³)
Each figure represents the average of three specimens.
The standard deviation is shown in brackets.

| Fibre Concentration % by volume | Fracture Energy kN/m | |
|---------------------------------|----------------------|---------|
| 0                               | 0.129                | (0.013) |
| 2                               | 8.238                | (1.229) |
| 4                               | 12.162               | (1.387) |
| 6                               | 13.240               | (1.927) |

Estimate of Shear Stress at Sliding Between Fibres and Matrix

From the value of maximum force on notched beams it is possible to estimate—roughly—the shear stress at fibre pull out.

Assuming that fibres carry the load at maximum stress and assuming that the fibres are arranged parallel to the tension we get (approximately) the shear stress ($\tau$) from the expression $$\tau = \frac{d}{l} \frac{\sigma}{\phi}$$

where d is the diameter, I is the length of the fibre, $\sigma$ is the tensile stress at maximum load and $\phi$ the volume concentration of fibres.

Assuming (for the sake of simplicity) that $$\sigma = \frac{FL}{4} / \frac{h^2 b}{6}$$

where F is the applied force and L is the distance between the supports. we get, for example from the beam considered (AGI)

$$\sigma = \frac{(42000 \times 0.25)}{4} / \frac{(0.026^2 \times 0.05)}{6} = 47 \text{ MPa}$$

and hence $$\tau = \frac{0.15}{6.00} \cdot \frac{47}{0.06} = 20 \text{ MPa}$$

MECHANICAL PROPERTIES OF REINFORCED CONCRETE BEAMS

Bending tests on the reinforced beams were performed on an INSTRON machine. The test beams were simply supported, span 417 mm, and loaded with a force at the beam middle, vide FIG. 2. The mix compositions and properties of the matrix of the beam are explained above. The experiments were performed as slow displacement controlled experiments. During the experiments, connected values of force and displacement were recorded and in some of the experiments, also connected values of force and strain at the tension side of the beam (below the middle) were recorded. The rate of displacement was about 0.19 mm/minutes (apart from certain parts of the experiment where a shift was made to a higher rate of displacement after considerable yielding).

Figure 25:
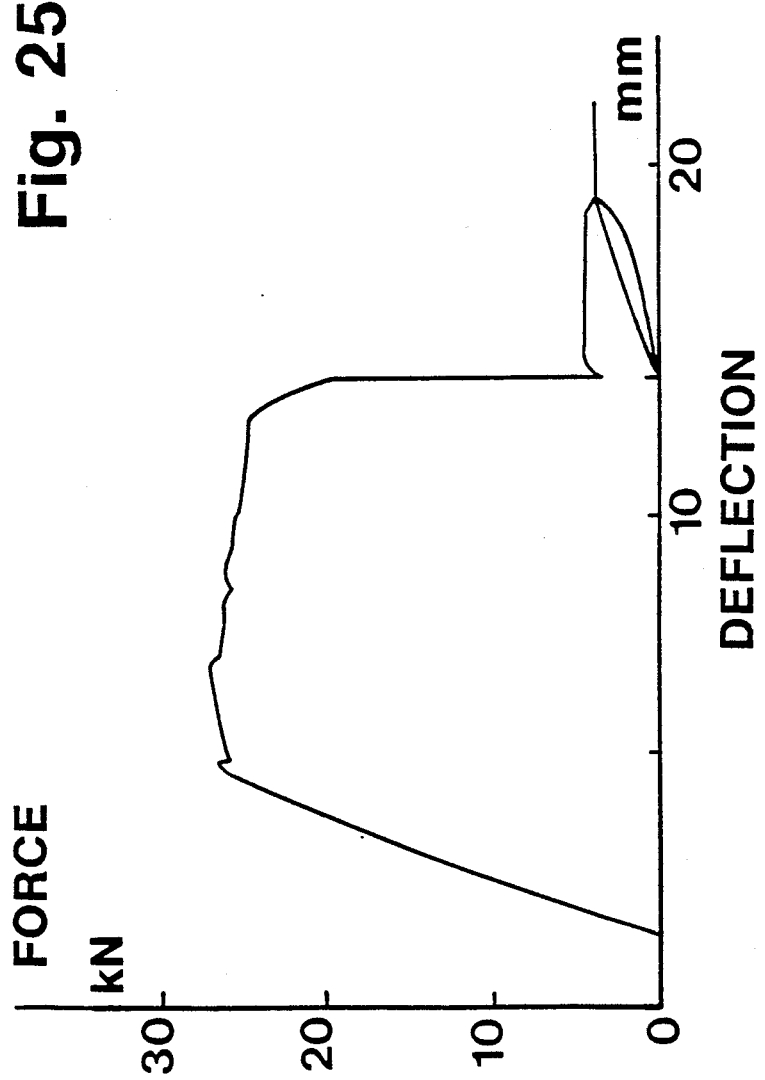
Figure 26:
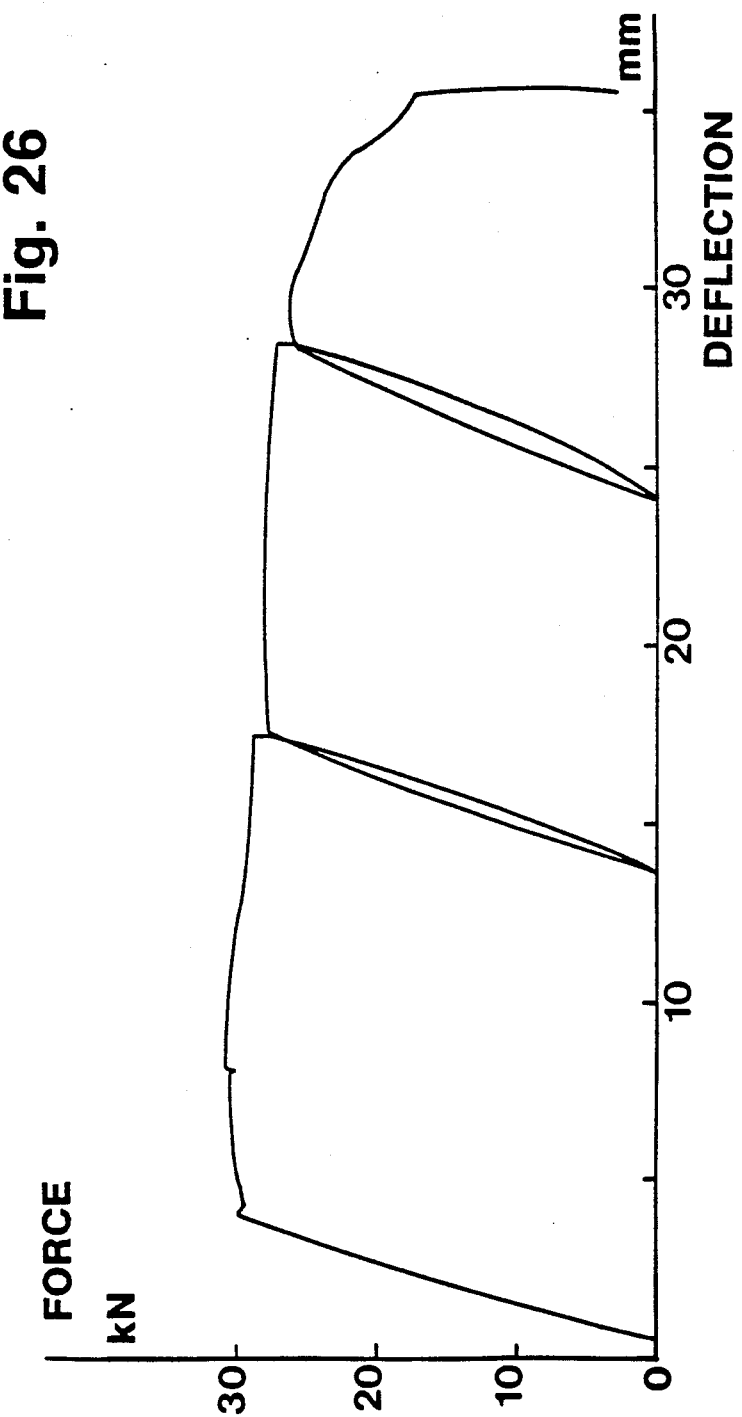

Representative results are shown in FIGS. 24-27, FIG. 24 being shown in a scale different from the scale of FIGS. 25-27. Results calculated from the curves of FIGS. 24-27 are shown in Table 8.

TABLE 8

Maximum load, deflection at maximum load and maximum moment (M) and corresponding formal bending stress $\sigma$ defined as $$\sigma = \frac{M}{W}$$

when W = 1/6 × width × height × height (W = 2.08 × $10^{-5}$ m³) of reinforced beams.

| Fibre Content vol. % | Max. Load kN | Deflection mm | Bending Moment kNm | Bending Stress MPa |
|----------------------|--------------|---------------|--------------------|--------------------|
| 0                    | 14.8         | 1.9           | 1.65               | 79.4               |
| 2                    | 26.3         | 4.1           | 2.94               | 141.1              |
| 4                    | 29.8         | 3.5           | 3.33               | 159.8              |
| 6                    | 31.8         | 4.1           | 3.55               | 170.6              |
| 6                    | 30.8         | 3.9           | 3.44               | 165.2              |

The following observations were made during the experiments:

Beam Without Fibres (B.O.III)

Before the loading, the beam showed micro cracks. The force/displacement curve was substantially linear up to failure. During this course, no further cracks were observed. At a force of 14.8 kN, cracks appeared at the tension side of the beam, and at the same time, a pronounced longitudinal crack suddenly appeared along the main reinforcement. The crack developed very fast, which also appears from the steep slope of the curve after failure. Thereafter, several longitudinal cracks developed quickly, and simultaneously with the main reinforcement being pulled out, large pieces spalled off the specimen, and the reinforcement bars were exposed. The pulling out was ascertained by the exposed ends of the reinforcement bars being pulled into the beam.

The crack pattern is shown in FIG. 28 A.

Beam With 2% by Volume of Steel Fibres (B.2.I)

Before the loading, no micro cracks were observed. The force/displacement curve up to failure is substantially linear, and during this part of the loading, no cracks were observed. At a force of 26.3 kN, crack formation in the tensile side of the beam occurred, and at the same time, longitudinal cracks along the reinforcement bars occurred. This manifested itself in a small decrease in the load. Thereafter there was apparently yielding in the main reinforcement bars. At a a deflection of 13 mm, the longitudinal crack developed, and the bars were pulled out, as observed by the end of the bars being pulled in. At the same time there was a decrease of the load.

The crack pattern is shown in FIG. 28 B.

Beam With 4% by Volume of Steel Fibres (B.4.I)

Before loading, no micro cracks were observed. The force/displacement curve up to failure is substantially linear, and during this part of the loading, no cracks were observed. At a force of 29.8 kN cracks appeared at the tension side, as evidenced by a small decrease in the load. Thereafter, the main reinforcement yielded. At a deflection of 28 mm, a longitudinal crack developed, and there was slight pulling out of the main reinforcement bars as apparent from a small drop of the load. In this experiment, a few re-loadings were performed. The overall behaviour was considerably better with 4% by volume of fibres than with 2% by volume of fibres.

The crack pattern is shown in FIG. 28 C.

Beams With 6% by Volume of Steel Fibres (B6.I and C.6.III)

Before the loading, no micro cracks were observed. The force/displacement curve up to failure is substantially linear, and during this part of the loading, no cracks were observed. Not until a load of about 31 kN, crack formation occurred—in the form of only one central crack at the tension side. At the same time, a small decrease of the load was observed. Thereafter, the main reinforcement yielded, but there was no development of longitudinal cracks, nor was there any pulling out of the reinforcement bars, nor was there formation of further transverse cracks (apart from local cracks very near to the primary cracks). Also in this experiment, re-loadings were performed. The performance of the beams with 6% by volume of steel fibres was considerably better than for beams with 2% or 4% of fibres. Especially, the beams showed extremely good internal coherence, with no cracks at all up to yielding and then only a few cracks around the yielding steel, leaving the remainder of the beams substantially unaffected even after very large deformations.

The crack pattern is shown in FIG. 28 D.

Comments on the Crack Observations

The behaviour of all beams with fibre reinforcement was astonishing, also after ultimate load.

The cracking of beams with 2% or 4% by volume of fibres, respectively, after yielding indicates a potential for a much more promising behaviour than actually observed with the test beams.

The reason is that the main reinforcement in the test beams was intentionally arranged in a manner which does not protect against cracking parallel to the main reinforcement and pulling out of the main reinforcement. Thus, there was no transverse reinforcement at all as is normally used for reinforced beams (and is always used in heavily reinforced beams).

This combination of heavy reinforcement and lack of protecting transverse reinforcement was chosen for research purposes to study the pure effect of fibres on the retainment of internal coherence. For practical design purposes, transverse reinforcement would be used, just as in ordinary concrete.

Strain Recording

Strains at the tensile side of the beams were recorded during loading and unloading in the same set-up as used in the force deflection experiments. Strains were measured by means of strain gauges which were glued to the underside of the beams in a central position. The beams were loaded as follows: a beam without fibres was loaded from zero up to 5 kN 10 times and then from zero to 10 kN 10 times, while beams with reinforcing fibres were loaded from zero up to 10 kN 10 times and from zero up to 20 kN 10 times.

Simultaneously, the force and deflection were recorded.

Comments on the Results

For beams with 0% and 2% of fibre reinforcement, cracks occurred at high loads (10 kN and 20 kN, respectively) as indicated by rupture of the strain gauge.

For all other beams, no cracks were observed. One of the beams with 6% of fibres was later examined under microscope and was found to have a perfect crack-free surface.

The beams having 4% and 6% by volume of fibres showed a substantially linear behaviour at load of 20 kN with very little hysteresis after the first load cycle. (During the first load cycle, and initial change in stifness took place, very similarly to what happened in the dynamic tests described in Example 4, where the phenomenon is discussed). The beams did not have any visible cracks in spite of the fact that the bending stresses were more than 100 MPa and the strains were about 2.5 mm/m. The formal modelus of elasticity, calculated as the formal bending stress at 20 kN (about 110 MPa) divided by the corresponding formal strain, was 31,000 MPa and 35,000 MPa referring to the first load cycle and the tenth load cycle, respectively.

This behaviour is to be compared with that of reinforced beams of ordinary concrete and strong concrete according to known art which typically cracks at bending stresses from 3 to at the most 15 MPa corresponding to strains about 0.1 to 0.2 mm/m and ruptures at bending stresses from 25 (good concrete) to 75 (high quality super concrete with compressive strengths in the range of 120–150 MPa).

EXAMPLE 2

Bending Tests on Large Beams

Bending tests were performed on large beams of Portland cement-microsilica-based CRC reinforced with deformed bars.

The experiment represents an extension of the experiment with small beams (50×50×500 mm) in Example 1, the experiment being made to verify the behaviour in larger scale and to obtain supplementary information.

The main purpose was (1) to determine the bending capacity of the beams at loads up to initial yielding, (2) to determine stress strain relations during the loading up to yielding and to determine the rigidity,
(3) in connection with one of the beam types, to determine the resistance against shear,
(4) to study crack patterns,
(5) to determine the reliability of CRC structures

Test Beams

4 Types of test beams were tested, each type comprising 3 individual beams. The lengths were about 2100 mm, the width from 80–160 mm and the heights from about 90 to about 200 mm.

Beam dimensions and arrangement of reinforcement are shown in FIG. 29. In FIG. 29, a test beam 1 is loaded with two identical forces 2 and is supported on supports 3. The cross sections of the test beams are shown in A–D where the dimensions, in mm, are indicated. D is not in the same scale as the other sections, and C has the same dimensions as B. The sections show the reinforcement bars 8 and the fibre reinforced matrix 9.

In the beams of section A, termed BR20, the reinforcement bars had a diameter of 20 mm. At the bottom of the beams, 5 bars were arranged at a distance of 23 mm from the centre of the bar to the bottom of the beam, and at the top of the beam, two bars of the same dimension were arranged, also at a distance of 23 mm between the top surface and the centre of the bar. In the beams of section B, termed BT16, two layers of each three bars of diameter 16 mm were arranged at the bottom, distance from the bottom of the beam to the centre line of the lower bottom layer of reinforcement bars being 21 mm, and the distance between the lower layer and the upper layer in the bottom zone of the beam being 26 mm from centre line to centre line. At the top of the beam, two bars of the same size were arranged, the distance between the top of the beam and the centre line of these bars being 21 mm.

In the beams of section C, termed BT25, two layers of each two bars of diameter 25 mm were placed at the bottom of the beam, and two bars were placed at the top of the beam. The distance between the bottom of the beam and the centre line of the lower layer in the bottom zone was 25 mm, and the distance between the centre lines of the two layers of bars in the bottom zone of the beam was 35 mm. The distance between the top of the beam and the centre line of the two bars in the beam top zone was 25 mm. In the beams of section D, termed BDR14, three bars of a diameter of 14 mm were arranged in the bottom zone of the beam, the distance between the bottom of the beam and the centre line of the three bars being 19 mm, and two bars of the same dimension were arranged at the top of the beam, the distance between the top of the beam and the centre line of the two bars being 18 mm. (In addition to the longitudinal main reinforcement shown, the beams were reinforced with stirrups at the beam ends as an extra safeguard against local failure, etc. at the supports. This reinforcement is without any influence on the results). As appears from the figure, the beams were only reinforced with longitudinal reinforcement (apart from the above-mentioned stirrups at the supports). As a safeguard against compression failure in the upper zones of the beams, the upper zones were also reinforced with longitudinal main reinforcement.

In the testing of the beams of sections A, B, and C, the span between the supports 3 was 1840 mm, and the distance between the two applied forces 2 was 420 mm.

In the testing of the beams D, the span between the two supports 3 was 1920 mm, and the distance between the two forces D was 500 mm.

The type, dimensions, and mechanical properties of the main reinforcement appear from Table 2.1.

TABLE 2.1

Yield stress, ultimate strength, yield strain and modulus of elasticity (at load up to 70% of yield) of the reinforcing bars used in this example - mean values of 3 tests.

| Reinforcement Type | Diameter mm | Yield Stress MPa | Ultimate Stress MPa | Yield Strain mm/m | Modulus of Elasticity MPa |
|---|---|---|---|---|---|
| KS550S | 20 | 579.9 | 760.5 | 2.7 | 216,000 |
| KS550S | 16 | 587.1 | 797.0 | 2.8 | 211,000 |
| KS550S | 25 | 599.2 | 803.9 | — | — |
| KS410S | 14 | 472.0 | 774.0 | 2.2 | 216,000 |

The constituents of the matrix (including the fibres) are shown in Table 2.2.

TABLE 2.2

| Matrix Constituents | | Per Cent by Volume |
|---|---|---|
| Matrix: | coarse quartz sand, maximum size 4 mm | 44.6 |
| | cement/silica binder, vide below | 49.6 |
| | steel fibres (0.5 mm × 6 mm) | 5.8 |
| Cement/Silica Binder: | cement, average particle size 5–10 μm | 47.6 |
| | microsilica, average particle size 0.1–0.2 μm | 16.1 |
| | water | 33.7 |
| | dispersing agent (powder) | 2.8 |

Matrix Materials and Preparation

The materials, the mix composition and the preparation of the matrix were as described in Example 1 with the exception of any differences which appear from the following.

Quartz Sand

The same fractions as in Example 1 were used, but from a different charge. The result of the particle size analysis is shown below.

TABLE 2.3

Density and Particle Size of the Three Sand Fractions Used
The figures in the sieve analysis indicate parts by weight in % of the total fraction passing the sieve with the mesh size stated

| Size of meshes mm | Sand Fraction: | | |
|---|---|---|---|
| | Fine | Medium | Coarse |
| | Density kg/m$^3$: | | |
| | 2627 | 2630 | 2608 |
| 8 | | | 100 |
| 4 | | | 100 |
| 2 | 100 | | 32 |
| 1 | 100 | 100 | 0 |
| 0.50 | 100 | 42 | 0 |
| 0.250 | 95 | 0 | 0 |
| 0.125 | 5 | 0 | 0 |
| 0.075 | 1 | | |
| 0.045 | 0 | | |

White Portland Cement

Density 3150 kg/m$^3$
Specific surface (Blaine) 433 m$^2$/kg 0.21% by weight was coarser than 90 μm.

The Composition of the White Portland Cement as Determined by chemical analysis is stated in Table 2.4 below:

TABLE 2.4

Parts by Weight of Constituents of the Cement, Based on the Total Weight of the Cement

| Constituent | Parts by Weight % | |
|---|---|---|
| $H_2O, 110°$ C. | | |
| $SiO_2$ | 24.2 | |
| $Al_2O_3$ | 1.88 | |
| $Fe_2O_3$ | 0.34 | |
| CaO | 69.2 | |
| MgO | 0.53 | |
| $SO_3$ | 1.93 | |
| Ignition loss | 1.12 | |
| $K_2O$ | 0.04 | Acid Soluble Alkali |
| $Na_2O$ | 0.11 | |
| $Na_2O$ equivalent | 0.14 | |
| $K_2O$ | 0.007 | Water Soluble Alkali |
| $Na_2O$ | 0.018 | |
| $Na_2O$ equivalent | 0.023 | |

The compressive strength of test specimens of the cement according to DS427 was:
after 24 hours 22.8 $MN/m^2$
after 7 days 51.8 $MN/m^2$
after 28 days 59.9 $MN/m^2$

Mix composition

The mix composition was identical to the mix of Example 1 containing 6% by volume of steel fibres. The composition appears from Table 2.5.

TABLE 2.5

| Mix Ingredients | | Grams |
|---|---|---|
| White Cement | | 7750 |
| Microsilica | | 1850 |
| Flube | | 230 |
| Quartz Sand | 0–0.25 mm | 1727 |
| | 0.25–1 mm | 3492 |
| | 1–4 mm | 7001 |
| Water | | 1740 |
| Fibres | | 4710 |
| Fibre Content, vol % | | 6 |

The mix composition refers to a total volume of approximately 10 liters. The size of the batches was suited to the volume of the test bodies.

Preparation

The mixing was performed in a 50 liter planetary mixer. The vibration was performed on a vibrating table, frequency 77 Hz, acceleration 22 m/sec.$^2$. The beams and test cylinders cast were wrapped in wet towels and covered with plastic and then cured for 1 day at 50° C. and for 18 days at 45° C.

Experimental Set-up

The beams were simply supported and loaded with 2 identical forces placed symmetrically around the middle of the beam as shown in FIG. 29.

By this arrangement, the central part of the beams between the loading points is subjected to pure bending with a constant bending moment.

During the loading, the deflection of the beams was measured by means of displacement transducers arranged
(1) at the centre of the beams (A),
(2) at the load points (A), and
(3) at the supports (B), the transducers (A) being Penny and Giles Potentiometers, Model LVDT DS 1316, the transducers (B) being Penny and Giles Potentiometers, Model LVDT DS 1354.

In addition, longitudinal strains were measured at the middle of the beams by means of strain gauges arranged at the surfaces of the beams and on the reinforcing steel (glued to the steel in a short groove, width 2.5 mm, depth 5 mm milled into the reinforcement, except for beam type BDR14 where the strain gauges were glued to the upper and lower sides of the bar). The strain gauge types arranged on the surfaces of the beams were HBM20/120 LY41, and HBM50/120 LY41 in the compression and tensile zones of the bar, respectively, and the strain gauges used in the reinforcement were HBM61/120 LY51. Crack formation was studied by means of a PEAK Stand Microscope, magnification 25×.

The loading experiments for the beams BR20, BT16, BT25 were performed in an INSTRON machine, type 1255, and the loading experiments for the beams BDR14 were performed in a SCHENCK hydropulse equipment (cylinder PL63 kN).

Experimental Procedure

The application of the load was deformation controlled and was performed in stages with pauses of 2 minutes (for the beam types BDR14 and BR20) and 5 minutes (for the beam types BT16 and BT25), respectively, at each loading stage. The rate of application of increasing load corresponded to a rate of displacement of 1 mm/min.

The loading was continued until initial yielding was detected (due to the experimental technique used it was not possible to investigate the behaviour of the beams during complete yielding such as was done in the experiments in Example 1).

Then, the load was released, and reloading was performed in the same manner as described above.

In one experimental series (BDR14), additional release/reloading cycles were made at about 60% and about 80% of the yield value, respectively.

During the loadings, corresponding values of (1) applied force, (2) positions (displacements) of the beam middle, force attack points relative to the supports and strains at the surfaces of the beams and at various places in the reinforcement were recorded.

Results

The test results are shown in FIGS. 30–42 and Tables 2.6–2.9.

TABLE 2.6

Relation Between Applied Load (P) and Deflection ($U_3$)
The results stated are mean values obtained from the tests on beams of the type BR20.
Force/Deflection Properties of Beams of Type BR20

| | Deflection | | |
|---|---|---|---|
| Applied Load kN | Mean Value mm | Standard Deviation mm | Coefficient of Variation % |
| 20 | 0.44 | 0.05 | 10.7 |
| 40 | 0.93 | 0.09 | 9.3 |
| 60 | 1.43 | 0.14 | 9.6 |
| 80 | 1.94 | 0.17 | 8.8 |
| 100 | 2.40 | 0.18 | 7.4 |
| 150 | 3.73 | 0.25 | 6.7 |
| 200 | 5.07 | 0.33 | 6.4 |
| 250 | 6.66 | 0.05 | 0.7 |
| 300 | 8.12 | 0.07 | 0.9 |

TABLE 2.6-continued

Relation Between Applied Load (P) and Deflection (U₃)
The results stated are mean values obtained from the tests on
beams of the type BR20.

Force/Deflection Properties of Beams of Type BR20

| Applied Load kN | Deflection | | |
|---|---|---|---|
| | Mean Value mm | Standard Deviation mm | Coefficient of Variation % |
| 350 | 9.61 | 0.10 | 1.0 |
| 400 | 11.15 | 0.11 | 1.0 |

The results stated are based on measurements on 3 beams.

TABLE 2.7

Relation Between Applied Load (P) and Deflection (U₃)
The results stated are mean values obtained from the tests on
beams of the type BT16.

Force/Deflection Properties of Beams of Type BT16

| Applied Load kN | Deflection | | |
|---|---|---|---|
| | Mean Value mm | Standard Deviation mm | Coefficient of Variation % |
| 20 | 0.55 | 0.04 | 7.3 |
| 40 | 1.23 | 0.05 | 4.1 |
| 60 | 1.96 | 0.04 | 2.2 |
| 80 | 2.64 | 0.06 | 2.5 |
| 100 | 3.38 | 0.07 | 2.1 |
| 150 | 5.28 | 0.09 | 1.7 |
| 200 | 7.30 | 0.11 | 1.5 |
| 250 | 9.44 | 0.14 | 1.5 |
| 300 | 12.30 | 0.24 | 1.9 |

The results stated are based on measurements on 3 means.

TABLE 2.8

Relation Between Applied Load (P) and Deflection (U₃)
The results stated are mean values obtained from the tests on
beams of the type BT25.

Force/Deflection Properties of Beams of Type BT25

| Applied Load kN | Deflection | | |
|---|---|---|---|
| | Mean Value mm | Standard Deviation mm | Coefficient of Variation % |
| 20 | 0.54 | 0.05 | 8.5 |
| 40 | 1.11 | 0.07 | 6.5 |
| 60 | 1.72 | 0.07 | 4.3 |
| 80 | 2.32 | 0.07 | 3.0 |
| 100 | 2.93 | 0.06 | 2.1 |
| 150 | 4.53 | 0.09 | 2.0 |
| 200 | 6.25 | 0.10 | 1.6 |
| 250 | 8.07 | 0.12 | 1.5 |
| 300 | 10.08 | 0.13 | 1.3 |
| 350 | 12.24 | 0.17 | 1.4 |

The results stated are based on measurements on 3 means.

TABLE 2.9

Relation Between Deflection (U₃) and Applied Load (P)
The results stated are mean values obtained from the tests on
beams of the type BDR14.

Deflection/Force Properties of Beams of Type BDR14

| Deflection mm | Applied Load | | |
|---|---|---|---|
| | Mean Value kN | Standard Deviation kN | Coefficient of Variation % |
| 1.0 | 2.29 | 0.08 | 3.39 |
| 4.0 | 7.08 | 0.52 | 7.35 |
| 7.0 | 11.85 | 0.73 | 6.19 |
| 10.0 | 16.30 | 0.74 | 4.57 |
| 13.0 | 20.68 | 0.74 | 3.59 |
| 16.0 | 25.02 | 0.79 | 3.17 |
| 22.0 | 33.71 | 0.78 | 2.31 |
| 26.0 | 38.31 | 0.61 | 1.59 |
| 30.0 | 39.37 | 0.69 | 1.74 |

TABLE 2.9-continued

Relation Between Deflection (U₃) and Applied Load (P)
The results stated are mean values obtained from the tests on
beams of the type BDR14.

Deflection/Force Properties of Beams of Type BDR14

| Deflection mm | Applied Load | | |
|---|---|---|---|
| | Mean Value kN | Standard Deviation kN | Coefficient of Variation % |
| 33.0 | 39.77 | 0.72 | 1.81 |

The results stated are based on measurements on 3 beams.

Normalized bending strains were calculated from three different series of measurements:
(1) the total deflection,
(2) the relative deflection, i.e. the difference between the displacement of the middle part and the displacement of the force attack points, and
(3) strain measurements.

The results of the series of measurements for one of the beams is shown in FIG. 42, in which the curves 1, 2, and 3 refer to the series 1, 2, and 3 mentioned above.

As illustrated in FIG. 42 (and confirmed by measurements on the other beams), there was a high degree of conformity between the curves showing the normalized moments (formal bending stresses) versus normalized strains calculated from the three different series. Therefore, the following discussion of the results is limited to the results calculated from the determination of the total deflections.

Figure 33:
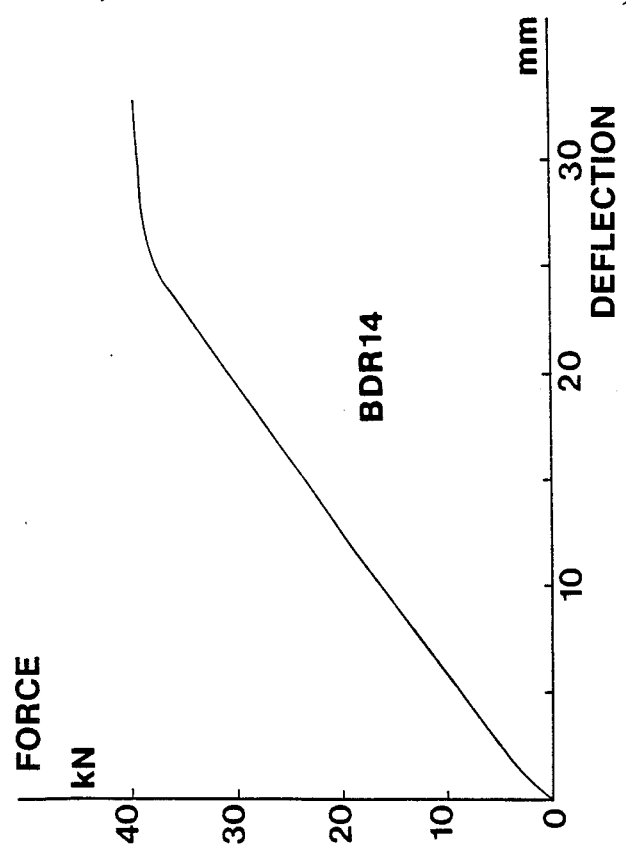
Figure 32:
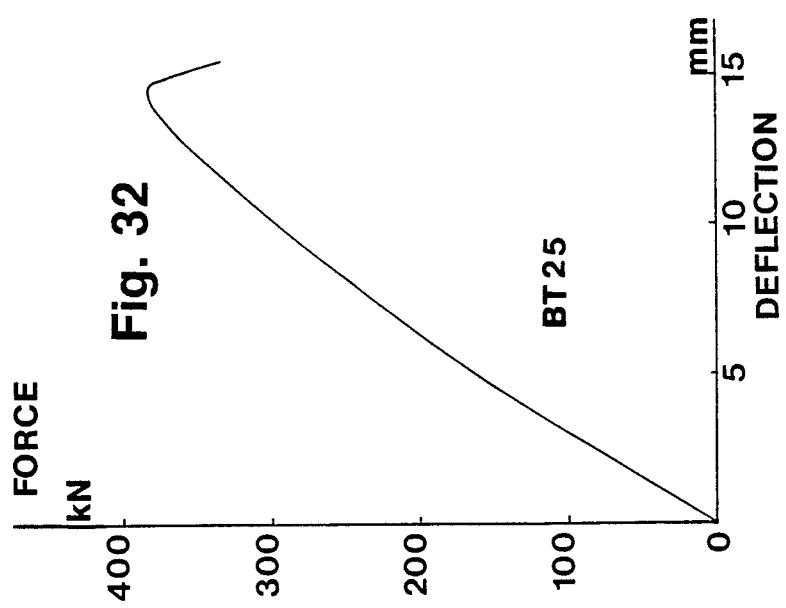

FIGS. 30-33 show average curves representing force/deflection for each beam type: BT16 (FIG. 30), BR20 (FIG. 31), BT25 (FIG. 32), and BDR14 (FIG. 33).

The mean values and the statistical data are shown in Tables 2.6–2.9.

Figure 34:
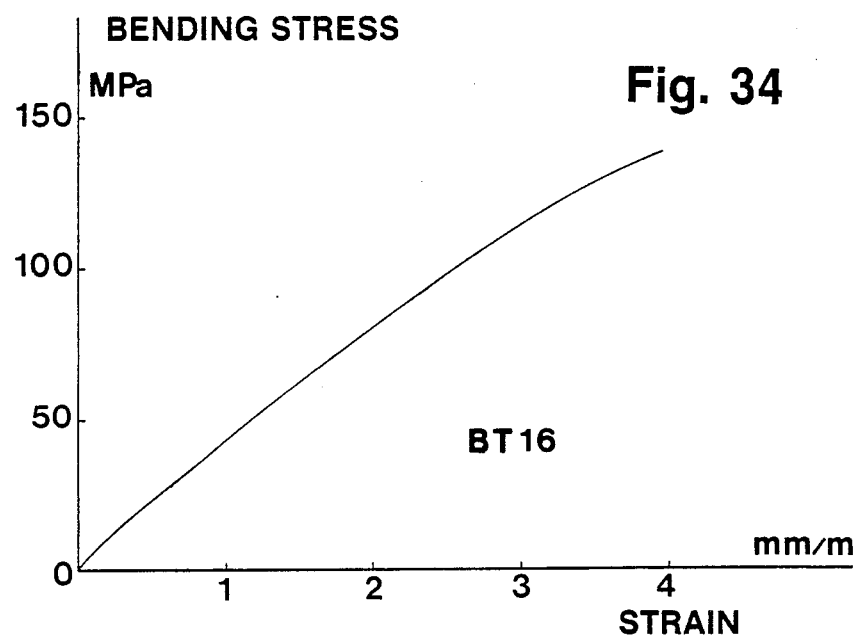
Figure 35:
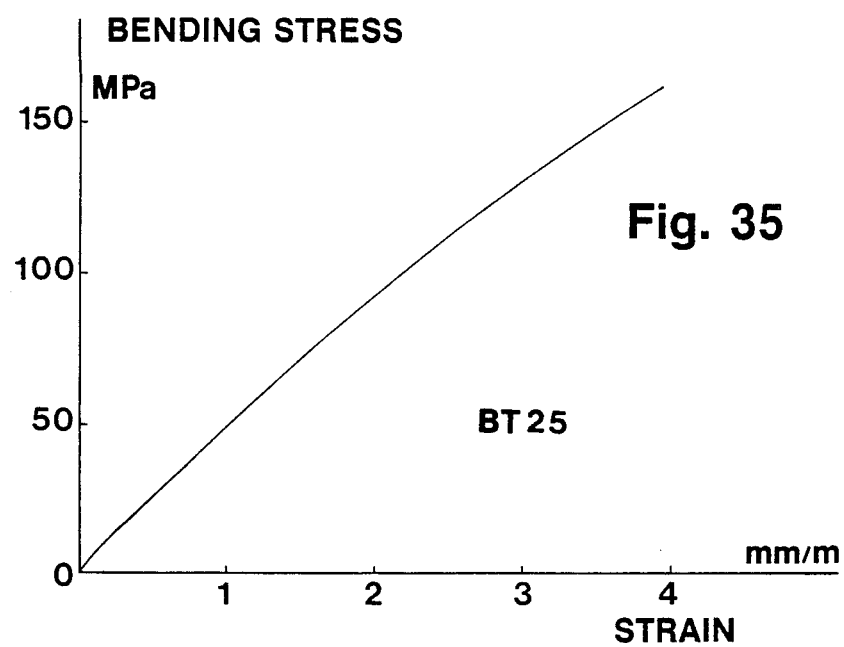
Figure 36:
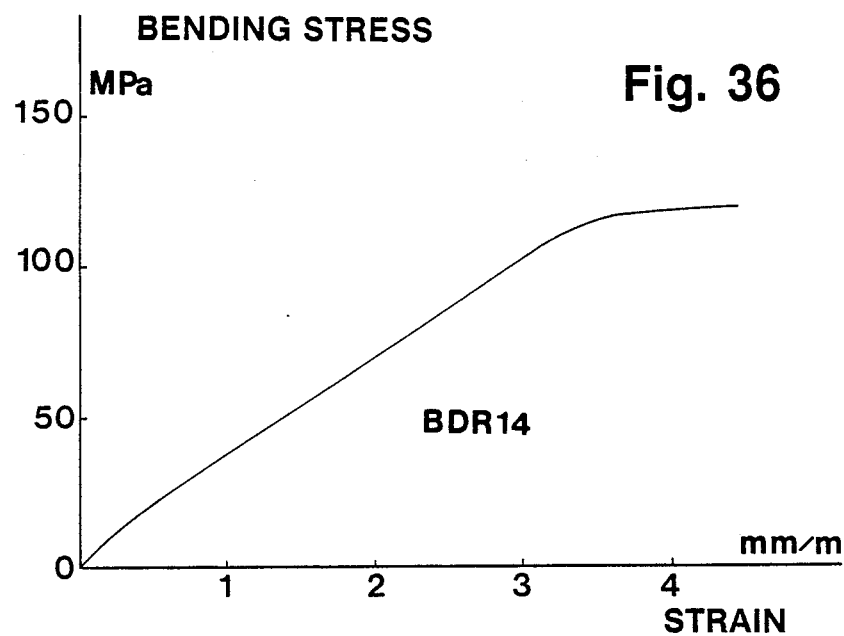
Figure 37:
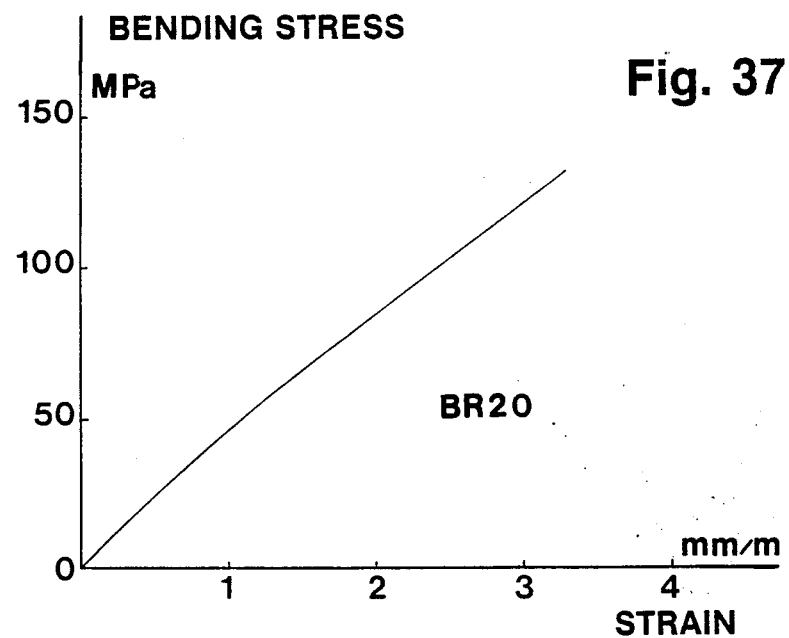
Figure 38:
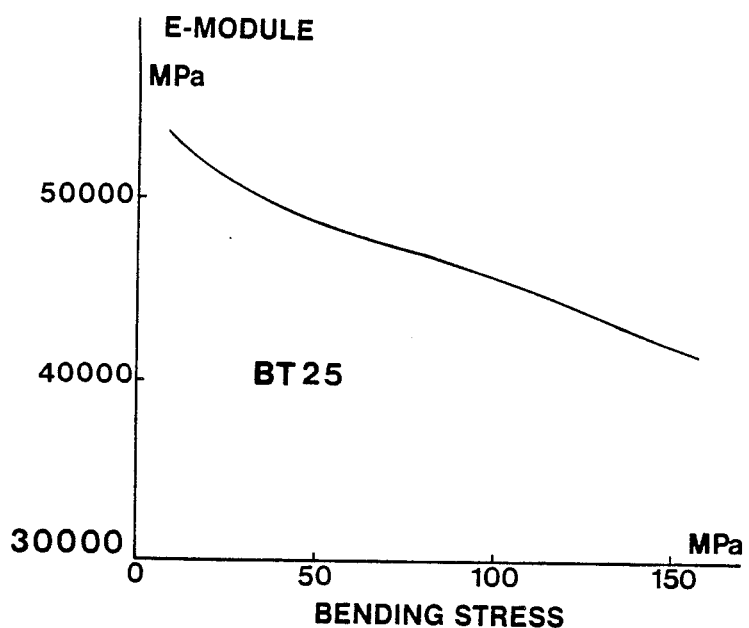
Figure 39:
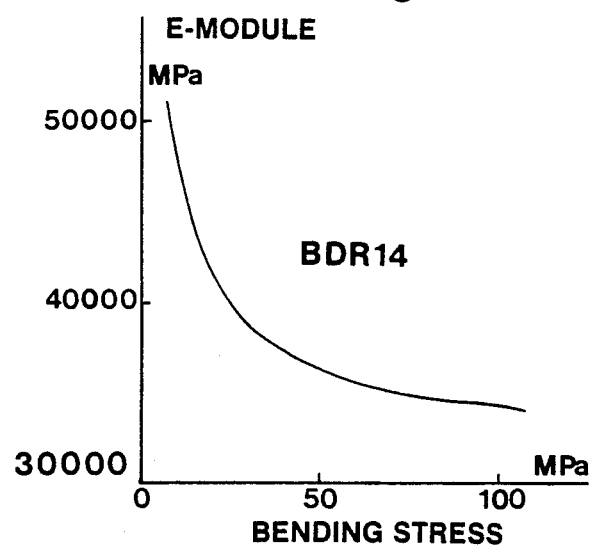
Figure 40:
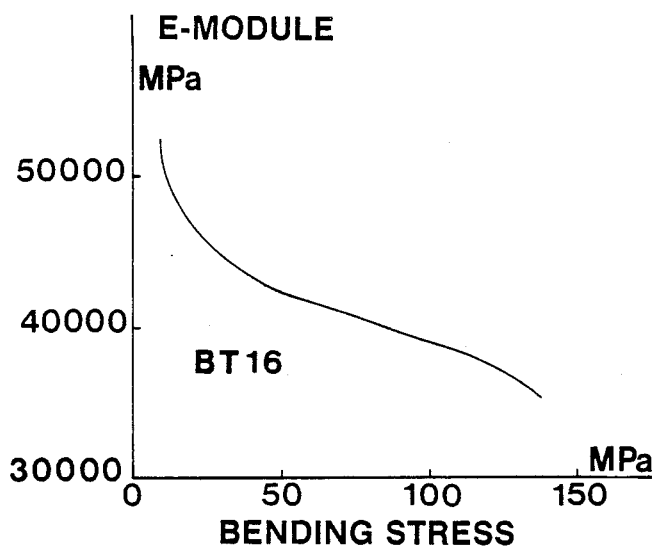
Figure 41:
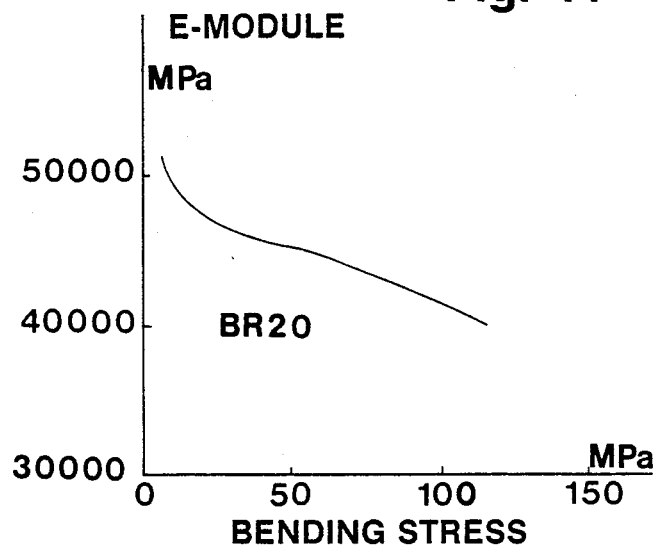

FIGS. 34–37 show the relations between normalized bending moments (formal bending stresses) and normalized strains calculated from the data in FIGS. 30–33 and from Tables 2.6–2.9. FIG. 34 applies to beams of type BT16, FIG. 35 applies to beams of type BT25, FIG. 36 applies to beams of type BDR14, and FIG. 37 applies to beams of type BR20. FIGS. 38–41 show the corresponding values of normalized modulus of elasticity as a function of normalized moments/normalized strain. FIG. 38 refers to beams of type BT25, FIG. 39 refers to beams of type BDR14, FIG. 40 refers to beams of type BT16, and FIG. 41 refers to beams of type BR20.

During the experiments, the surfaces of the beams were observed to detect cracks. The best possibilities for observations were at the vertical sides of the beams, along the whole length as far as the beams of the type BDR14 are concerned, and only in the zones outside the middle zone, in other words between the force attack points and the supports, as far as the other test beams are concerned. After the experiment, the surfaces of the beams in unloaded condition were studied.

In general, the beams may be characterized as substantially uncracked as determined with the naked eye. By means of the microscope, the following was observed:

At loads corresponding to 50–70% of the yield load (corresponding to formal bending stresses about 70–110 MPa) fine microcracks (thickness about 20–60 μm) were observed. The cracks started in the domain above the main reinforcement and then developed downwards at higher loads, but stopped in the zone at the level of the reinforcement (a very few cracks developed also all the way down to the bottom). It is remarkable that almost all microcracks stopped in the zones where the reinforcement was placed, as this zone is under higher strain than the middle zone where the cracks developed.

At yielding, some of the cracks developed to the bottom of the beam.

For beams of type BT25, shear failure occurred. At yield, a large crack, width 5 mm, developed from the point of support to the attack point of the force. The formal shear stress at failure, calculated as $$\tau = \frac{T}{b \times h_i}$$

gave $$\tau = 14.3 \text{ MPa}$$

where T is the shear force, b is the width of the beam body, and $h_i$ is the distance the centre of compression and centre of tension.

After deloading, the beam was reloaded and was able to carry almost the same load as the load at which it failed in the first experiment. This is presumed to be due to good fixation of the main reinforcement in the fibre reinforced matrix even after large deformations.

As mentioned above, test cylinders (dimensions 10 cm diameter×20 cm height) were cast in connection with the casting of each beam. The average values of the compressive strength of these control cylinders (9 series with six specimens and 3 series with three specimens, corresponding to the 12 beams) varied between 171.1 MPa and 197.1 MPa with standard variations varying from 3.5 to 10.5 MPa.

Comments on the Results

The results fully verified the promising results obtained with small beams, cf. Example 1, and supported the theoretical considerations with respect to upscaling to large bodies with retention of the same exceptionally good behaviour.

Although beams with cross sections of about 100×200 mm and a length of about 2100 mm are not large compared to, e.g., large bridges, the experiments, combined with theoretical considerations, support the presumption that the beneficial behaviour observed with small beams can be safely upscaled to even very large structures.

The yield values—expressed as normalized moments (formalized bending stresses) were from 120 MPa to 160 MPa. This is in good conformity with what would be expected from theoretical assessments based, inter alia, on the experience from Example 1.

These values are very high compared with conventional good reinforcement which would typically have formal bending stresses of about 20 MPa.

As appears from FIGS. 30–33, the force/deflection curves were smooth and the beams showed a large rigidity during the entire loading even up to yielding.

This is also illustrated by the curves showing normalized stiffness (modulus of elasticity) as a function of normalized bending stress (FIGS. 38–41).

Thus, the results illustrate the unique combination of strength and stiffness even up to very large normalized strain load (about 3.8 mm/m). Conventional reinforced concrete loaded to a normalized strain of for example 2 mm/m would have shown pronounced cracking and would have carried a load corresponding to only about 15–20 MPa, thus corresponding to a normalized modulus of elasticity of about 10,000 MPa as compared to the values of about 40,000–50,000 MPa in the CRC beams.

The crack observations confirmed the coherent behaviour of the CRC structures with substantially no cracks visible to the naked eye even at very high loads (more than 100 MPa in bending stress and more than 3.8 mm/m in bending strains).

The majority of the very fine cracks observed were in the middle of the beams, thus outside the most stressed bottom zone which was protected against cracking passing the reinforcement.

This astonishing behaviour compared to what happened in conventional reinforced concrete is illustrated in FIG. 43 which shows the crack behaviour of CRC and conventional reinforced concrete, respectively. FIG. 43 shows a view and a section of a beam A of conventional concrete 2 reinforced with steel bars 1 and a similar view and section of a CRC beam B with a fibre reinforced matrix 3 and a concentrated steel reinforcement 1, both beams being under bending load. The conventional reinforced concrete beam shows cracks 4 starting from the outermost tensile strained surface (the lower side of the beam) and developing inwards passing the reinforcement, whereas the CRC beam only shows very small cracks in the unreinforced zone above the level of the lower reinforcement.

Reliability

The experiments demonstrated substantially identical behaviour of beams of the same type, which clearly appears from the statistical results. The substantially identical behaviour can also be illustrated by drawing force deflection graphs for beams of the same type on the same sheet of paper (the latter, however, not being shown because the graphs coincide almost completely and can hardly be distinguished from each other).

The coefficients of variation were very small compared to what is typically observed in beam tests on ordinary reinforced concrete. Obviously, the reason is the high degree of internal coherence of the CRC material at all structural levels. Large local and global ductility secures a substantially uniform stress-strain distribution without the discontinuities normally encountered in semi-brittle materials like reinforced concrete due to the formation and development of large crack, for example typically cracks passing the main reinforcement. This very high reliability of CRC structures, even under very high load, makes the CRC material a very safe one for even very heavily loaded structural members.

Possible Improvements

The test beams did not in any regard represent optimum structures. The structures were designed, inter alia, with a view to investigating the behaviour over a broad spectrum of structures. In the following, structural characteristics of the test beams and possible improvements thereof will be discussed.

(1) Main Reinforcement

The diameter of the reinforcing bars were 14, 16, 20 and 25 mm, respectively, which is 1.75, 2.0, 2.5 and 3.1 times larger, respectively, than the diameter of the bars used in Example 1 (8 mm).

The larger bars—and the corresponding larger size of the open space between the bars—were used without changing the matrix, in other words, still using the same matrix based on fibres of a length of 6 mm.

By increasing the size of the bars while keeping the matrix unchanged, the resistance against local failure (splitting along bars, etc.) is decreased because the local brittleness number $\sigma^2_0 D/EG$ is increased proportionally to the diameter.

Similarly, the strain capacities in the reinforced zone are smaller than if for example 8 mm bars had been used in the same volume concentration, as the use of the larger bars increases the size of the small separated matrix volumes formed between the reinforcement bars by a factor of 1.7-3.1.

The performance of systems with the large diameter reinforcement could thus be improved with respect to cracking in the reinforced zone by using smaller bars, for example bars of a diameter of 8 mm, keeping the volume concentration of the bars constant and using the same matrix. From the point of view of castability, this would not give any problems.

(2) Microcracking

Microcracking in the zone above the reinforcement could be avoided by reinforcing that zone, typically less heavily than the bottom zone.

(3) Matrix

The system behaviour could also have been improved even while maintaining the large reinforcement by changing the structure of the matrix to adapt it to the larger transverse dimensions of the space between the reinforcement bars, using, for example,
1. longer fibres,
2. a higher volume concentration of fibres,
3. bimodal fibre systems (for example combining 12 mm fibres and 3 or 6 mm fibres).

(4) Ultra-Strong Members

The beams could also have been made able to perform under even extremely high load levels such as formal bending stresses of 250-320 MPa by such means as
1. using up to 50% or 70% more reinforcement
2. using stronger reinforcement, for example with a yield value of 600-1100 MPa instead of 550 MPa
3. using a stronger matrix, for example based on $Al_2O_3$ sand, keeping the size of the reinforcement small (e.g. 8-12 mm).

Also this would be possible from the point of view of casting. For example, space between the bars would in this case be 3-4 mm and the space between the outermost bars and the surface would also be about 3-4 mm.

The matrix could be substantially the same as used in Example 1, only with a small reduction in particle size, for example using sand with a maximum diameter of 2 mm (instead of the 4 mm used above) and a high concentration of material between 1 mm and 2 mm.

EXAMPLE 3

Bending Test on Strong CRC Beam

Bending tests were performed on a strong 100×100×850 mm CRC beam heavily reinforced with strong reinforcement in the longitudinal direction of the beam, but with no transverse reinforcement.

The matrix material was of the same type as in Examples 1, 2, and 4 (based on quartz sand, cement, microsilica, and 6% by volume of steel fibres).

The reinforcement (20 mm deformed bars KS600) was very similar to the reinforcement used in Example 1, 2, and 4, but was somewhat stronger with a guaranteed yield value above 600 MPa.

Purpose of the Experiment

The purpose of the experiment was to investigate the capability of CRC bending members without special transverse reinforcement to resist heavy shear forces (in normal steel reinforced concrete, shear forces are taken up by means of stirrups or inclined bars). In the present case, it was investigated to what extent the strong, tough, fibre-reinforced matrix alone was able to resist the shear forces and thus, to see to what extent it is possible to use the simpler arrangements with no shear reinforcement in bodies exposed to the combination of bending and shear.

It will be appreciated, however, that, as explained above, CRC is by no means limited to such structures without a special shear reinforcement, and that one aspect of the invention discussed further above is that the strong fixation of reinforcement in the matrix makes it possible to establish a complete new transverse reinforcement strategy which results in extremely high shear capacity.

Another purpose of the experiment was to investigate the bending behaviour up to the load causing shear failure.

Test Beam

As mentioned above, the beam had a length of 850 mm and a cross section of 100×100 mm.

In order to avoid bending failure (as the purpose was to study shear behaviour), the beam was heavily reinforced with strong reinforcement consisting of 3 deformed bars KS600, diameter 20 mm, placed in the bottom zone and 2 bars of the same kind placed in the top zone.

Thus, the volume concentration of reinforcement in the tensile stressed zone at the bottom was 18.8%, calculated on the tensile zone.

The density and compressive strength of the matrix material were determined on test specimens (cubes 100×100×100 mm) which were cast and stored together with the test beams. It was found that the density was 2680 kg/m³ and that the compressive strength was 209 MPa. These values are the average of 4 determinations, the coefficient of variation for the compressive strength determinations being 8.5%.

Recipe and Preparation

Recipe and preparation were as described in Example 2, except that the type of mixer and vibrating table were not the same as described in Example 2, but were very similar. The beam and the test specimens were stored at 40°-50° C.

Experimental Set-up

The beam was simply supported (span 750 mm) and was loaded with a central force in a 25 tons testing machine.

During the testing, the applied force and the strain at the bottom side of the beam under load were recorded. During the testing, the surface was observed in order to detect cracks.

Result

At a loading up to 197 kN, the beam was deformed without any visible cracks, whereafter a shear crack developed (above the bottom reinforcement and at an angle of 45°) still without any visible tensile cracks at the bottom of the beam. The strain at the bottom of the beam loaded with 197 kN was 3.75 mm/m.

At a load of 203 kN, a fracture occurred along the bars. Thereafter, the load fell to about 70 kN.

The shear capacity before any cracking (as observed with the naked eye), corresponding to the load of 197 kN was 14.8 MPa, calculated as normalized shear capacity, T/⅔ BH, where the shear force T=½·197 kN, and the width (B) and the height (H) of the beam both are 0.1 m.

Before the shear cracking at the load of 197 kN, the normalized bending capacity and the strain in the bottom surface zone under the load application point were $\sigma_b = 222$ MPa and $\epsilon = 3.75$ mm/m, respectively.

The normalized bending capacity (formal bending stress) is calculated as $M/1/6\ BH^2$ where the bending moment M is ½·197·0.75 kNm.

From these values, the "normalized modulus of elasticity", here defined as $E = \sigma_b/\epsilon$, is calculated to be $E = 59,200$ MPa.

The ultimate load capacity of 203 kN corresponds to a formal bending stress of $\sigma_{ult} \sim 228$ MPa and a formal shear stress of $\tau_{ult} = 15.2$ MPa.

Comments on the Results

The shear experiment shows that the matrix itself is capable of transferring large loads in shear in CRC beams with a high concentration of thick main reinforcement (almost 20% by volume in the tensile zone of bars of a diameter of 20 mm in a beam having a cross section of 100×100 mm), but without any transverse reinforcement, the ultimate shear stress being about 15 MPa.

The formal shear capacity of about 15 MPa is a high value compared to conventional good reinforced concrete which, in contrast to the present beam, has special transverse reinforcement to take up shear.

What is fascinating about the result is perhaps not that the specific tough reinforced matrix itself can transfer large shear stresses—in fact the values correspond well with what would be expected from experiments on the matrix material in bulk—but that it can do this in perfect co-operation with the very heavy main reinforcement.

This illustrates the eminent coherent matrix-reinforcement interaction with good fixation of the reinforcement and strong coherence of the matrix, permitting the structure to function substantially crack-free (until the failure at a very high load) without the severe fracture along the main reinforcement which would undoubtedly have taken place (at a very low load) if a similar amount of heavy reinforcement had been placed in a beam made from conventional concrete materials.

Actually, according to the code of practice, it would not be allowable to use a beam of ordinary concrete with such a heavy reinforcement.

With respect to bending, the tests demonstrated the potential capacity in bending to be obtained in CRC structures—values which would have been considered completely unattainable and unrealistic prior to the present invention. Thus, the test beam demonstrated a bending capacity (formal bending stress) of at least 222 MPa. Actually, the beam functioned perfectly without any bending cracks up to a formal bending stress of 222 MPa (and a corresponding strain of 3.75 mm/m) when the shear failure started. There was no sign that the formal bending stress had been close to the upper limit which could have been reached if the shear failure had not occurred.

At that state, the overall stiffness (the stress divided by the strain) was 59,200 MPa. This is an extremely high stiffness in combination with a very high bending stress level ($\sigma = 222$ MPa).

An estimate shows that beams with cross sections like the one tested, but secured against shear failure (using shear reinforcement or using longer beams which would not have been subjected to the same high shear) would more likely have a yield value in bending corresponding to a formal bending stress in the range of 260–300 MPa, and would most likely perform well up to yielding with regard to internal coherence without matrix cracks passing the reinforcement at all—or with only very thin cracks passing the main reinforcement.

EXAMPLE 4

Dynamic Tests on Beams - Fatigue

Three CRC beams were subjected to very large oscillating loads (formal bending stresses from zero to 50, 83 and 102 MPa, respectively, corresponding to about 42, 70 and 86% of the static yield limit, respectively).

The beams were Portland cement/microsilica-based beams reinforced with deformed steel bars, length 2082 mm, width 84 mm, height 90 mm of the same type as the beams (type BDR14) used in the static loading experiments in Example 2.

The purpose of the experiments was to investigate CRC structures under oscillating loads at very high stress and strain levels.

It is well-known that conventional brittle materials reinforced with fibres or bars have a rather poor behaviour at oscillating strain loads exceeding the tensile strain at which the matrix cracks.

Thus, such conventional materials mostly have a poor fatigue resistance (unless the tensile strength of the matrix material in itself is very high) despite the fact that the reinforced material may have a far higher tensile capacity than the matrix because the reinforcement carries a considerable load after matrix cracking. This is, e.g., the case with conventional reinforced concrete and strongly reinforced fibre cement products.

The question regarding the bending behaviour of CRC structures under oscillating loads (thousands of times or up to more than five million times) from, e.g., zero to a peak value is whether the structure would (1) fail at strains similar to the ultimate strain of the base matrix in bulk under static tension, i.e. whether the material will fail due to spreading of base matrix destructions which, with reference to the base matrix material in question, would be at tensile stresses of about 10 MPa and tensile strains of about 0.2 mm/m or (2) whether the CRC structure would not fail until subjected to tensile strains similar to the tensile strains which cause cracks in the fibre reinforced matrix in bulk, i.e., without the main reinforcement (this would correspond to a tensile strain of about 0.6–1 mm/m) or (3) whether the CRC structure would not fail until subjected to so large stresses that they would cause fatigue of the main reinforcement, with the matrix material substantially coherent until failure. This would correspond to a load introducing stresses in the reinforcement of 70-80% of the yield values, which, for the test beams in question, corresponds to normalized bending moments (formalized bending stresses) of about 80-90 MPa and to strains of about 3 mm/m.

In order to include possibility 3, it was decided to start in the upper end with oscillating loads from zero up 86, 70 and 42%, respectively, of the yield load and simply observe what happened.

Test Specimens (Beams 84×90×2082 mm)

The test beams were of the same type as the beams in Example 2, Type BDR14, and were actually prepared and cast together with these. Thus, the data regarding preparation, mix composition, structure of the matrix, etc. are the same as in Example 2.

The main data from the static tests on similar beams and the tests on specimens of the matrix materials are shown in Table 2.9 and FIG. 33.

Experimental Set-up

The beams were loaded with two identical forces in the same manner as described in Example 2 and in the same equipment as was used in the static experiments with the beams of the type BDR14.

At their middle, the beams were provided with strain gauges glued onto the surfaces of the beams and to the top and bottom surfaces of the middle reinforcement bar in the tensile zone, and displacement transducers were established for measuring the deflections according to the same principle as in the corresponding static experiments.

The beams were subjected to oscillating deformation-controlled loads from about zero to loads which in static experiments correspond to formal bending stresses of 50, 83 and 102 MPa, respectively (which corresponds to 42, 70 and 86%, respectively), of the static yield values referring to average values found in Example 2 for type BDR14).

The individual experiments were performed with constant displacement amplitude. By keeping the displacement amplitude constant, the peak force will decrease during the test (due to non-reversible deformations). However, as will be seen from the results, the decrease in peak force during the experiments, even up 2,000,000 of load cycles, was very small so the experiments can also be considered almost as constant peak force experiments.

Two of the beams (the two most heavily loaded) failed during the experiment, whereas the last beam was intact after 5,305,150 load cycles.

After the dynamic test, and after examination of the surface to detect crack development, the intact beam was loaded again, this time statically, until yielding, following the same procedure as in the static experiments (vide Example 2).

Test Results

The test results from the dynamic tests are shown in Table 4.1. The results from the static tests on similar beams are shown in Table 2.9.

TABLE 4.1

Test Results, Dynamic Experiments on Beams and Statically Determined Compressive Strength of Matrix Material

| Compressive Strength of Matrix Material (Test Specimens dia. 100 mm, Length 200 mm) MPa | | Force During Beam Test | | | | Number of Cycles |
|---|---|---|---|---|---|---|
| | | At Start of Test kN | | At End of Test kN | | |
| Mean Value | Standard Deviation | Max. Force | Min. Force | Max. Force | Min. Force | |
| 176.3 | 4.4 | 15.88 | 5.30 | 14.49 | 4.04 | 5,305,150 |
| 174.6 | 1.9 | 26.58 | 5.00 | 23.48 | 3.18 | 403,790 |
| 169.9 | 11.0 | 32.67 | 2.13 | 32.57 | 1.93 | 52,430 |

The experiments were carried out until fracture, frequency 5 Hz, except for the beam which withstood 5,305,150 cycles without fracture, where the testing was performed at 10 Hz.

The two most heavily loaded beams failed after 403,790 and 52,430 cycles, respectively.

The peak load changed very little during the experiment, i.e., 9, 12 and 0%, respectively.

Thus, the test may be considered almost as almost as constant peak load experiments corresponding to moment peak loads of about 50, 83 and 102 MPa, respectively (formal bending stresses, the values being 42, 70 and 86%, respectively, of the static yield values).

Cracking was investigated after the first load cycle and after failure. There was substantially no development of cracks to be observed from the first cycle to failure after 5,305,150, 403,790 and 52,430 cycles, respectively.

From the two beams which failed, material was cut away from the bottom surface in the failure zone by means of a diamond saw, thus exposing the surface of the main reinforcement.

In two of the beams, fatigue failure occurred in one reinforcing bar (beam section corner) and two reinforcing bars (beam section corner and middle), respectively. The failure was assessed by a drop in the peak force whereby the oscillating equipment stopped automatically.

The beam loaded with $P_{max}$ about 15.9 kN did not fail and the loading was stopped after 5,305,150 cycles.

The peak force had dropped from $P_{max}=15.9$ kN at the start to $P_{max}=14.5$ kN after 5,305,150 cycles, in other words, a decrease of only about 9%.

Also for this beam, the fatigue experiment may be considered as a constant peak force experiment with a force variation between almost zero and at least 14.5 kN (corresponding to a normalized moment (formalized bending stress) of about 41 MPa, which is about 38% of the static yield value.).

From the first loading to 5,305,150 load cycles very little crack development was observed. After the 5,305,150 load cycles, the test beam was loaded statically (slowly) to yielding.

Figure 44:
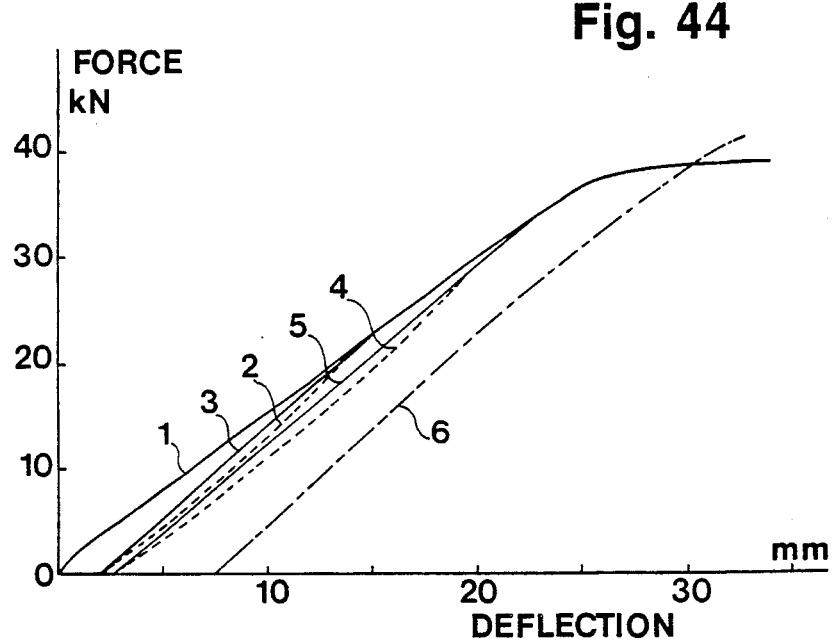

FIG. 44 show the force/displacement curve 6 for the static loading of this beam, together with the force/displacement curve for a similar beam from the static tests in Example 2 on which two reloading cycles were performed: Curve 1 represents the loading, curve 2 the first deloading, curve 3 the first reloading, curve 4 the second deloading, and curve 5 the second reloading. It will be noted that the force/displacement curve 6 for the static loading of the beam which had been subjected to 5,305,150 loads cycles, has the same slope as the curve for the second reloading of the beam from the static tests in Example 2.

Thus, the beam showed substantially the same behaviour until yielding as the beams in the static tests. The present beam which had been subjected to oscillating loading only showing a somewhat larger stiffness.

Comments on the Results

The test results demonstrated that the typical CRC performance where the reinforcement increases the strain capacity of the matrix applies even to a very large number of load cycles at very large loads (large strians). The matrix was substantially coherent and did not lose its ability to transfer large loads and retain large rigidity. This was clearly demonstrated by the substantially unaffected beam loaded more than 5,000,000 times. These experiments also illustrate a slight matrix structure rearrangement which takes place during the first load cycle and which gives rise to increased stiffness during the following load cycles.

The exceptional behaviour was also demonstrated very convincingly by the high load experiments where the ultimate failure was undoubtedly a pure fatigue failure of the main reinforcement, no change in the coherenece of the matrix material taking place before failure.

The following facts confirm that the failure is a pure fatigue failure in the main reinforcement:

(1) The stresses in the reinforcement (corresponding to a strain of about 1.8 mm/m) are of a magnitude which may give rise to fatigue failure in the reinforcement.

(2) The capability of the matrix to transfer loads seem to have been substantially unchanged, as assessed by the fact that the peak forces built up during the constant displacement experiments remained practically constant during the load cycles.

(3) There was substantially no crack development from after the first load cycle to the end of the tests (except for the single failure crack in connection with the reinforcement failure).

This strongly indicates that CRC structural members with extremely high capacity for resisting oscillating loads are a reality, and that the limit for such structures is set by the fatigue strength of the reinforcement, not by the matrix.

EXAMPLE 5

Dynamic Tests on Matrix Material in Compression - Fatigue

Cylinders of matrix material identical with the cement-microsilica-steel-fibre-based material used in Examples 2, 3, and 4 were subjected to oscillating compression loading.

The specimens were loaded with oscillating pressures varying from very small values (approximately 3 MPa) to a peak value selected in the range from about 90–60% of the compressive strength as determined in static experiments.

Purpose of the Experiment

CRC structures are always provided with a high concentration of main reinforcement to take up tensile forces. Sometimes, the CRC structures are also provided with reinforcement to take up compressive forces, but as the matrix itself is able to take up considerable compressive forces, the need for reinforcement in the compressive zones of CRC structures is much smaller. The compression strength is known to be very high in static loading. The purpose of the present fatigue experiments was to determine the compressive strength of a typical CRC matrix under conditions of oscillating loading.

Test Specimens

The tests were carried out on 29 cylinders of a diameter of 29 mm and height of 58 mm. The matrix material of the specimens was the same as used in Examples 2–4. The test cylinders (and control cylinders) were prepared as described in Example 2. The specimens were cast from 5 batches.

Experimental Set-up and Testing

Before the dynamic experiments, static experiments were performed on some of the test cylinders and on control specimens (100 mm diameter × 200 mm height) made from the same batches. Both the static experiments on the small cylinders and the dynamic experiments were performed in a 250 kN pulsating equipment (Schenck hydropulse equipment PSB 25).

As mentioned above, the specimens were loaded from about zero to peak values. For technical reasons, the specimens were under compression throughout the experiment, the minimum pressure being about 3 MPa.

The peak force values were selected on the basis of the result of static experiments where a compressive strength of 208 MPa, corresponding to a force of 137.4 kN was found:

The peak force values were selected between 89.2 kN and 126.4 kN corresponding to stresses between about 135 and 191 MPa, in other words between about 65 and about 92% of the compresive strength determined in static experiments.

The loading was continued until failure, and the number of load cycles was recorded. Three of the specimens did not fail when the experiment was stopped after about 1-2 millions of cycles.

The results of the static and the control experiments are shown in Table 5.1, and the results of the dynamic experiments are shown in Table 5.2.

TABLE 5.1

Results of Static Experiments on Test Specimens (29 mm × 58 mm) and Control Specimens (100 mm × 200 mm) Average of 5 Experiments

|  | Test Specimens | Control Specimens |
| --- | --- | --- |
| Compressive Strength MPa | 208.0 | 185.0 |
| Standard Deviation MPa | 4.5 | 4.7 |

TABLE 5.2

Peak Force Versus Number of Load Cycles
Experiments run with loads varying from a minimum force between 2.7 an 4.2 kN to peak force at a frequency of 10 Hz except those marked with ** which were run at 1 Hz. Specimens marked with * did not fail.

| Peak Force kN | Number of Cycles |
| --- | --- |
| 112.7 | 6,570 |
| 113.3 | 2,770 |
| 100.9 | 10,870 |
| 101.0 | 20,910 |
| 96.3 | 94,560 |
| 89.2 | 2,599,570* |
| 95.7 | 59,900 |
| 92.8 | 1,285,010 |
| 102.0 | 10,370 |
| 95.6 | 1,479,000* |

TABLE 5.2-continued

Peak Force Versus Number of Load Cycles
Experiments run with loads varying from a minimum force
between 2.7 an 4.2 kN to peak force at a frequency of
10 Hz except those marked with ** which were run at 1
Hz. Specimens marked with * did not fail.

| Peak Force kN | Number of Cycles |
| --- | --- |
| 98.2 | 625,060* |
| 108.1 | 12,020 |
| 107.8 | 2,930 |
| 107.9 | 8,730 |
| 104.6 | 11,620 |
| 125.0 | 247 |
| 105.1 | 18,530 |
| 104.8 | 8,600 |
| 112.7 | 2,840 |
| 118.3 | 1,143** |
| 118.6 | 390** |
| 118.6 | 149** |
| 126.4 | 42** |
| 125.7 | 135** |

Figure 45:
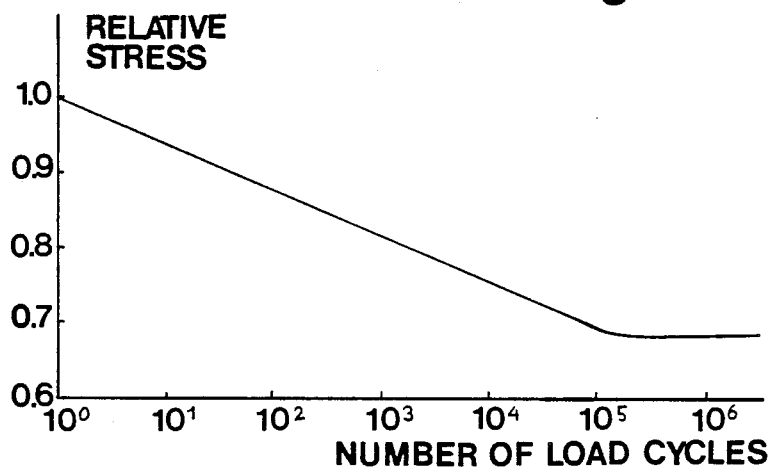

FIG. 45 is a semi-logarithmic graph (log N, $P_p/P_u$) showing the best curve fit drawn through the points representing the experimental results in Table 5.2. $P_p$ and $P^u$ designate peak force for dynamic load and load at failure for static load.

Comments on the Results

It will be noted that after about 100,000 loadings, the compressive strength had decreased to about 70% of the compressive strength determined in the static experiments and that the ultimate fatigue strength corresponding to more than 1,000,000 load cycles was about 60-70% of the compressive strength determined in static experiments.

The results indicate that the matrix can be utilized very in compression under pulsating load up to 60% of the compressive strength of the matrix even for several millions of load cycles.

EXAMPLE 6

Preparation of Heavily Reinforced CRC Utilizing Vibration Transferred Through Reinforcement CRC is made with a high concentration of main reinforcement, often with a high concetration of secondary transverse reinforcement embedded in a dense matrix material containing a high concentration of fine fibres. In most cases, the establishment of such structures requires special precautions.

Thus, it is required
(1) that the matrix material completely fills the void between the coarser reinforcement,
(2) that the constituentts forming the material are packed in a configuration with a very low void volume, and
(3) that the matrix material is arranged homogeneously without any substantial internal separation.

A suitable production technique is illustrated in the present example, which also serves as a test casting in connection with the preparation of 12 mm thick heavily reinforced large CRC plates designed for a very high load capacity with respect to resisting very large concentrated load which would normally give rise punching failure, vide FIG. 17.

Figure 46:
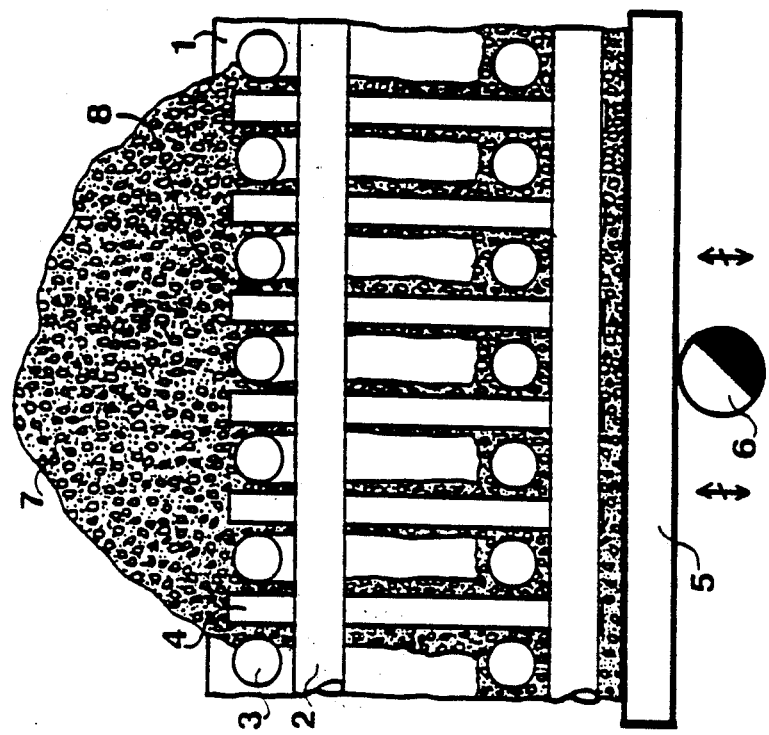

The principle of the casting is shown schematically in FIG. 46. In a mould having a rear wall 1 and a bottom 5, arranged on a vibrating table as symbolized by 6, a system consisting of two horizontal layers of main reinforcement bars 2 and 3 perpendicular to each other are placed at the top and at the bottom of the box, strongly fixed to the sides of the mould. In each of the openings between the main reinforcement bars, a bar of transverse reinforcement 4 was arranged and was welded to the horizontal bars, one of the welds being shown at 8. A casting mass of fibre reinforced matrix material 7 was placed on top of the upper reinforcement layer and flowed down into the mould aided by the vibration.

Mould with Reinforcement

Casting of a "model" of the plates was performed in an open prismatic box (160×160×120 mm) of transparent material (plexiglass) with the larger sides (160×160 mm) arranged horizontally. The model corresponds to the mound shown in FIG. 46, but was smaller. The reinforcement was arranged as follows:

A large amount of main reinforcement (16 mm diameter deformed bars): At the top and at the bottom of the box, a system consisting of two horizontal layers perpendicular to each other, each consisting of 5 bars, was arranged. The distance between the two layers arranged perpendicular to each other in each system was 4 mm, and the distance between the outermost layers and the interior top and bottom surfaces of the box, respectively, was 8 mm. The distance between the bars in each individual layer was 16 mm, and the distance between the bars and the side boundaries of the box was 8 mm, vide FIG. 46.

In addition to this, transverse reinforcement in the form of deformed bars (diameter 10 mm, length 100 mm) was arranged in each of the 16×16 cm openings between the main reinforcement bars.

The total volume concentration of the reinforcing bars was about 27%.

The fixation between the main reinforcement and the sides of the box was obtained by arranging the main reinforcement bars so that they protruded about 10 mm at the exterior of the box, the holes in the box being sealed with silicone. The transverse reinforcement was fixed to the upper layer of reinforcement bars (by welding) and were placed centrally in the box so that the ends of the 100 mm bars were at a distance of 10 mm from the ttop and bottom of the box, respectively.

Matrix Material

Two types of matrix material were used. One type was identical with the material used in Examples 1-5 and comprised about 6% by volume of steel fibres (6 mm×0.15 mm), 45% by volume of coarse sand (maximum particle size 4 mm) and about 50% by volume of binder-forming material with about 48% by volume of cement, about 16% by volume of ultra-fine silica, about 34% by volume of water, and about 3% by volume of dispersing agent. The other type of matrix material was of a similar composition except that the coarse sand was strong $Al_2O_3$-rich sand a maximum particle size of 4 mm.

Mixing

The mixing was performed as described in Example 2.

Casting

The casting was performed under vibration, the mould with the reinforcement being fastened to a vibrating table during the successive filling of the mould with the matrix material, vide FIG. 46. The vibrating frequency was about 100 Hz, the acceleration being 50–70 m/sec.$^2$.

The vibration was continued until the mould was completely filled as assessed visually. This took about 10 minutes for the matrix material with quartz sand and about 7 minutes for the matrix material with $Al_2O_3$.

Concomitantly with this, three reference cylinders, diameter 10 cm, height 20 cm) were cast from the matrix material on the same vibrating table.

Observations

The base matrix material (without fibres) was a little tough (but able to flow under its own weight as assessed on masses of a thickness of 2–4 cm). After the 6% by volume of steel fibres had been mixed into the base matrix material, the material was much tougher and was not capable of flowing under its own weight without applied vibration.

When arranged in 3–5 cm thick lumps on top of the top reinforcement bars which oscillated following the movements of the vibrating table, the material immediately adjacent to the reinforcement became easily flowable, whereas the material in the zone more remote from the oscillating bars behaved as a tough material with a flowability which was only slightly better than without vibration.

The easily flowable material from the lower zone flowed as sticky mass down along the transverse reinforcement or fell as long threads (typically of a thickness of 2–5 mm) down to the lower reinforcement in the bottom of the box and spread perfectly over the entire open bottom space, little by little rising upwards and at last completely filling the box, vide FIG. 46.

The matrix material did not flow nearly as well in the filling of the 100 mm diameter and 200 mm height reference cylinders as in the filling of the box with the heavy reinforcement. After the casting, the specimens were weighed to find the matrix density of the material cast in the box and the material cast in the cylinders, respectively (the volume of the free space in the box had been determined in advance by filling the box with water and weighing the system). The densities found were as follows:

For the casting in the box

The matrix material with quartz sand: 2756 kg/m$^3$
The matrix material with $Al_2O_3$-sand: 2945 kg/m$^3$ For the casting in the test cylinders The matrix material with $Al_2O_3$-sand: 2922 kg/m$^3$ The result with the quartz sand matrix can be compared to the theoretical value corresponding to 100% dense packing of the quartz sand matrix which is 2733 kg/m$^3$. As will be noted, the density measured on the material in the box was slightly higher than the theoretical density, which is due to experimental uncertainty. However, taking the accuracy into account, it must be concluded that the filling of the complicated system is extremely good, probably with an air content of less than 2%, most likely less than 1%. The result also indicates that the density of the material in the box is higher than that of the material in the cylinders which, together with the observation of the inferior flow of the material in the cylinders, indicates a better compaction in the system in the box.

This illustrates the efficiency of the aspect of the invention according to which vibration—contrary to conventtional "good" concrete practice—is transferred from the reinforcement to the matrix material. In the box case, the maximum distance from the vibratory source (the reinforcement) to the material being about 5 mm, whereas the distance from the cylinder bottom to the top was 50–150 mm.

The mechanical properties of the 3 reference cylinders cast with the matrix with $Al_2O_3$-sand were determined. The compressive strength was 218.7 MPa, the sound velocity 49,260 m/sec., and the dynamic modulus of elasticity was 71,000 MPa. The compressive strength was the average of the 3 specimens, the standard devation being 4.7 MPa. The methods of determining the sound velocity and of calculating the dynamic modulus of elasticity are described in Example 1.

EXAMPLE 7

Pull-Out Tests

It is a characteristic feature of CRC that very large forces may be transferred between main reinforcement and matrix in the CRC structure and that it must also be possible to transfer large forces to or from the reinforcement when the reinforcement is placed very close to the surface of the CRC structure; in CRC structures, good designs will often involve arrangement of main reinforcement so close to the surface of the structure that the layer of the fibre reinforced matrix over a main reinforcement is much thinner than in conventional reinforced concrete.

Thus, in conventional concrete reinforced with defomed bars, the thickness of the cover is at least 1.5 times the diameter of the bars, cf. Danish code of practice DS 411. In CRC, the thickness of the cover will typically be of the order of only 0.3–0.8 times the diameter of the reinforcing bar, in other words, 2–5 times smaller than in ordinary reinforced concrete.

During transfer of large forces to or from reinforcement close to the surface of a reinforced structure, there is a risk of fracture of the matrix along the main reinforcement. In order to investigate this phenomenon in CRC structures, pull-out tests were performed on two types of specimens: one type having steel reinforcement bars (8 mm diameter) cast into very thin (18 mm thick) specimens of fibre reinforced matrix (almost similar to the one used in Examples 2–5), the thickness of the fibre reinforced matrix layer on two sides of the reinforcement thus being only about 0.6 times the diameter of the reinforcement (cf. test specimens FA described below), another type being prismatic specimens with cross sections of 50×50 mm with 8 mm bars centrally placed therein (test specimens of this type are designated FAK and described below).

The two types of test specimens are shown in FIG. 47. In a body of the fibre reinforced matrix material 1, two bars 2 are embedded to an anchoring length as shown by 3. FIG. 47 shows the very thin rectangular cross section specimen where the fibre reinforced matrix layer on two sides of the reinforcement is only above 0.6 times the diameter of the reinforcement and the prismatic specimen with square cross section with with the bars centrally placed therein.

The fixation lengths (the length of the part of the steel bars embedded in the matrix) varied between 15 mm and 115 mm. As shown in FIG. 47, each specimen contained tow protruding bars, one in each end, the anchoring lengths of the bars being identical. Both types of specimens were reinforced with longitudinal bars, diameter 8 mm, to avoid tensile failure.

In order to elucidate the effect of the fibres, two specimens (type FA) with the same matrix composition, but without fibres were also made and tested.

the end of the experiment, when yielding had started to occur, the rate of displacement was increased.

The results appear from Table 7.1.

TABLE 7.1

Results of Pull-Out Tests and Properties of Matrix Material
Average of 3 specimens. The 8 tests above the double line
(type FA) were on thin specimens, cross section 18 × 66
mm whereas the 4 tests under the double line (type FAK) were
on larger specimens with cross sectional area 50 × 50 mm.

| Anchorage Length l mm | Ultimate Load P kN | Standard Deviation kN | Coefficient of Variation % | Shear Stress τ(4) MPa | Properties of Matrix Material (100 × 200 mm Test Cylinders) | |
|---|---|---|---|---|---|---|
| | | | | | Compr. Strength MPa | Density kg/m³ |
| 105 | 29.9 | 0.81 | 2.7 | 11.3 | | (1) |
| | | | | | 166.7 | 2703 |
| 115 | 31.0 | 0.85 | 2.7 | 10.7 | | (1) |
| 15 | 6.4 | 0.69 | 10.7 | 17.0 | | |
| | | | | | 163.0 | 2688 |
| 35 | 11.7 | 0.56 | 4.8 | 13.3 | | |
| 60 | 16.9 | 0.86 | 5.1 | 11.2 | | |
| | | | | | 155.6 | 2644 |
| 85 | 23.3 | 0.78 | 3.3 | 10.9 | | |
| 105 | 7.8 | 0.2 | 2.7 | 3.0 | | (2) |
| | | | | | 95.5 | 2275 |
| 115 | 9.0 | 1.1 | 12.2 | 3.1 | | (2) |
| 15 | 11.4 | 0.2 | 1.3 | 30.2 | 168.7 | 2725 |
| 35 | 24.9 | 2.2 | 8.8 | 28.3 | 173.4 | 2718 |
| 60 | 31.0 | — | — | — | 172.8 | 2719(3) |
| 85 | 31.0 | — | — | — | 168.9 | 2678(3) |

(1) The reinforcing bar yielded before the ultimate load was reached. With increasing load, a crack developed until the bars were pulled out.
(2) The matrix was without any fibres.
(3) The bars were torn apart outside the matrix part of the specimen. Thus, no pull-out occurred.
(4) The = $P/(\pi \cdot d \cdot l)$ where P is the tensile force, d is the diameter of the reinforcement, and l is the anchoring length.

In the specimens, the risk of cleavage of the reinforced matrix is far higher than it will be in a similar CRC structure where the matrix layer is only thin at one side of the reinforcement (the material at the other side of the reinforcement, in the interior of the CRC strucuture, protects against cleavage).

Properties of the Test Specimens

The yield and fracture stresses of the bars to be pulled out were 616 and 774 MPa, respectively.

The matrix material was of almost the same type as used in Examples 1-5, thus, based on Portland cement, microsilica, quartz sand and 6% by volume of steel fibres (6 mm×0.15 m), but with some of the ingredients from other charges which were found to give rise to lower strength and ensity than in the other examples. Despite of this, the results give important information concerning the pull-out resistance.

The mix composition and the preparation of the mix were as described in Example 2. The mixing was performed as in Example 1. The casting was performed under vibration on a vibrating table oscillating at a frequency of 50 Hz and an acceleration of 30-50 m/sec.².

The test specimens were wrapped in wet towels and plastic and were stroed for 1 day at 20° C., 11 days at 40°-45° C., and 1-3 days at 20° C.

Testing Procedure

The test was performed in an INSTRON machine model 1255 by pulling the protruding ends of the cast-in bars at a constant rate of displacement of 0.1 mm/min. The pulling force was recorded during the pulling. At In the experiments with thin prisms (cross section 18×66 mm), failure occurred in the form of pulling out and simultaneous cleavage of the matrix along the reinforcement at both sides of the prisms.

In the samples with the longest anchoring lengths, a pronounced yielding in the reinforcement occurred before the pull-out. This was seen from the formation of a crack starting at the end of the prism and developing inwards along the reinforcement.

In the specimens with the very short anchoring lengths (15 mm) failure occurred as a combined cleavage and pulling out of a small wedge-shaped body of the matrix material.

In the specimens with the large anchoring lengths, there was also substantial yeilding and crack formation of the prism at the bar at the other end of the test specimen where no failure occurred.

In the experiments with specimens with short anchoring lengths, substantial destruction occurred only at the end where failure took place, whereas the matrix material in the opposite end was largely intact and substantially without cracks.

In the experiments with thicker prisms (50°50 mm), pulling out occurred only for specimens with a short anchoring length (less than 60 mm), whereas those with longer anchoring length (60 mm and longer) failed in that the protruding reinforcement was simply ruptured.

Comments of the Results

The experiments show the capability of the CRC matrix of resist fracture along the reinforcement in connection with pull-out. Thus, the formal pull-out shear stress in the this specimens with only 5 mm of reinforced matrix on each side of the reinforcement is from about 17 to about 10 MPa. These values are exceptional because they are high even compared to the shear stressed obtained with similar reinforcement bars surrounded by large volumes of normal concrete. In the specimens with cross section 50×50 mm, the shear stresses were about 30 MPa; this is an extremely high value which proves that the full benefit of reinforcing steel bars is obtained at an anchoring length of only about 5-6 times the diameter of the bar, even in specimens of such shape and such dimensions that there is a risk of cleavage.

In more compact configurations where cleavage is prevented, the anchoring length necessary to obtain the full benefit of reinforcing steel is much smaller.

This unique pull-out resistance is utilized, inter alia, in the new type of transverse reinforcement according to the invention consisting of short straight bars arranged transversely to the longitudinal main reinforcement.

I claim:

1. A shaped article comprising a matrix (A) with a reinforcement (B) being a composite structure comprising a a cement-based matrix selected from a cement paste, mortar and concrete made from a cement selected from portland cement and refractory cement (C) which is reinforced with reinforcing bodies (D) in the form of fibers, the transverse dimension of the reinforcement B being at least 5 times as large as the transverse dimension of the fibers D, at least one of the group consisting of the article, the matrix A and the base matrix C having high stiffness in any direction as defined by at least one of the following criteria:
   (1) the modulus of elasticity in any direction being at least 30,000 MPa, or
   (2) the resistance to compression in any direction being at least 80 MPa, the fibers D being present in a volume concentration of at least 4%, based on the volume of the matrix A, the volume concentration of the reinforcement B in the tensile zone or tensile zones of the article being at least 5%.

2. A shaped article according to claim 1 which has a yield strain of at least 10 mm/m with retention of a load capacity of at least 50% of the maximum load applied during the course of loading up to the yield.

3. A shaped article according to claim 1, wherein the transverse dimension of the reinforcement B is at least 10 times as large as the transverse dimension of the fibers D.

4. A shaped article according to claim 3, wherein the transverse dimension of the reinforcement B is at least 100 times as large as the transverse dimension of the fibers D.

5. A shaped article according to claim 1, wherein at least one of the group consisting of the article, the matrix A, and the base matrix C has a high stiffness in any direction as defined by at least one of the following criteria:
   (1) the modulus of elasticity in any direction being at least 50,000 MPa, or
   (2) the resistance to compression in any direction being at least 130 MPa.

6. A shaped article according to claim 1, wherein the fibers D are present in a volume concentration of at least 5%, based on the volume of the matrix A.

7. A shaped article according to claim 6, wherein the fibers D are present in a volume concentration of at least 7%, based on the volume of the matrix A.

8. A shaped article according to claim 7, wherein the fibers D are present in a volume concentration of at least 10%, based on the volume of the matrix A.

9. A shaped article according to claim 1, wherein the volume concentration of the reinforcement B in the tensile zone or tensile zones of the article is at least 7%.

10. A shaped article according to claim 9, wherein the volume concentration of the reinforcement B in the tensile zone or tensile zones of the article is at least 10%.

11. A shaped article according to claim 10, wherein the volume concentration of the reinforcement B in the tensile zone or tensile zones of the article is at least 15%.

12. A shaped article according to claim 1, comprising a matrix (A) with a reinforcement (B) embedded therein, the matrix (A) being a composite structure comprising a base matrix (C) which is reinforced with reinforcing bodies (D) in the form of fibers. whereby the strain capacity of the matrix (A) is increased over that of the base matrix (C) so that the ratio between the strain capacity of the matrix (A) and the strain capacity of the base matrix (C) is at least 1.2.

13. A shaped article according to claim 12, wherein the ratio between the strain capacity of the matrix (A) and the strain capacity of the base matrix (C) is at least 5.

14. A shaped article according to claim 12, wherein the amount, shape, arrangement, and performance of the reinforcement (B) are adapted to the matrix (A) so that the strain capacity of the matrix (A) with the reinforcement embedded therein is increased relative to the strain capacity of the matrix (A) in bulk so that the ratio between the strain capacity of the matrix (A) with the reinforcement embedded therein and the matrix (A) in bulk is at least 1.2.

15. A shaped article according to claim 14, wherein the ratio between the strain capacity of the matrix (A) with the reinforcement embedded therein and the matrix (A) in bulk is at least 5.

16. A shaped article according to claim 1, wherein the base matrix (C) is a cement-based matrix selected from a cement paste, mortar and concrete made from a cement selected from Portland Cement and refractory cement, the matrix material being in a dense packing corresponding to a water/powder ratio of at the most 0.30 by weight.

17. A shaped article according to claim 16 wherein the water/powder ratio in the base matrix (C) is at the most 0.20 by weight.

18. A shaped article according to claim 16 wherein the base matrix (C) further comprises additional particles which are at least one power of 10 smaller than the cement particles.

19. A shaped article according to claim 18, wherein the additional particles are microsilica particles.

20. A shaped article according to claim 16, wherein some or all of the water in the base matrix (C) is replaced by a water-soluble polymer.

21. A shaped article according to claim 16, wherein the paste, mortar or concrete contains additional bodies of strong materials selected form the group consisting of quartz, $Al_2O_3$, steel and glass.

22. A shaped article according to claim 21, wherein the base matrix (C) further comprises wollastonit.

23. A shaped article according to claim 1, wherein the bodies (D) are fibers selected from the group consisting of glass fibers, polypropylene fibers, Kevlar fibers, carbon fibers, ceramic fibers, including aluminum oxide fibers, silicon nitride fibers and silicon carbide fibers, and steel fibers, with a fiber diameter of less than 400 μm, the fibers being present in a volume concentration of at least 5%, based on the volume of the matrix (A).

24. A shaped article according to claim 23, wherein the fibers have a diameter of less than 200 μm.

25. A shaped article according to claim 23, wherein the bodies (D) are fibers having a strength larger than 300 MPa.

26. A shaped article according to claim 25, wherein the fibers have a strength larger than 800 MPa.

27. A shaped article according to claim 1, wherein the bodies (D) comprise fibers with a fiber diameter in at least one of the ranges 4–1 mm, 1–0.3 mm, 300–100 μm, 100–30 μm, 30–10 μm and less than 10 μm.

28. A shaped article according to claim 27, wherein the bodies (D) are fibers having a strength larger than 300 MPa.

29. A shaped article according to claim 28, wherein the fibers have a strength larger than 800 MPa.

30. A shaped article according to claim 1, wherein the modulus of elasticity of fibers incorporated in the matrix, $E_f$, is at least $2 \times 10^{10}$ N/m$^2$, and the modulus of elasticity of the material material, $E_m$, is at least $10^{10}$ N/m$^2$.

31. A shaped article according to claim 30, wherein the modulus of elasticity of fibers incorporated in the matrix, $E_f$, is at least $2 \times 10^{11}$ N/m$^2$.

32. A shaped article according to claim 30, wherein the modulus of elasticity of the matrix material, $E_f$, is at least $50 \times 10^{10}$ N/m$^2$.

33. A shaped article according to claim 1, wherein the reinforcement (B) is selected from the group consisting of bars, rods and threads.

34. A shaped article according to claim 33, wherein the reinforcement (B) is selected from the group consisting of deformed steel bars a pre-stressing wires and cables, and fiber-polymer composite reinforcement.

35. A shaped article according to claim 33, wherein some of or all of the reinforcing bodies (B) are in the form of short components selected from discrete small rods and fibers.

36. A shaped article according to claim 1, which comprises a reinforcement transverse to the reinforcement (B), the transverse reinforcement being substantially straight and arranged substantially perpendicular to the reinforcement B.

37. A shaped article according to claim 36, wherein the transverse reinforcement has a deformed and/or rough surface texture substantially perpendicular to the longitudinal direction of the transverse reinforcement.

38. A shaped article according to claim 37, wherein the transverse reinforcement has a structure selected from a deformed bar structure and a thread structure.

39. A shaped article according to claim 1, wherein the strength of the reinforcement (B) is at least 400 MPa.

40. A shaped article according to claim 1, wherein the reinforcement (B) has a modulus of elasticity of at least $5 \times 10^{10}$ N/m$^2$.

41. A shaped article according to claim 40, wherein the reinforcement (B) has a modulus of elasticity of at least $5 \times 10^{11}$ N/m$^2$.

42. A shaped article according to claim 1, in which the number of reinforcing bodies B in the tensile zone, as judged from a plane perpendicular to the reinforcement, is at least 2.

43. A shaped article according to claim 1, in which the reinforcement B is arranged in such a manner that the article has a high stiffness in at least two directions perpendicular to each other as defined by at least one of the following criteria:
 (1) the modulus of elasticity in at least two direction perpendicular to each other being at least 30,000 MPA, or
 (2) the resistance to compression in at least two directions perpendicular to each other being at least 80 MPA.

44. A shaped article comprising a matrix (A) with a reinforcement (B) being a composite structure comprising a a cement-based matrix selected from a cement paste, mortar and concrete made from a cement selected from portland cement and refractory cement (C) which is reinforced with reinforcing bodies (D) in the form of fibers, the transverse dimension of the reinforcement B being at least 5 times as large as the transverse dimension of the fibers D, at least one of the group consisting of the article, the matrix A and the base matrix C having high stiffness in any direction as defined by at least one of the following criteria:
 (1) the modulus of elasticity in any direction being at least 30,000 MPa, or
 (2) the resistance to compression in any direction being at least 80 MPa, the fibers D being present in a volume concentration of at least 2%, based on the volume of the matrix A, the volume concentration of the reinforcement B in the tensile zone or tensile zones of the article being at least 5%, the article showing at least one of the following qualities I, II, III:
 (I) a large tensile strain capacity with retention of substantial coherence of the article as defined by the tensile zone of the article having a tensile strain capacity of at least 0.5 mm/m, the article retaining substantial coherence during the straining as defined by the absence of any cracks passing the reinforcement B, or by any damage in the tensile zone in the form of fine cracks passing the reinforcement B having a width of at the most 0.2 mm, with the proviso that the ratio between the crack width and the smallest transverse diameter of the reinforcement B is at the most 0.02,
 (II) a large tensile load capacity (referring to stresses in the tensile zone of the article) defined by the tensile load capacity fulfilling at least one of the following conditions (a), (b), and (c):
  (a) under conditions of substantially elastic behavior, the tensile load capacity of the article corresponds to a tensile stress of at least 50 MPa, with retention of coherence during the straining as defined by the tensile zone of the article having a tensile strain capacity of at least 0.5 mm/m, the article retaining substantial coherence during the straining as defined by the absence of any cracks passing the reinforcement B, or by any damage in the tensile zone in the form of fine cracks passing the reinforcement B having a width of at the most 0.2 mm, with the proviso that the ratio between the crack width and the smallest transverse diameter of the reinforcement B is at the most 0.02,
  (b) under yielding, the tensile load capacity of the article corresponds to a tensile stress of at least 70 MPa, with the retention of coherence as defined by the absence of any cracks passing the reinforcement B, or by any damage in the tensile zone in the form of fine cracks passing the reinforcement B having a width of at the most 1 mm, with the proviso that the ratio between the crack width and the smallest transverse diameter of the reinforcement B is at the most 0.10,
  (c) under ultimate loading, the article shows a tensile load capacity corresponding to at least 120 MPa,
 (III) an increase in tensile strain capacity of the matrix defined as the amount, shape, arrangement, and performance of the reinforcement (B) being adapted to the matrix (A) so that the strain capacity of the matrix (A) with the reinforcement embedded therein is increased relative to the strain capacity of the matrix (A) in bulk so that the ratio between the strain capacity of the matrix (A) with the reinforcement embedded therein and the matrix (A) in bulk is at least 1.2.

45. A shaped article according to claim 44, which has a yield strain of at least 10 mm/m with retention of a load capacity of at least 50% of the maximum load applied during the course of loading up to the yield.

46. A shaped article comprising a matrix (A) with a reinforcement (B) embedded therein, the matrix (A) being a composite structure comprising a base matrix (C) which is reinforced with reinforcing bodies (D) in the form of fibers, the article containing 5–40% by volume of reinforcement in the form of bars with a transverse dimension, of 5–25 mm, embedded in a fiber-reinforced matrix made with 20–60% by volume of large compact-shaped bodies with a maximum particle size of 10 mm, 4–20% by volume of fibers with a length of at least 2 mm, and a diameter of 5–400 μm, and 20–56% by volume of a binder-forming material made from
  20–50% volume of water, 25–75% by volume of cement, 5–40% by volume of ultrafine powder of a size in the range between 50 and 0.5 μm, the ultrafine powder having a reactivity which is less than the reactivity of the cement, and a dispersing agent.

47. A shaped article according to claim 46, wherein the reinforcement with a transverse dimension of 5–25 mm is in the form of steel bars.

48. A shaped article according to claim 46, wherein the large compact-shaped bodies with a maximum particle size of 10 mm are selected from the group consisting of sand, stone and metal powder.

49. A shaped article according to claim 48, wherein the compact-shaped bodies comprise sand selected from the group consisting of quartz sand and $Al_2O_3$ sand.

50. A shaped article according to claim 46, wherein the binder-forming material is further made from a water-soluble polymer.

51. A shaped article according to claim 46, wherein the ultrafine powder in the binder-forming material is selected from ultrafine silica having a BET surface area in the range of about 200,000–250,000 $cm^2/g$ and ultra fine $Al_2O_3$.

52. A shaped article according to claim 46, wherein the dispersing agent in the binder-forming material is a concrete superplasticizer in an amount of 0.5–4% by volume, on a powder basis, based on the volume of the binder-forming material.

53. A shaped article according to claim 46, wherein the binder-forming material further comprises up to 30% by volume of a powder having a particle size of 2–10 μm.

54. A shaped article comprising a matrix (A) with a reinforcement (B) embedded therein, the matrix (A) being a composite structure comprising a base matrix (C) which is reinforced with reinforcing bodies (D) in the form of fibers, the article containing 5–40% by volume of reinforcement with a transverse dimension of 0.2–5 mm, embedded in a fine fiber-reinforced matrix made with 0–50% by volume of particles having a maximum particle size of 1 mm, the particles being selected from fine sand and metal particles, 4–20% by volume of fibers with a length from 20 μm to 5 mm and a diameter of 0.5–200 μm together with 30–96% by volume of a binder-forming material made from 20–50% by volume of water, 10–75% by volume of cement, 5–40% by volume of ultrafine powder of a size in the range between 50 Å and 0.5 μm, the ultrafine powder having a reactivity which is less than the reactivity of the cement, and a a dispersing agent.

55. A shaped article according to claim 54, wherein the reinforcement with a transverse dimension of 0.2–5 mm is selected from the group consisting of continuous wires and chopped wired.

56. A shaped article according to claim 55, wherein the wires are steel wires.

57. A shaped article according to claim 56, wherein the particles in the fiber-reinforced matrix having a maximum particle size of 1 mm comprise $Al_2O_3$ sand.

58. A shaped article according to claim 54 wherein the binder-forming material is further made from a water-soluble polymer.

59. A shaped article according to claim 54, wherein the ultrafine powder in the binder-forming material is selected from ultrafine silica having a BET surface area in the range of about 200,000–250,000 $cm^2/g$ and ultrafine $Al_2O_3$.

60. A shaped article according to claim 54, wherein the dispersing agent in the binder-forming material is a concrete superplasticizer in an amount of 0.5–4% by volume on a powder basis, based on the volume of the binder-forming material.

61. A shaped article according to claim 54, wherein the binder-forming material further comprises up to 30% by volume of a powder having a particle size of 2–10 μm.

* * * * *

UNITED STATES PATENT AND TRADEMARK OFFICE
CERTIFICATE OF CORRECTION

PATENT NO. : 4,979,992

DATED : December 25, 1990

INVENTOR(S) : HANS H. BACH

It is certified that error appears in the above-identified patent and that said Letters Patent is hereby corrected as shown below:

Column 1, line 46: Insert --as-- after "such".

Column 2, line 44: Delete "ceramic".

Column 3, line 29: Change "A" to --Fig. 3A--.

Column 3, line 35: Change "B" to --Fig. 3B--.

Column 3, line 49: Change "C in --Fig. 3" to --Fig. 3C--.

Column 3, line 67: Change "based" to --base--.

Column 6, line 54: Change "Fig. 6" to --Fig. 6A--;

Column 7, line 25: Change "Fig. 6 B" to --Fig. 6B--.

Column 7, line 30: Delete "develop".

Column 7, line 56: Insert --rise-- after "giving".

Column 8, line 46: Change "1-5" to --1-4--.

Column 8, line 66: Change "rought" to --rough--.

Column 9, line 54: In the formula, change "$\epsilon_o d$" to --$\underline{\epsilon_o D}$--.

Column 12, line 59: Change "flavorable" to --favorable--.

Column 13, line 33: Change "reinforced" to --unreinforced--.

Column 13, line 55: In the formula, change "$E_t$" to --$E_f$--.

Column 14, line 23: Change "elastticity" to --elasticity--.

Column 15, line 43: Change "by" to --be--.

UNITED STATES PATENT AND TRADEMARK OFFICE
CERTIFICATE OF CORRECTION

Figure 11A:
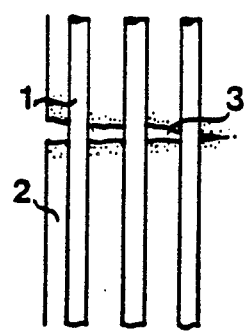
Figure 11B:
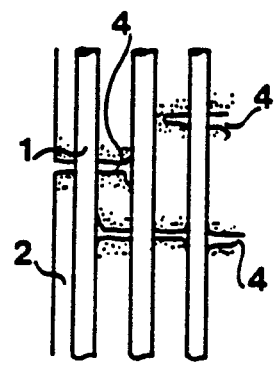
Figure 11C:
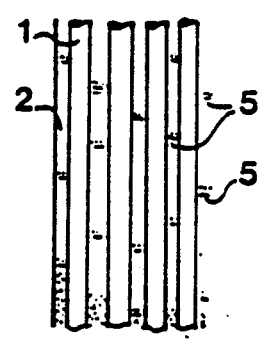
Figure 11D:
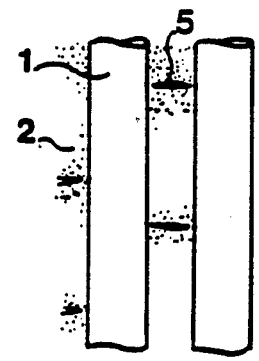

PATENT NO.  : 4,979,992
DATED       : December 25, 1990
INVENTOR(S) : HANS H. BACH It is certified that error appears in the above-identified patent and that said Letters Patent is hereby corrected as shown below:

```
Column 16, line 19:   Insert --refers-- before "to".
Column 17, line 23:   Change "toi" to --to--.
Column 17, line 45:   Change "A shows" to --Fig. 11A shows--.
Column 17, line 46-47:  Change "B shows" to --Fig. 11B shows--.
Column 17, line 52:   Change "C (and D" to --Fig. 11C
(and Fig. 11D--.
Column 17, line 53:   Change "C)" to --Fig. 11C)--.
Column 18, line 27:   Change "co/operation" to --co-operation--.
Column 20, line 38:   Change "aticle" to --article--.
Column 20, line 38:   Insert --to-- after "only".
Column 20, lines 45-46:  Change "cylinder" to --cylinders--.
Column 22, line 36:   Change "Paper." to --Paper).--.
Column 22, line 50:   Change "vary" to --very--.
Column 23, line 11:   Change "matrtix" to --matrix--.
Column 23, line 31:   In the first occurrence, change "and" to
--to--.
Column 24, lines 29-30:  Change "reiforcements" to
--reinforcements--.
Column 24, line 47:   Change "166" to --1/3--.
```

UNITED STATES PATENT AND TRADEMARK OFFICE
CERTIFICATE OF CORRECTION

PATENT NO. : 4,979,992
DATED : December 25, 1990
INVENTOR(S) : HANS H. BACH

It is certified that error appears in the above-identified patent and that said Letters Patent is hereby corrected as shown below:

Column 24, line 49: Insert --are-- before "considerably".
Column 25, line 57: Change "maxtrix" to --matrix--.
Column 26, line 62: Change "maxtrix" to --matrix--.
Column 27, line 49: Change "3.10"" to --3x10"--.
Column 29, line 20: Change "high" to --higher--.
Column 29, line 67: Change "looses" to --loses--.
Column 29, line 68: Insert --stiffness by-- before "formation".
Column 30, line 46: Change "caculated" to --calculated--.
Column 31, line 43: Change "fomr" to --form--.
Column 32, line 56: Change "claim 1" to --Example 1--.
Column 32, line 66: Insert --been-- after "also".
Column 32, line 68: Change "yeilding" to --yielding--.
Column 33, line 8-9: Change "stain-hardening" to --strain-hardening--.
Column 33, line 47: Change "tthe" to --the--.
Column 34, line 24: Change "degress" to --degree--.
Column 34, line 26: Insert --content of-- after "high".
Column 34, line 36: Change "tthe" to --the--.

UNITED STATES PATENT AND TRADEMARK OFFICE
CERTIFICATE OF CORRECTION

PATENT NO. : 4,979,992

DATED : December 25, 1990

INVENTOR(S) : HANS H. BACH

Figure 16A:
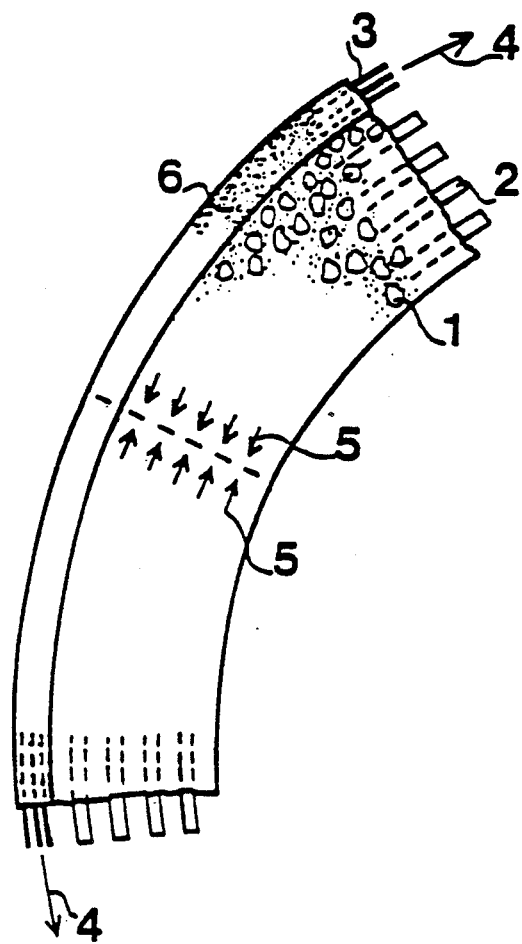
Figure 16B:
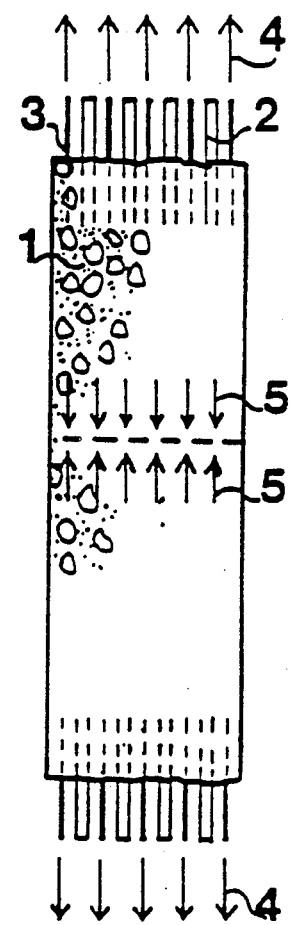

It is certified that error appears in the above-identified patent and that said Letters Patent is hereby corrected as shown below:

```
Column 35, line 1:   Change "seen" to --seem--.
Column 35, line 59:  Change "defomation" to --deformation--.
Column 35, line 62:  Change "II" to --III--.
Column 35, line 63:  Change "preferably" to --preferable--.
Column 36, line 9:   Change "nott" to --not--.
Column 36, line 12:  Change "discosed" to --disclosed--.
Column 36, line 25:  Change "4=mm" to --4-25mm--.
Column 36, line 57:  Change "reinfocement" to
--reinforcement--.
Column 37, line 26:  Change "particle" to --particles--.
Column 40, line 22:  Change "surroundign" to --surrounding--.
Column 40, line 40:  Change "(∈)" to --(∈)--.
Column 41, line 34:  Delete the first occurrence of "the".
Column 41, line 61:  Insert --of-- after "view".
Column 41, line 36:  Insert --of-- before "an".
Column 47, line 15:  Change "A shows" to --Fig. 16A shows--.
Column 47, line 16:  Change "B shows" to --Fig. 16B shows--.
Column 47, line 23:  Change "wires in A" to --wires in
Fig. 16A--.
```

UNITED STATES PATENT AND TRADEMARK OFFICE
CERTIFICATE OF CORRECTION

PATENT NO. : 4,979,992

DATED : December 25, 1990

INVENTOR(S) : HANS H. BACH

It is certified that error appears in the above-identified patent and that said Letters Patent is hereby corrected as shown below:

Column 47, line 24: Change "In B" to --In Fig. 16B--.
Column 48, line 5: Change "structrues" to --structures--.
Column 48, lines 18-19: Change "fibremodified" to --fibre-modified--.
Column 48, line 30: Change "knwon" to --known--.
Column 48, line 39: Change "reinforcerment" to --reinforcement--.
Column 48, line 61: Change "17 B" to --17B--.
Column 48, line 62: Change "17 A" to --17A--.

Column 49, line 14: Change "17 B" to --17B--.
Column 49, line 14: Insert --in-- after "illustrated".
Column 49, line 17: Change "typically" to --typical--.
Column 50, line 15: Insert --to-- before "800°C".
Column 50, line 37: Change "stressed" to --stresses--.
Column 53, line 54: Change "additionally" to --an additional--.
Column 54, line 24: Change "nabour" to --neighbour--.

UNITED STATES PATENT AND TRADEMARK OFFICE
CERTIFICATE OF CORRECTION

PATENT NO. : 4,979,992

DATED : December 25, 1990

INVENTOR(S) : HANS H. BACH

It is certified that error appears in the above-identified patent and that said Letters Patent is hereby corrected as shown below:

Page 6 of 11

Column 56, line 40: Change "water/cement" to --water/(cement--.
Column 56, line 49: Change "use" to --used--.
Column 57, line 19: Change "of" to --or--.
Column 61, line 61: Change "I" to -- $l$ --.
Column 63, line 1: Change "28 A" to --28A--.
Column 63, line 12: Delete the first occurrence of "a".
Column 63, line 17: Change "28 B" to --28B--.
Column 63, line 32: Change "28 C" to --28C--.
Column 63, line 56: Change "28 D" to --28D--.
Column 64, line 36: Change "and" to --an--; same line: change "stifness" to --stiffness--.
Column 64, line 42: Change "modelus" to --modulus--.
Column 65, line 14: In the second occurrence, change "In Fig. 29" to --In Fig. 29A--.
Column 65, line 17: Change "A-D" to Figs. --29B-E--.
Column 65, line 18: Change "D" to --Fig. 29E--.
Column 65, line 19: Change "C" to --Fig. 29D--.
Column 65, line 19: Change "B" to --Fig. 29C--.

UNITED STATES PATENT AND TRADEMARK OFFICE
CERTIFICATE OF CORRECTION

PATENT NO.   : 4,979,992
DATED        : December 25, 1990
INVENTOR(S)  : HANS H. BACH It is certified that error appears in the above-identified patent and that said Letters Patent is hereby corrected as shown below:

Column 65, line 22:  Change "section A," to --Fig. 29B,--.
Column 65, line 29:  Change "section B," to --Fig. 29C,--.
Column 65, line 39:  Change "section C," to --Fig. 29D,--.
Column 65, line 48:  Change "section D," to --Fig. 29E,--.
Column 65, line 66:  Change "sections A, B and C," to --Figs. 29B, 29C and 29D,--.
Column 66, line 1:   Change "D" to --of Fig. 29E--.
Column 66, line 3:   Change "D" to --of Fig. 29E--.
Column 67, line 60:  Change "Fig. 29" to --Fig. 29A--.
Column 71, line 20:  Insert --between-- after "distance".
Column 72, line 17:  Change "43" to --43A--.
Column 72, line 17:  After "beam" delete "A".
Column 72, line 19:  Insert --in Fig. 43B-- after "section"; same line: after "beam" delete "B".
Column 72, line 47:  Change "crack" to --cracks--.
Column 74, line 19:  Change "complete" to --completely--.
Column 77, line 9:   Insert --to-- after "up".
Column 77, line 51:  Insert --to-- before "2,000,000".
Column 78, line 25:  Delete the second occurrence of "almost as".

UNITED STATES PATENT AND TRADEMARK OFFICE
CERTIFICATE OF CORRECTION

PATENT NO. : 4,979,992

DATED : December 25, 1990

INVENTOR(S) : HANS H. BACH

Figures 47A, 47B:
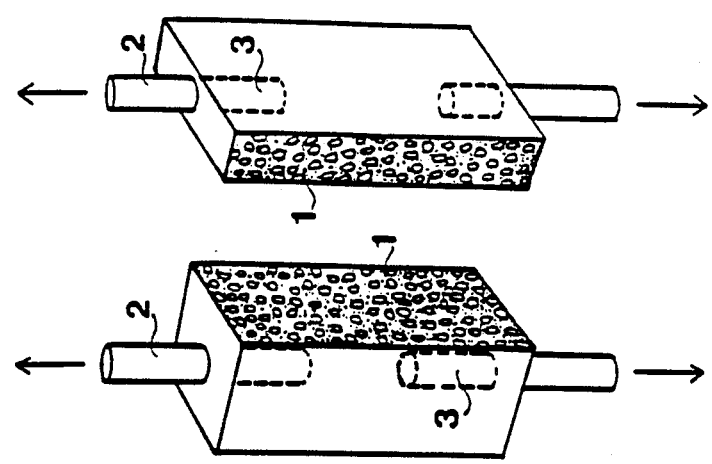

It is certified that error appears in the above-identified patent and that said Letters Patent is hereby corrected as shown below:

```
Column 79, line 26:    Change "coherenece" to --coherence--.
Column 80, line 57:    In Table 5.2, third line, change "2.7 an
4.2" to --2.7 and 4.2--.
Column 81, line 4:     In Table 5.2, third line, change "2.7 an
4.2" to --2.7 and 4.2--.
Column 81, line 36:    Insert --effectively-- after "very".
Column 81, line 52:    Change "constituentts" to
--constituents--.
Column 81, line 62:    Insert --to-- after "rise".
Column 82, line 15:    Change "mound" to --mould--.
Column 82, line 57:    Insert --with-- after "sand".
Column 83, line 67:    Change "conventtional" to
--conventional--.
Column 84, lines 29-30: Change "defomed" to --deformed--.
Column 84, line 53-54: Change "Fig. 47" to --Figs. 47A and
47B--.
Column 84, line 56:    Change "47" to --47B--.
Column 84, line 59:    Insert --Fig. 47A shows-- after "and".
Column 84, line 60:    Delete "with" after "section".
Column 84, line 64:    Change "Fig. 47," to --Fig. 47B,--.
```

UNITED STATES PATENT AND TRADEMARK OFFICE
CERTIFICATE OF CORRECTION

PATENT NO. : 4,979,992
DATED : December 25, 1990
INVENTOR(S) : HANS H. BACH

It is certified that error appears in the above-identified patent and that said Letters Patent is hereby corrected as shown below:

Column 84, line 65: Change "tow" to --two--.

Column 85, line 51: Change "ensity" to --density--.

Column 85, line 61: Change "stroed" to --stored--.

Column 86, line 34: In Table 7.1, first line of footnote (4), change "The" to --$\tau$--.

Column 86, line 60: Change "(50°50mm)" to --(50 x 50 mm)--.

Column 86, line 68: Change "of" to --to--.

Column 87, line 2: Change "this" to --thin--.

Column 87, line 6: Change "stressed" to --stresses--.

Column 87, line 24: In claim 1, insert --embedded therein, the Matrix (A)-- between "B" and "being".

Column 87, line 25: In claim 1, delete the first occurrence of "a".

Column 88, line 66: In claim 22, change "wollastonit" to --wollastonite--.

Column 89, line 26: In claim 30, change "material material" to --matrix material--.

Column 89, line 32: In claim 32, change "$E_f$," to --$E_m$--.

Column 89, line 33: In claim 32, change "50" to --2--.

UNITED STATES PATENT AND TRADEMARK OFFICE
CERTIFICATE OF CORRECTION

PATENT NO. : 4,979,992
DATED : December 25, 1990
INVENTOR(S) : HANS H. BACH

It is certified that error appears in the above-identified patent and that said Letters Patent is hereby corrected as shown below:

Column 89, line 39: In claim 34, change "bars a" to --bars--.
Column 89, line 64: In claim 41, change "5" to --2--.
Column 90, line 6: In claim 43, change "direction" to --directions--.
Column 90, lines 8 and 11: In claim 43, in every occurrence change "MPA" to --MPa--.
Column 90, line 13: In claim 44, insert --embedded therein, the matrix (A)-- between "(B)" and "being".
Column 90, line 14: In claim 44, delete the first occurrence of "a".
Column 90, line 22: In claim 44, insert --a-- between "having" and "high".
Column 90, line 27-33: In claim 44, begin a new paragraph with "the fibers D...III:"
Column 90, line 33: In claim 44, add --and-- after "II".
Column 90, line 54-57: In claim 44, delete "the tensile zone of the article having a tensile strain capacity of at least 0.5 mm/m, the article retaining substantial coherence during the straining as defined by".

UNITED STATES PATENT AND TRADEMARK OFFICE
CERTIFICATE OF CORRECTION

PATENT NO. : 4,979,992
DATED : December 25, 1990
INVENTOR(S) : HANS H. BACH It is certified that error appears in the above-identified patent and that said Letters Patent is hereby corrected as shown below:

Column 90, line 67: In claim 44, after "coherence" insert --during the straining--.

Column 91, line 30: In claim 46, delete the comma between "dimension" and "of".

Column 91, line 37: In claim 46, insert --by-- between "20-50%" and "volume".

Column 91, line 39: In claim 46, insert --$\text{Å}$-- after "50".

Column 92, line 29: In claim 54, delete the first occurrence of "a".

Column 92, line 34: Change "wired" to --wires--.

Signed and Sealed this

First Day of November, 1994

Attest:

*Attesting Officer*

BRUCE LEHMAN
*Commissioner of Patents and Trademarks*